US007890086B2

(12) United States Patent
Lee et al.

(10) Patent No.: US 7,890,086 B2
(45) Date of Patent: Feb. 15, 2011

(54) METHOD AND APPARATUS FOR SENDING VOICE MESSAGE IN MOBILE NETWORK

(75) Inventors: Gil-soo Lee, Kyunggi-do (KR); Shin Jin-soo, Seoul (KR)

(73) Assignee: Ti Square Technology Ltd., Kyunggi-do (KR)

( * ) Notice: Subject to any disclaimer, the term of this patent is extended or adjusted under 35 U.S.C. 154(b) by 935 days.

(21) Appl. No.: 11/571,495

(22) PCT Filed: Mar. 30, 2005

(86) PCT No.: PCT/KR2005/000920
§ 371 (c)(1),
(2), (4) Date: Dec. 29, 2006

(87) PCT Pub. No.: WO2006/001593
PCT Pub. Date: Jan. 5, 2006

(65) Prior Publication Data
US 2008/0062938 A1    Mar. 13, 2008

(30) Foreign Application Priority Data
Jun. 29, 2004   (KR) .................. 10-2004-0049390
Oct. 21, 2004   (KR) .................. 10-2004-0084255

(51) Int. Cl.
*H04M 11/10* (2006.01)
(52) U.S. Cl. .............. 455/413; 455/445; 370/352; 379/88.22; 379/221.08
(58) Field of Classification Search .......... 455/412.1, 455/412.2, 413, 414.1, 414.2, 414.4, 415–417, 455/445, 517, 566, 567, 403, 418, 426.1, 455/433, 439, 461, 462, 465, 466, 563; 379/219, 379/221.01, 273, 274, 15.02, 15.03, 67.1, 379/88.04, 88.16, 88.18, 88.22, 88.23, 114.28, 379/114.29, 133, 221.08, 221.09; 370/351–357, 370/328, 338
See application file for complete search history.

(56) References Cited

U.S. PATENT DOCUMENTS 6,643,507 B1 * 11/2003 Chow et al. .............. 455/422.1

(Continued)

FOREIGN PATENT DOCUMENTS

KR    10-2002-0040466    5/2002

(Continued)

OTHER PUBLICATIONS

WIPO, International Search Report for PCT/KR2005/000920.

(Continued)

*Primary Examiner*—Anthony S. Addy
(74) *Attorney, Agent, or Firm*—Intellectual Property Law Group LLP; Juneko Jackson; Otto O. Lee

(57) ABSTRACT

To use the supplementary services of a conventional mobile communication service, such as Short Message Service (SMS) and Voice Mail System (VMS) service, there are problems in that an access method to each service must be known and several steps must be undergone. The present invention relates to a method and apparatus for sending voice messages in a mobile communication network and, more particularly, to a method and apparatus that gain access to the service providing page of the wireless Internet in such a way as to input the telephone number of a counterpart and a wireless Internet access key, and send a voice message to the counterpart.

22 Claims, 34 Drawing Sheets

U.S. PATENT DOCUMENTS

| | | | |
|---|---|---|---|
| 6,684,069 B1 * | 1/2004 | Yoon | 455/414.1 |
| 6,954,524 B2 * | 10/2005 | Gibson | 379/211.02 |
| 6,970,719 B1 * | 11/2005 | McConnell et al. | 455/554.1 |
| 7,145,998 B1 * | 12/2006 | Holder et al. | 379/210.01 |
| 7,224,788 B1 * | 5/2007 | Rhee et al. | 379/207.02 |
| 7,260,384 B2 * | 8/2007 | Bales et al. | 455/413 |
| 7,295,664 B1 * | 11/2007 | Hajji et al. | 379/218.01 |
| 7,356,001 B1 * | 4/2008 | Jones et al. | 370/331 |
| 7,466,813 B1 * | 12/2008 | Easley et al. | 379/210.01 |
| 7,505,571 B2 * | 3/2009 | Bhatia et al. | 379/88.22 |
| 7,542,558 B2 * | 6/2009 | Klein et al. | 379/201.01 |
| 7,554,939 B2 * | 6/2009 | Zhou et al. | 370/328 |
| 2004/0252679 A1 * | 12/2004 | Williams et al. | 370/356 |
| 2005/0117726 A1 * | 6/2005 | DeMent et al. | 379/142.01 |

FOREIGN PATENT DOCUMENTS

| | | |
|---|---|---|
| KR | 10-2002-0087578 | 11/2002 |
| KR | 10-2004-0022822 | 3/2004 |

OTHER PUBLICATIONS

WIPO, International Preliminary Report on Patentability for PCT/KR2005/000920.

WIPO, Written Opinion of the Searching Authority for PCT/KR2005/000920.

Korean Office Action, mailing date Jan. 11, 2005 for corresponding Korean Application No. 10-2004-0084255.

* cited by examiner

| | voice message call history query | | | | | |
|---|---|---|---|---|---|---|
| voice message call history query | Select☐ | Telephone number | Date transmitted | Date received | Reception state | reply or not | Listening |
| Received voice message | ☐ | 010-**-1234 | 04/07/09 | 04/07/10 | Reception completed | No | 🔊 |
| Directory | ☐ | 010-**-1234 | 04/07/09 | 04/07/10 | Reception completed | Yes | 🔊 |
| Environment setting | ☐ | 010-**-1234 | 04/07/08 | 04/07/09 | Reception completed | Yes | 🔊 |
| | ☐ | | | | | | |
| Public notice | ☐ | | | | | | |
| User guide | ☐ | | | | | | |
| FAQ | ☐ | | | | | | |
| Question | ☐ | | | | | | |
| | ☐ | | | | | | |

[Select all] [Selectively delete]   ◀ 1 2 3 ▶

| voice message call history query | | | | | | | |
|---|---|---|---|---|---|---|---|
| voice message call history query | | | | | | | |
| Received voice message | Select ☐ | Telephone number | Date transmitted | Date received | Reception state | reply or not | Listen-ing |
| Directory | ☐ | 010-***-1234 | 04/07/09 | 04/07/10 | Reception completed | No | 🔊 |
| Environment setting | ☐ | 010-***-1234 | 04/07/09 | 04/07/10 | Reception completed | Yes | 🔊 |
| | ☐ | | | | | | |
| Public notice | ☐ | | | | | | |
| User guide | ☐ | | | | | | |
| FAQ | ☐ | | | | | | |
| Question | ☐ | | | | | | |
| | ☐ | | | | | | |

[Select all] [Selectively delete]  ◀ 1 2 3 ▶

FIG. 31

METHOD AND APPARATUS FOR SENDING VOICE MESSAGE IN MOBILE NETWORK

CROSS-REFERENCE TO RELATED APPLICATIONS

This application is U.S. National Phase application, under 35 U.S.C. §371, of International Application PCT/KR2005/000920, with an international filing date of Mar. 30, 2005 and claims priority to Korean application no. 10-2004-004-0049390, filed Jun. 29, 2004 and Korean application no. 10-2004-0084255, filed Oct. 21, 2004; all of which are hereby incorporated by reference for all purposes.

BACKGROUND OF THE INVENTION

1. Field of the Invention

The present invention relates to a method and apparatus for sending a voice message in a mobile communication network.

2. Related Art

A conventional voice communication method is a currently used telephone communication method that allows a user to use a service of voice communication or supplementary voice communication with a counterpart in such a way as to press a call button after inputting the counterpart's telephone number, or press a call button after inputting a special code and the telephone number.

In the case of a short message, it is inconvenient for some user to send message because user have to know each access method for supplementary voice communication service. That is, in order to use the supplementary voice communication service, a user must press the call button after inputting a prefix, a feature code or special code number for voice communication service and a counterpart's telephone number, or gain access to an Audio. Response System (ARS) for supplementary service. For this reason, the method of sending a message to a counterpart is difficult to learn, so that older customers rarely use the service.

Furthermore, in the case of a Voice Mail System (VMS), in order to send a voice message to a counterpart, a user must gain access to the VMS using the VMS's representative access number instead of the counterpart's telephone number, and then undergo processes of authenticating a calling party, inputting a called party's number and storing a voice message. Furthermore, the VMS is complicated in that it requires the several steps in which a called party receives a short message regarding a voice message sent by a sender, gains access to the VMS, undergoes an authentication process using a password or the like, and listens to the received voice message, and has limitations in the method of listening to a received voice message and then immediately making a reply to a calling party using a voice message.

SUMMARY OF THE INVENTION

Technical Problem

The present invention has been made in view of the above problems, and an object of the present invention is to provide a voice message call service method and apparatus, in which a subscriber can send a voice message to a called subscriber without directly communicating with the called subscriber or a number of members belonging to a group.

Another object of the present invention is to provide a voice message call service method and apparatus, which can send a voice message using the menu or shortcut key of a portable terminal and a wireless Internet access key, as well as a typical communication method using an existing special code, a called number and a call button.

A further object of the present invention is to provide a voice message call service method and apparatus, in which a called subscriber can store a voice message received through a voice message call in a VMS and repeatedly listen to the stored voice message.

Yet another object of the present invention is to provide a voice message call reply service method and apparatus, in which a called party can listen to a voice message received from a calling party and then immediately send a voice message to a calling party.

Still another object of the present invention is to provide a voice message call service method and apparatus, wherein a called party can listen to a voice message call received from a calling party and then immediately gain call access to the calling party.

Still another object of the present invention is to provide a voice message call service method and apparatus, in which a called party can listen to a voice message received from a calling party and then immediately call the calling party.

Technical Solution

In order to accomplish the above objects, in accordance with an aspect of the present invention, there is provided a method of providing voice message call service in a service providing apparatus that is connected to a calling terminal, a Mobile Switching Center (MSC)/Personal Communication eXchange (PCX) and a called terminal through a mobile communication network, the method comprising the steps of receiving a call access request signal from the MSC/PCX, wherein the call access request signal corresponds to a first call set-up request signal received from a calling terminal by the MSC/PCX; sending a call access response signal to the MSC/PCX in response to the call access request signal, wherein the MSC/PCX sends a first call set-up response signal to the calling terminal in response to the call access response signal; receiving a voice message, which will be transferred to the called terminal from the calling terminal through a first call path established with calling terminal in accordance with the call access response signal and the first call set-up response signal; terminating the first call path; sending a first outbound call request signal to the MSC/PCX for call connection to the called terminal, wherein the MSC/PCX sends a second call set-up request signal to the called terminal in response to the first outbound call request signal and receives a second call set-up response signal in response to the second call set-up request signal; receiving a first outbound call response signal from the MSC/PCX in response to the second call set-up response signal; and sending the voice message to the called terminal through a second call path established with the called terminal in accordance with the second call set-up response signal and the first outbound call response signal.

In accordance with another aspect of the present invention, there is provided a method of providing voice message call service in a service providing apparatus that is connected to a calling terminal, an MSC/PCX and a called terminal through a mobile communication network, comprising the steps of receiving a first call access request signal from the MSC/PCX, wherein the first call access request signal corresponds to a first call set-up request signal received from a calling terminal by the MSC/PCX; sending a first call access response signal to the MSC/PCX in response to the first call access request signal, wherein the MSC/PCX sends a first call set-up response signal to the calling terminal in response to the first call access response signal; receiving a voice message, which will be transferred to the called terminal from the calling terminal through a first call path established with the calling terminal in accordance with the first call access response signal and the first call set-up response signal; terminating the first call path; sending a callback short message to the called terminal, wherein the called terminal sends a second call set-up request signal to the MSC/PCX for call connection to the service providing apparatus using the callback short message; receiving a second call access request signal from the MSC/PCX in response to the second call set-up request signal; sending a second call access response signal to the MSC/PCX in response to the second call access request signal, wherein the MSC/PCX sends a second call set-up response signal to the called terminal in response to the second call access response signal; and sending the voice message to the called terminal through a second call path established with the calling terminal in accordance with the second call access response signal and the second call set-up response signal.

In accordance with another aspect of the present invention, there is provided a method of providing voice message call service in a service providing apparatus that is connected to a calling terminal, an MSC/PCX, a Home Location Register (HLR), a Service Control Point (SCP) and a called terminal through a mobile communication network, the method comprising the steps of receiving a first Seize Resource (SR) signal from the SCP, wherein the first SR signal corresponds to an Analyzed Information (AI) signal, which is sent to the SCP in response to a featreq signal received in response to a Feature Request (FEATREQ) Signal, the MSC/PCX receiving a first call set-up request signal from the calling terminal and sending the FEATREQ signal to the HLR; sending a first sr signal to the SCP in response to the first SR signal, wherein the SCP sends a first Connect Resource signal to the MSC/PCX in response to the first sr signal; receiving a first call access request signal from the MSC/PCX, wherein the first call access request signal is generated based on the first Connect Resource signal; sending a first call access response signal to the MSC/PCX in response to the first call access request signal, wherein the MSC/PCX sends a first call set-up response signal to the calling terminal in response to the first call access response signal; sending a first Instruction Request (IR) signal to the SCP; receiving a first Specialized Resource Function Directive (SRFD) signal from the SCP in response to the first IR signal; receiving a voice message, which will be transferred to the called terminal, from the calling terminal through a first call path, which is established with the calling terminal, in accordance with the first call access response signal and the first call set-up response signal; sending a first srfd signal to the SCP; receiving a first it signal from the SCP in response to the first SRFD signal; terminating the first call path; sending a voice message call request signal to the SCP for call connection to the called terminal, wherein the SCP sends a first outbound call request signal to the MSC/PCX, and the MSC/PCX sends a second call set-up request signal to the called terminal, receives a second call set-up response signal, and sends a first outbound call response signal to the SCP in response to the second call set-up response signal; receiving a second SR signal from the SCP in response to the first outbound call response signal; sending a second sr signal to the SCP in response to the second SR signal, wherein the SCP sends a second Connect Resource signal to the MSC/PCX in response to the second sr signal; receiving a second call access request signal from the MSC/PCX, wherein the second call access request signal is generated based on the second Connect Resource signal; sending a second call access response signal to the MSC/PCX in response to the second call access request signal; sending a second IR signal to the SCP; receiving a second SRFD signal from the SCP in response to the second IR signal; and sending the voice message from the service providing apparatus to the called terminal using a second call path, which is established between the service providing apparatus and the called terminal, in accordance with the second call access response signal and the second call set-up response signal.

In accordance with another aspect of the present invention, there is provided a method of providing voice message call service in a service providing apparatus that is connected to a calling terminal, an MSC/PCX, an HLR, an SCP and a called terminal through a mobile communication network, the method comprising the steps of receiving an SR signal from the SCP, wherein the first SR signal corresponds to a first AI signal, which is sent to the SCP in response to a featreq signal received in response to a FEATREQ, the MSC/PCX receiving a first call set-up request signal from the calling terminal and sending the FEATREQ signal to the HLR; sending a first sr signal to the SCP in response to the first SR signal, wherein the SCP sends a first Connect Resource signal to the MSC/PCX in response to the first sr signal; receiving a first call access request signal from the MSC/PCX, wherein the first call access request signal is generated based on the first Connect Resource signal; sending a first call access response signal to the MSC/PCX in response to the first call access request signal, wherein the MSC/PCX sends a first call set-up response signal to the calling terminal in response to the first call access response signal; sending a first IR signal to the SCP; receiving a first SRFD signal from the SCP in response to the first IR signal; receiving a voice message, which will be transferred to the called terminal from the calling terminal through a first call path, which is established with the calling terminal, in accordance with the first call access response signal and the first call set-up response signal; sending a first srfd signal to the SCP; receiving a first it signal from the SCP in response to the first SRFD signal; terminating the first call path; sending a callback short message to the called terminal, wherein the called terminal sends a second call set-up request signal to the MSC/PCX for call connection to the service providing apparatus using the callback short message; receiving a second SR signal from the SCP, wherein the second SR signal corresponds to a second AI signal that is sent to the SCP by the MSC/PCX in response to the second call set-up request signal; sending a second sr signal to the SCP in response to the second SR signal, wherein the SCP sends a second Connect Resource signal to the MSC/PCX in response to the second sr signal; receiving a second call access request signal from the MSC/PCX, wherein the second call access request signal is generated based on the second Connect Resource signal; sending a second call access response signal to the MSC/PCX in response to the second call access request signal, wherein the MSC/PCX sends a second call set-up response signal to the called terminal in response to the second call access response signal; sending a second IR signal to the SCP; receiving a second SRFD signal from the SCP in response to the second IR signal; and sending the voice message to the called terminal using a second call path, which is established with called terminal, in accordance with the second call access response signal and the second call set-up response signal.

In a preferred embodiment, the method further includes the steps of sending a second srfd signal to the SCP; receiving a second it signal from the SCP in response to the second srfd signal; and terminating the second call path.

Furthermore, the method further includes the steps of receiving a wireless Internet access request signal from the calling terminal, wherein the wireless Internet access request signal is generated by inputting a telephone number of the called terminal and pressing a wireless Internet access button in the calling terminal; sending a supplementary service integration screen, including a supplementary service list, to the calling terminal; receiving a voice message call request signal from the calling terminal; and terminating a wireless Internet connection to the calling terminal.

Furthermore, the calling terminal sends the first call set-up request signal to the MSC/PCX using connection number of the service providing apparatus included in a WML or Wireless Internet browser page from the service providing apparatus output from the service providing apparatus, if connection between the service providing apparatus and the wireless Internet is terminated.

Furthermore, the voice message call request signal is generated using a group directory of a wireless Internet, and the service providing apparatus concurrently sends the voice message to a plurality of called parties registered in the group directory.

Furthermore, the first call set-up request signal includes a voice message call feature code and an identifier of the called terminal.

Furthermore, the first call set-up request signal is sent from the calling terminal to the MSC/PCX using at least one of a method using a dedicated key, a method using a mailbox menu and a method using a telephone directory menu.

In a preferred embodiment, the method further includes the steps of sending a guidance message for reply to the called terminal; receiving a response message, which will be sent to the calling terminal, from the called terminal; terminating the second call path; sending a second outbound call request signal to the MSC/PCX for call connection to the calling terminal, wherein the MSC/PCX sends a third call set-up request signal to the calling terminal in response to the second outbound call request signal, and receives a third call set-up response signal in response to the third call set-up request signal; receiving a second outbound call response signal from the MSC/PCX in response to the third call set-up response signal; and sending the response message to the called terminal through a third call path, which is established with the called terminal, in accordance with the third call set-up response signal and the second outbound call response signal.

Furthermore, if reply calling party charge release is previously set by the user of the called terminal, fees for response message transmission are borne by the called terminal.

In a preferred embodiment, the method further includes the steps of sending a guidance message for reply to the called terminal; receiving a response message, which will be sent to the calling terminal, from the called terminal; terminating the second call path; sending a outbound call request signal to the MSC/PCX for call connection to the calling terminal, wherein the MSC/PCX sends a third call set-up request signal to the calling terminal in response to the outbound call request signal, and receives a third call set-up response signal in response to the third call set-up request signal; receiving a second outbound call response signal from the MSC/PCX in response to the third call set-up response signal; and sending the response message to the called terminal through a third call path, which is established with called terminal, in accordance with the third call set-up response signal and the second outbound call response signal.

In a preferred embodiment, the method further includes the steps of receiving a calling party immediate connection request signal from the called terminal; sending a second outbound call request signal to the MSC/PCX for call connection to the calling terminal, wherein the MSC/PCX sends a third call set-up request signal to the calling terminal in response to the second outbound call request signal and receives a third call set-up response signal in response to the third call set-up request signal; and receiving a second outbound call response signal from the MSC/PCX in response to the third call set-up response signal, wherein the calling terminal and the called terminal communicate with each other through the second call path and a third call path, which is established with the called terminal, in accordance with the third call set-up response signal and the second outbound call response signal.

Furthermore, the method further includes the steps of receiving a calling party immediate connection request signal from the called terminal; sending the outbound call request signal to the MSC/PCX for call connection to the calling terminal, wherein the MSC/PCX sends a third call set-up request signal to the calling terminal in response to the outbound call request signal and receives a third call set-up response signal in response the third call set-up request signal; and receiving a outbound call response signal from the MSC/PCX in response to the third call set-up response signal; wherein the calling terminal and the called terminal communicate with each other through the second call path and a third call path, which is established with the called terminal, in accordance with the third call set-up response signal and the outbound call response signal.

In a preferred embodiment, the method further includes the steps of receiving a calling party call request signal from the called terminal; terminating the second call path; sending a second outbound call request signal to the MSC/PCX for call connection to the calling terminal, wherein the MSC/PCX sends a third call set-up request signal to the calling terminal in response to the second outbound call request signal and receives a third call set-up response signal in response to the third call set-up request signal; receiving a second outbound call response signal from the MSC/PCX in response to the third call set-up response signal, and establishing a third call path with the calling terminal; sending a third outbound call request signal to the MSC/PCX for call connection to the called terminal, wherein the MSC/PCX sends a fourth call set-up request signal to the called terminal in response to the third outbound call request signal and receives a fourth call set-up response signal in response to the fourth call set-up request signal; and receiving a third outbound call response signal from the MSC/PCX in response to the fourth call set-up response signal, and establishing a fourth call path with the called terminal, wherein the calling terminal and the called terminal communicate with each other through the third call path and the fourth call path.

Furthermore, the method further includes the steps of receiving a calling party call request signal from the called terminal; terminating the second call path; sending a first outbound call request signal to the MSC/PCX for call connection to the calling terminal, wherein the MSC/PCX sends a third call set-up request signal to the calling terminal in response to the first outbound call request signal and receives a third call set-up response signal in response to the third call set-up request signal; receiving a first outbound call response signal from the MSC/PCX in response to the third call set-up response signal, and establishing a third call path with the calling terminal; sending a second outbound call request signal to the MSC/PCX for call connection to the called terminal, wherein the MSC/PCX sends a fourth call set-up request signal to the called terminal in response to the second outbound call request signal and receives a fourth call set-up response signal in response to the fourth call set-up request signal; and receiving a second outbound call response signal from the MSC/PCX in response to the fourth call set-up response signal, and establishing a fourth call path with the called terminal, wherein the calling terminal and the called terminal communicate with each other through the third call path and the fourth call path.

In a preferred embodiment, the method further includes the steps of sending a called subscriber state request signal for querying the status of the called terminal to the HLR, wherein the HLR is connected to the service providing apparatus; receiving a called subscriber state response signal from an HLR; sending a called subscriber state registration request signal to the HLR if the called terminal is determined not to be in an idle state based on the received called subscriber state response signal; and receiving a called subscriber state report signal from the HLR, wherein the called subscriber state report is generated by registering into the HLR when the called terminal enters the idle state.

In a preferred embodiment, the method further includes the steps of sending a called subscriber state request signal for querying the status of the called terminal to the HLR; receiving a called subscriber state response signal from the HLR; sending a called subscriber state registration request signal to the HLR if the called terminal is determined not to be in an idle state based on the received called subscriber state response signal; and receiving a called subscriber state report signal from the HLR, wherein the called subscriber state report signal is generated by registering into the HLR when the called terminal enters the idle state.

Furthermore, the second call set-up response signal and the first outbound call response signal are an Address Complete Message (ACM) and an Answer Message (ANM), and the ACM includes a backward call indicator indicating status information of the called terminal.

Furthermore, wherein the second call set-up response signal and the first outbound call response signal are an ACM, a Call Progress (CPG) and an ANM, and the service providing apparatus determines that the called terminal is not in an idle state if the CPG is received.

Furthermore, when sending the voice message to the called terminal, the service providing apparatus outputs a nickname or a real name for the user of the calling terminal to the called terminal through a Text To Speech (TTS) server.

Furthermore, the user of the calling terminal gains access to the service providing apparatus using any one of a wireless Internet, a wired Internet and voice call and queries a history of the voice messages sent to the called terminal.

In accordance with another aspect of the present invention, there is provided a service providing apparatus for providing voice message call service, the service providing apparatus being connected to a calling terminal, an MSC/PCX and a called terminal through a mobile communication network, comprising a memory having a program stored therein; and a processor for executing the program in conjunction with the memory; wherein the processor, using the program, receives a call access request signal from the MSC/PCX, wherein the call access request signal corresponds to a first call set-up request signal received from a calling terminal by the MSC/PCX; sends a call access response signal to the MSC/PCX in response to the call access request signal, wherein the MSC/PCX sends a first call set-up response signal to the calling terminal in response to the call access response signal; receives a voice message, which will be transferred to the called terminal, from the calling terminal through a first call path, which is established with the calling terminal, in accordance with the call access response signal and the first call set-up response signal; terminates the first call path; sends a first outbound call request signal to the MSC/PCX for call connection to the called terminal, wherein the MSC/PCX sends a second call set-up request signal to the called terminal in response to the first outbound call request signal and receives a second call set-up response signal in response to the second call set-up request signal; receives a first outbound call response signal from the MSC/PCX in response to the second call set-up response signal; and sends the voice message to the called terminal using a second call path, which is established with the called terminal, in accordance with the second call set-up response signal and the first outbound call response signal.

In accordance with another aspect of the present invention, there is provided a service providing apparatus for providing voice message call service, the service providing apparatus being connected to a calling terminal, an MSC/PCX and a called terminal through a mobile communication network, comprising a memory having a program stored therein; and a processor for executing the program in conjunction with the memory; wherein the processor, using the program, receives a first call access request signal from the MSC/PCXs, wherein the first call access request signal corresponds to a first call set-up request signal received from a calling terminal by the MSC/PCX; sends a first call access response signal to the MSC/PCX in response to the first call access request signal, wherein the MSC/PCX sends a first call set-up response signal to the calling terminal in response to the first call access response signal; receives a voice message, which will be transferred to the called terminal, from the calling terminal through a first call path, which is established with the calling terminal, in accordance with the first call access response signal and the first call set-up response signal; terminates the first call path; sends a callback short message to the called terminal, wherein the called terminal sends a second call set-up request signal to the MSC/PCX for call connection to the service providing apparatus using the callback short message; receives a second call access request signal from the MSC/PCX using the service providing apparatus to correspond to the second call set-up request signal; sends a second call access response signal to the MSC/PCX in response to the second call access request signal, wherein the MSC/PCX sends a second call set-up response signal to the called terminal in response to the second call access response signal; and sends the voice message to the called terminal through a second call path, which is established with the calling terminal, in accordance with the second call access response signal and the second call set-up response signal.

In accordance with another aspect of the present invention, there is provided a service providing apparatus for providing voice message call service, the service providing apparatus being connected to a calling terminal, an MSC/PCX, an HLR, an SCP and a called terminal through a mobile communication network, comprising a memory having a program stored therein; and a processor for executing the program in conjunction with the memory; wherein the processor, using the program, receives a first SR signal from the SCP, wherein the first SR signal corresponds to an Analyzed Information (AI) signal, which is sent to the SCP in response to a featreq signal received in response to a Feature Request (FEATREQ) signal, the MSC/PCX receiving a first call set-up request signal from the calling terminal and sending the FEATREQ signal to the HLR; sends a first sr signal to the SCP in response to the first SR signal, wherein the SCP sends a first Connect Resource signal to the MSC/PCX in response to the first sr signal; receives a first call access request signal from the MSC/PCX, wherein the first call access request signal is generated based on the first Connect Resource signal; sends first call access response signal to the MSC/PCX in response to the first call access request signal, wherein the MSC/PCX sends a first call set-up response signal to the calling terminal in response to the first call access response signal; sends a first Instruction Request (IR) signal to the SCP; receives a first Specialized Resource Function Directive (SRFD) signal from the SCP in accordance with the first IR signal; receives a voice message, which will be transferred to the called terminal, from the calling terminal through a first call path, which is established with the calling terminal, in accordance with the first call access response signal and the first call set-up response signal; sends a first srfd signal to the SCP; receives a first it signal from the SCP in response to the first SRFD signal; terminates the first call path; sends a voice message call request signal to the SCP for call connection to the called terminal, wherein the SCP sends a first outbound call request signal to the MSC/PCX, and the MSC/PCX sends a second call set-up request signal to the called terminal, receives a second call set-up response signal, and sends a first outbound call response signal to the SCP in response to the second call set-up response signal; receives a second SR signal from the SCP in response to the first outbound call response signal; sends a second sr signal to the SCP in response to the second SR signal, wherein the SCP sends a second Connect Resource signal to the MSC/PCX in response to the second sr signal; receives a second call access request signal from the MSC/PCX, wherein the second call access request signal is generated based on the second Connect Resource signal; sends a second call access response signal to the MSC/PCX in response to the second call access request signal; sends a second IR signal to the SCP; receives a second SRFD signal from the SCP in response to the second IR signal; and sends the voice message to the called terminal using a second call path, which is established with the called terminal, in accordance with the second call access response signal and the second call set-up response signal.

In accordance with another aspect of the present invention, there is provided a service providing apparatus for providing voice message call service, the service providing apparatus being connected to a calling terminal, an MSC/PCX, an HLR, an SCP and a called terminal through a mobile communication network, comprising a memory having a program stored therein; and a processor for executing the program in conjunction with the memory; wherein the processor, using the program, receives an SR signal from the SCP, wherein the first SR signal corresponds to an Analyzed Information (AI) signal, which is sent to the SCP in response to a featreq signal received in response to a FEATREQ, the MSC/PCX receiving a first call set-up request signal from the calling terminal and sending the FEATREQ signal to the HLR; sends a first sr signal to the SCP in response to the first SR signal, wherein the SCP sends a first Connect Resource signal to the MSC/PCX in response to the first sr signal; receives a first call access request signal from the MSC/PCX, wherein the first call access request signal is generated based on the first Connect Resource signal; sends a first call access response signal to the MSC/PCX in response to the first call access request signal, wherein the MSC/PCX sends a first call set-up response signal to the calling terminal in response to the first call access response signal; sends a first IR signal to the SCP; receives a first SRFD signal from the SCP in response to the first IR signal; receives a voice message, which will be transferred to the called terminal, from the calling terminal through a first call path, which is established with the calling terminal, in accordance with the first call access response signal and the first call set-up response signal; sends a first srfd signal from the service providing apparatus to the SCP; receives a first it signal from the SCP in response to the first SRFD signal; terminates the first call path; sends a callback short message to the called terminal, wherein the called terminal sends a second call set-up request signal to the MSC/PCX for call connection to the service providing apparatus using the callback short message; receives a second SR signal from the SCP, wherein the second SR signal corresponds to a second AI signal that is sent to the SCP by the MSC/PCX in response to the second call set-up request signal; sends a second sr signal to the SCP in response to the second SR signal, wherein the SCP sends a second Connect Resource signal to the MSC/PCX in response to the second sr signal; receives a second call access request signal from the MSC/PCX, wherein the second call access request signal is generated based on the second Connect Resource signal; sends a second call access response signal to the MSC/PCX in response to the second call access request signal, wherein the MSC/PCX sends a second call set-up response signal to the called terminal in response to the second call access response signal; sends a second IR signal to the SCP; receiving a second SRFD signal from the SCP in response to the second IR signal; and sends the voice message to the called terminal using a second call path, which is established with the called terminal, in accordance with the second call access response signal and the second call set-up response signal.

In accordance with present invention, there is provided a voice message call service method and apparatus in which a subscriber can send a voice message to a called subscriber without directly communicating with the called subscriber or a number of members belonging to a group.

In accordance with the preset invention, a voice message can be sent using the menu or shortcut key of a portable terminal, and a Wireless Internet Number Contents (WINC) method using a wireless Internet access key as well as a typical communication method using an existing special code, a called number and a call button, using a service providing apparatus.

In accordance with the preset invention, a called subscriber can store a voice message received through a voice message call in a VMS and repeatedly listen to the voice message.

In accordance with the preset invention, a called party can listen to a voice message received from a calling party, and then immediately leave a voice message for the calling party, or immediately communicate with the calling party or call the calling party. At this time, the calling party or the called party can bear expenses.

In accordance with the preset invention, there is provided the message (sent message/received message) history management and subscriber management function of a voice message call using wireless Internet page (WAP/ME), a wired Internet page (Web) and an IVR.

In accordance with the preset invention, there is an advantage in that a voice message call service apparatus can be constructed based a Service Node (SN) method or IN (Intelligent Network) method using a service providing apparatus depending on a service provider's network.

In accordance with the present invention, the status of a called subscriber terminal can be examined using a Home Location Register (HLR)/a Service Control Point (SCP), or SS7 ISUP signal method. If the status of the called subscriber is not an idle state, a voice message call retry process can be performed according to the scheduling of a service providing apparatus in accordance with the present invention.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 29 is a view illustrating an example of an Internet screen for querying a voice message call history, in accordance with a preferred embodiment of the present invention;

FIG. 30 is a view illustrating an example of an Internet screen for managing received voice messages, in accordance with a preferred embodiment of the present invention;

FIG. 31 is a view illustrating an example of an Internet screen for managing a voice message call group directory, in accordance with a preferred embodiment of the present invention;

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1:
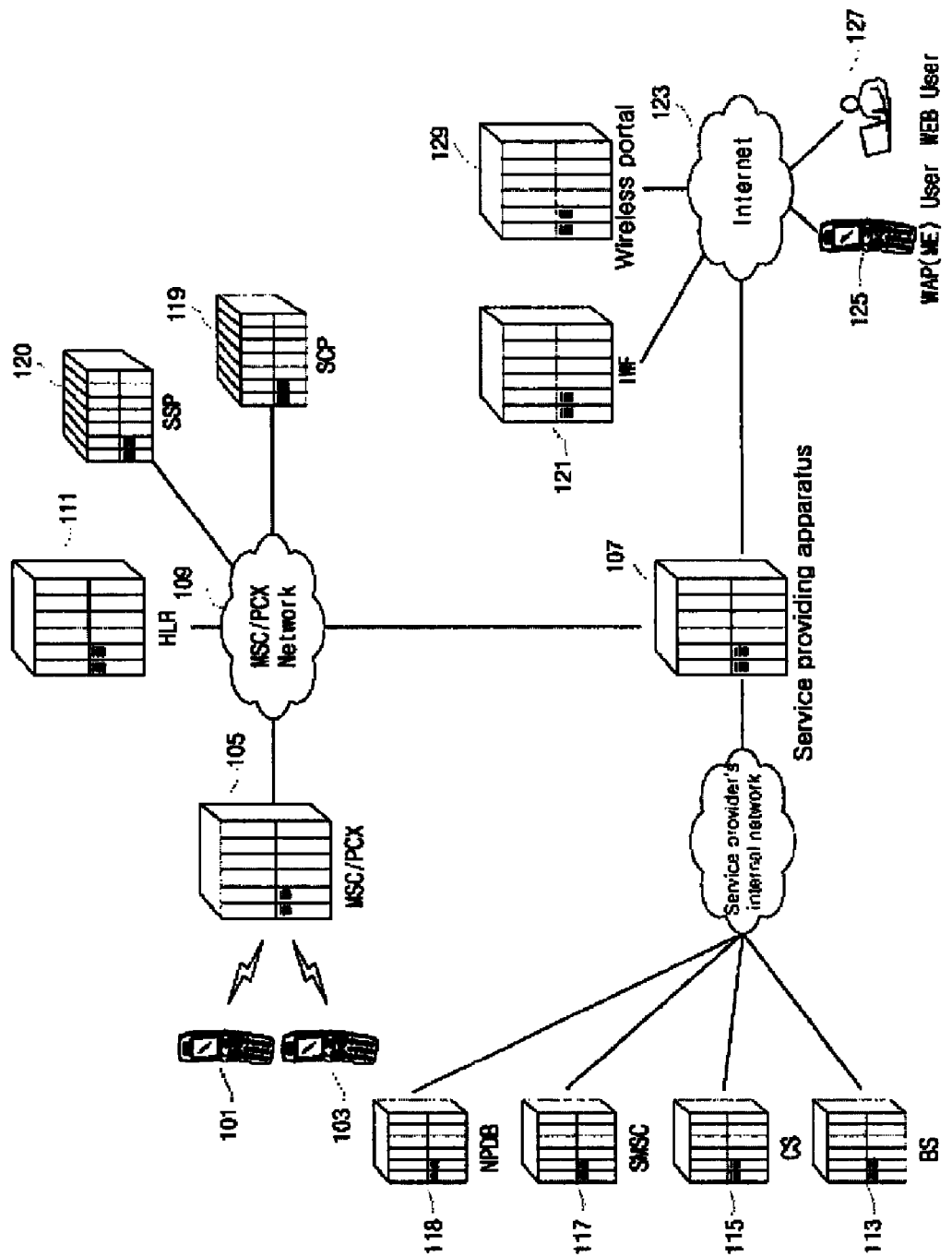
FIG. 1 is a view schematically showing the construction of an apparatus for providing voice message call service, in accordance with a preferred embodiment of the present invention.

FIG. 1 is a view schematically showing the construction of an apparatus for providing voice message call service according to a preferred embodiment of the present invention. The term "voice message call service" refers to service in which a calling subscriber sends a voice message to a called subscriber without direct telephone communication.

Referring to FIG. 1, the apparatus of the present invention includes a calling terminal 101, a called terminal 103, an MSC/PCX 105, a service providing apparatus 107, an MSC/PCX network 109, a Home Location Register (HLR) 111, a Service Control Point (SCP) 119, a Billing System (BS) 113, a Customer Care System (CS) 115, a Short Message Service Center (SMSC) 117, a Number Portability DataBase (NPDB) 118, an Inter-Working Function (IWF) 121 and a wireless portal 129.

The calling terminal 101 and the called terminal 103 are terminals for mobile communication, refer to terminals for voice and data communication in a Global System for Mobile communications (GSM)/Code-Division Multiple Access (CDMA) mobile communication network, and refer to terminals for voice and data communication between a calling party and a called party in the apparatus of the present invention. Although not shown in the drawing, the called terminal 103 can include not only a mobile communication terminal but also a wired terminal connected to a wired network (for example, Public Switched Telephone Network (PSTN) or Voice over Internet Protocol (VoIP) communication network). The MSC/PCX 105 refers to an exchange provided by a mobile communication network, and functions to route the call of a subscriber who originates a telephone call to the service providing apparatus 107 and establish a communication path.

The service providing apparatus 107 provides an integrated channel menu screen to a subscriber over the wireless Internet. That is, when a subscriber presses a counterpart's telephone number+a wireless Internet access button (e.g., a hot key such as Magic-n, NATE or EZ-I) using the calling terminal 101, the integrated screen, through which various types of communication with the called terminal 103 are possible over the wireless Internet, is displayed on the screen of the calling terminal 101. Furthermore, the service providing apparatus 107 performs call processing for supplementary voice service of voice message call while operating in conjunction with the MSC/PCX 105 through E1/T1. Furthermore, the service providing apparatus 107 stores and manages data, such as subscriber information and voice message information. The service providing apparatus 107 also performs functions of SMS transmission, billing, subscriber registration/authentication, and subscriber number transfer while operating while operating in conjunction with the SMSC 117, the BS 113, the CS 115 and the NPDB 118, which are possessed by a service provider, through a service provider's internal network. Furthermore, the service providing apparatus 107 converts the name (customer's name) or telephone number of a calling subscriber or a called subscriber from text into speech, and then informs the called subscriber or the called subscriber of the name through speech, when providing voice message call service.

The MSC/PCX network 109 includes a Signal Transfer Point (STP) 109, and the STP functions to relay all signals between the MSC/PCX 105, the HLR 111, the UCS-IP server of the service providing apparatus and the SCP 119 in No. 7 signal form.

The SCP 119 is an element for performing a core function for intelligent network service, and includes programs and subscriber data that are required for service control. The SCP 119 functions to receive a request signal from a Service Switching Point (SSP) 120, check whether a call is appropriate, and send service-related content to a Service Management System (SMS) (not shown). The SCP 119 is an element required when voice message call service is performed over an intelligent network, and includes a logic for processing the voice message call service. The SCP 119 also processes voice message call service while operating in conjunction with the service providing apparatus 107.

The IWF 121 functions to connect the subscriber of a mobile phone from a mobile communication network to the Internet. Since the calling terminal 101 must gain access to the wireless Internet for the calling terminal 101 to gain access to a voice communication menu screen through the Wireless Internet Number Contents (WINC) method, the calling terminal 101 gains access to the service providing apparatus 107 through the IWF 121 and the Internet 123. Meanwhile, a user can gain access to the service providing apparatus 107 through the Internet 123 using the WAP (ME) 125, the Web 127 or a wireless portal 129. Through such Internet access, the user can subscribe to service and check service information.

Figure 2:
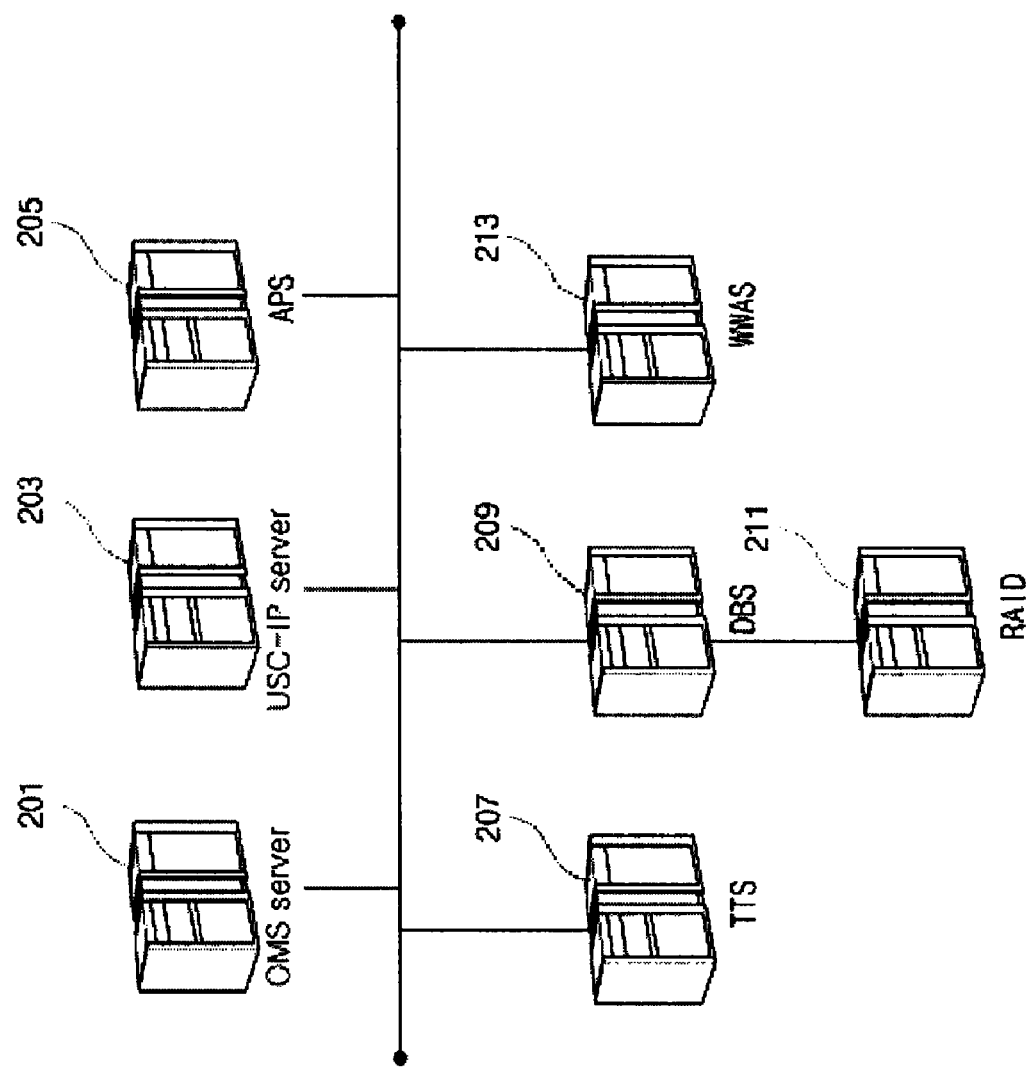
FIG. 2 is a view showing the internal construction of a service providing apparatus according to a preferred embodiment of the present invention.

FIG. 2 is a view showing the internal construction of the service providing apparatus according to a preferred embodiment of the present invention.

Referring to FIG. 2, the service providing apparatus includes an Operation Administration and Management Server (OA&M Server, OMS) 201, a Unified Communication System (USC)-IP server 203, an Application Plus Server (APS) 205, a Text To Speech (TTS) server 207, a DataBase Server (DBS) 209, a Redundant Array of Independent Disks (RAID) System 211 and a Web/WAP Application Server (WWAS) 213.

The OMS 201 is a device capable of operating and managing the service providing apparatus of the present invention.

The UCS-IP server 203 performs a call processing function for the voice message call service while operating in conjunction with the MSC/PCX of the mobile communication network via E1/T1. The UCS-IP server 203 includes an E1/T1 voice processing device and an SS7 signal processing device. The E1/T1 processing device is connected to the MSC/PCX via physical E1/T1, and operates in conjunction with the MSC/PCX for voice and signals. The signal processing device processes a call processing signal, such as R2, PRI or SS7, that is received from the E1/T1 processing device, and sends the call processing signal to the MSC/PCX through the E1/T1 processing device.

The APS 205 performs functions of SMS transmission, billing, subscriber registration/authentication, and subscriber number transfer processing while operating in conjunction with the SMSC, the BS, the CS and the NPDB system that are possessed by the service provider for this service.

When providing the voice message call service according to the present invention, the TTS server 207 functions to convert the name or nickname (an alias name) of a calling subscriber or a called subscriber from text into speech, and provide the name (or nickname) of the calling subscriber through speech when a voice message call is received and heard.

The DBS 209 is a device for storing and managing data, such as subscriber information and voice message information, that are used in the present apparatus. The RAID 211 is an apparatus for redundantly storing the same important data in various storage devices. When the RAID 211 is used, data Input/Output (I/O) can be balanced and overlapped, thereby improving the overall performance of the system.

The WWAS 213 provides a subscriber with the integrated channel menu screen through the wired or wireless Internet. That is, when a subscriber inputs a counterpart's telephone number and presses a wireless Internet access button (e.g., a hot key such as Magic-n, NATE or EZ-I), the subscriber is connected to the WWAS 213. The WWAS 213 shows channels through which various communications are possible to the subscriber. Upon access over the wired Internet, the WWAS 213 shows subscriber service contents, a subscription screen, voice message contents, directory management and service profiles for the apparatus of the present invention.

Figure 3:
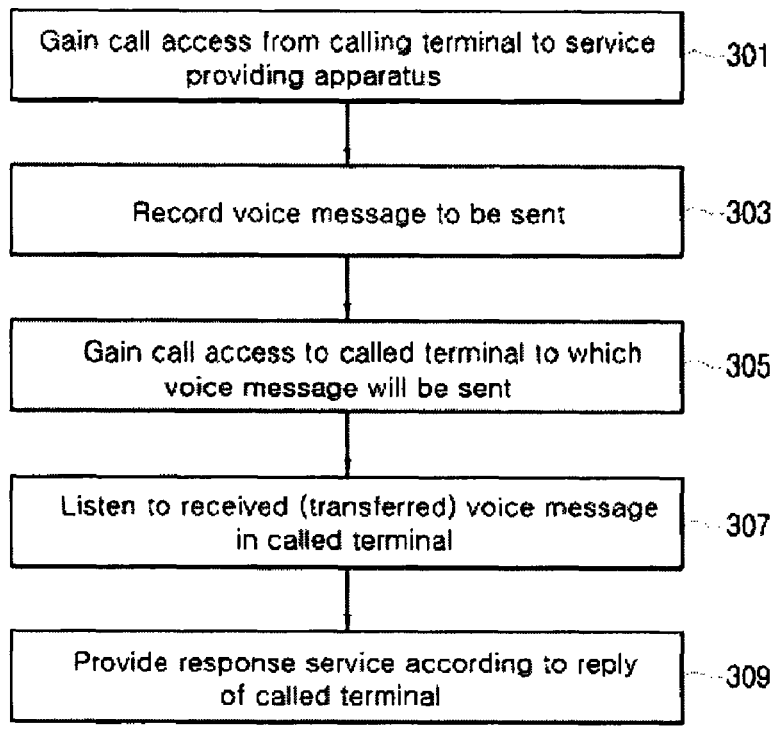
FIG. 3 is a flowchart schematically illustrating a method of providing voice message call service, in accordance with a preferred embodiment of the present invention.

FIG. 3 is a flowchart schematically illustrating a method of providing voice message call service according to a preferred embodiment of the present invention.

Referring to FIG. 3, the calling terminal gains call access to the service providing apparatus to record a voice message to be sent to the called terminal at step 301. Access methods using the voice message call service according to the present invention can be mainly classified into three types. The first one is a method of using the wireless Internet key of a mobile phone after pressing a called number. The second one is a method of pressing a call button after a subscriber pressing a feature code and a called number, that is, the telephone number of the called terminal, as in an existing voice communication method. The third one is a method using the menu of a mobile phone terminal or a dedicated key. The third method is based on a concept using the shortcut key of the mobile phone terminal, and is the same as the second method in terms of the signal flow of the mobile communication network. The first, second and third access methods are described in detail with reference to FIG. 4, FIG. 5, and FIGS. 6 to 8, respectively.

The calling terminal gains access to the service providing apparatus, and then records a voice message to be sent to the called terminal in compliance with the guidance message of the service providing apparatus, at step 303.

Thereafter, the service providing apparatus gains access to the called terminal in order to send the voice message to the called terminal at step 305. The method of the service providing apparatus gaining access to the called terminal can mainly include a method using an Service Node (SN) and a method using an intelligent network. Furthermore, each of the two methods includes a method of making an outbound call to the called terminal, and a method of sending a callback short message to the called terminal and then receiving a callback from the called terminal.

When call access is completed between the service providing apparatus and the called terminal, the called subscriber can listen to a voice message, which is received from the calling subscriber, through the service providing apparatus at step 307.

Thereafter, in the case where the user of the called terminal checks the voice message and then makes a reply in compliance with a guidance message, which is provided by the service providing apparatus, to make a reply to the voice message call, the service providing apparatus provides reply service corresponding to the reply at step 309. The types of the reply service include a voice message call reply service, an immediate connection service, and a calling party call service. These reply services are described in detail with reference to FIGS. 14 to 16.

Figure 4:
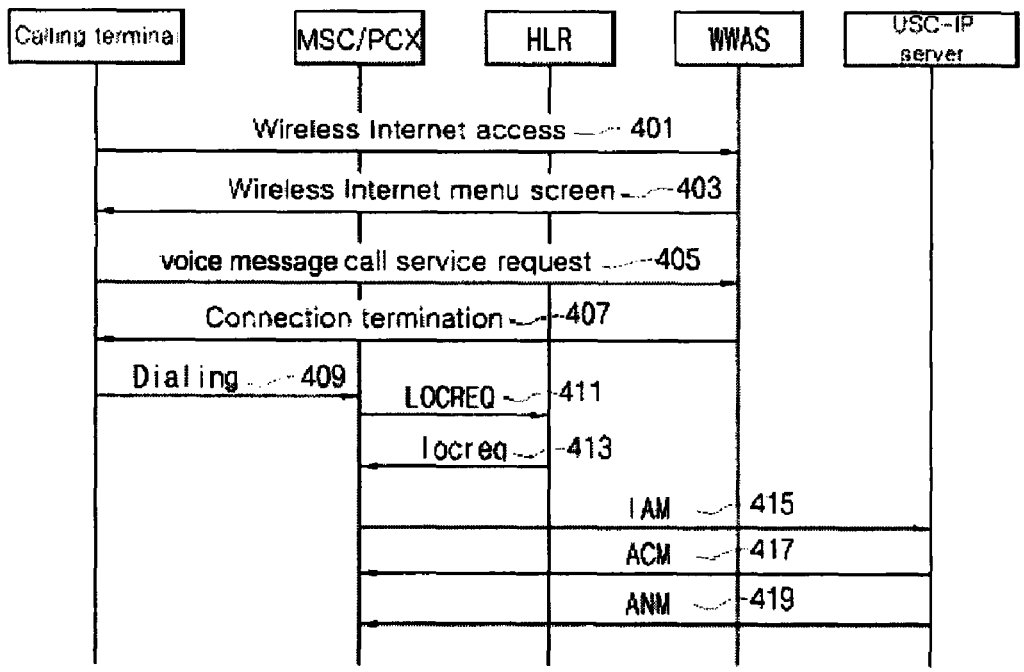
FIG. 4 is a signal flowchart illustrating a procedure in which a calling terminal gains access to the service providing apparatus using a wireless Internet key, in accordance with a preferred embodiment of the present invention.

FIG. 4 is a signal flowchart illustrating a procedure for gaining access to the service providing apparatus from the calling terminal using a wireless Internet key according to a preferred embodiment of the present invention.

The present embodiment illustrates a method of using the wireless Internet key of the mobile phone after pressing the number of the called terminal, in which a calling subscriber selects the voice message call service menu from a WINC-type wireless Internet page and a call regarding the voice message call is routed to corresponding service apparatus. The term "WINC" refers to a process of searching Internet sites using a method of inputting numbers corresponding to English characters on a mobile terminal keyboard, instead of the English characters. For example, in the case where the website of the Ministry of Information and Communication is sought, if "642", instead of MIC, that is, the initials of the Ministry of Information and Communication, is input, about twenty seven websites, including the website of the Ministry of Information and Communication, are displayed. At this time, the website of the Ministry of Information and Communication is selected. Meanwhile, the procedure of the present embodiment can vary according to the internal network or service procedure of a service provider.

Referring to FIG. 4, the telephone number and wireless Internet access button (e.g., a Magic-n key, or an EZ-i key) of the called terminal are entered on the calling terminal by the calling subscriber, and the calling terminal gains access to the WWAS of the service providing apparatus through a WINC method, at step 401. The WWAS of the service providing apparatus outputs a wireless Internet page, through which a functional call with the called terminal is made possible, to the calling subscriber at step 403. In this case, the wireless Internet page can include respective menus for the supplementary voice service. At this time, each menu includes a telephone number, through which a call can be made to the service providing apparatus, in WML or ME code form. For example, a voice message call service menu can include Tel Tag corresponding to a feature code (* or #66)+a called number. In this case, the feature code (* or #66) can vary according to service provider.

The calling terminal receives the voice message call service menu from the calling subscriber, and sends a voice message call request signal to the WWAS at step 405. The WWAS terminates a current connection with the wireless Internet because it must receive a voice message from the calling terminal for the voice message call service at step 407.

The calling terminal sends a call set-up request signal to the MSC/PCX for a call connection to the service providing apparatus in order to leave the voice message of the voice message call at step 409. The call connection number that is used to call the UCS-IP server of the service providing apparatus was included in the WML or ME page output from the WWAS. The MSC/PCX sends a call routing request signal (LOCREQ) to the HLR at step 411, and receives a call routing response signal (locreq), including information for routing to the UCS-IP server of the service providing apparatus, at step 413.

The MSC/PCX sends an Initial Address Message (IAM), that is, a call access request signal, to the UCS-IP server based on the routing information at step 415. The UCS-IP server sends an ACM and an Answer Message (ANM), that is, call access response signals, to the MSC/PCX at steps 417 and 419.

Figure 5:
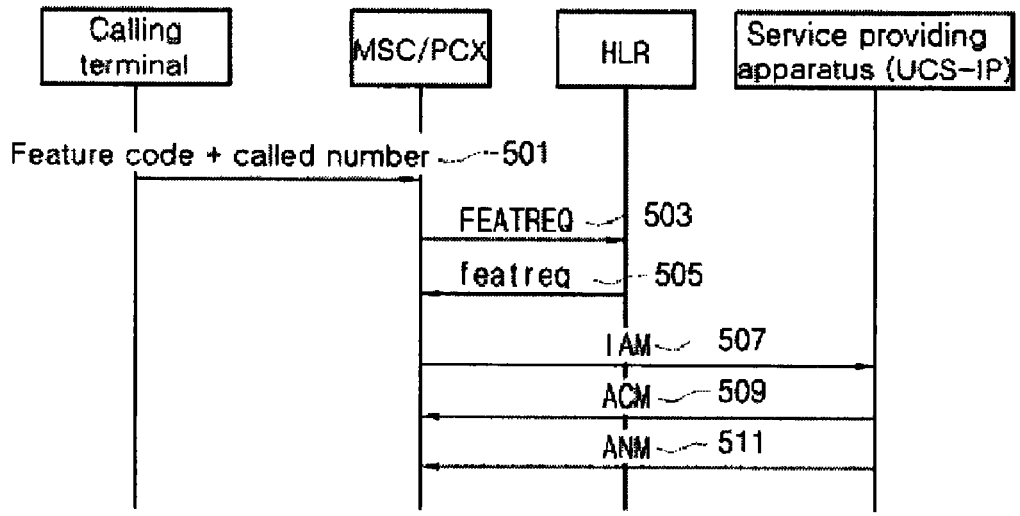
FIG. 5 is a signal flowchart illustrating a procedure in which the calling terminal gains access to the service providing apparatus using a feature code, in accordance with a preferred embodiment of the present invention.

FIG. 5 is a signal flowchart illustrating a procedure in which the calling terminal gains access to the service providing apparatus using a feature code, in accordance with a preferred embodiment of the present invention.

Referring to FIG. 5, the calling terminal receives a feature code corresponding to the voice message call service and the telephone number of the called terminal from a user, and sends a call set-up request signal, including the feature code and the called terminal telephone number, to the MSC/PCX, at step 501. The MSC/PCX determines that the received call set-up request signal includes the feature code, and sends a feature request signal (FEATREQ) to the HLR at step 503. In this case, the feature request signal is a signal requesting routing address information corresponding to the feature code. The HLR checks the service feature of the calling subscriber, and sends a feature response signal (featreq), with routing address information corresponding to the corresponding feature code, i.e., the routing address of the UCS-IP server, being carried thereon, at step 507.

The MSC/PCX sends the IAM to the UCS-IP server of the service providing apparatus based on the feature response signal at step 507. In this case, the IAM contains a called terminal identifier (a telephone number) and a calling terminal identifier (a telephone number). The UCS-IP server of the service providing apparatus sends the ACM and the ANM to the MSC/PCX in response to the IAM at steps 509 and 511. Meanwhile, the user of the calling terminal can send the call set-up request signal to the MSC/PCX using the menu of the terminal or the dedicated key, without directly inputting the feature code. This method is described with reference to FIGS. 6 to 8.

Figure 6:
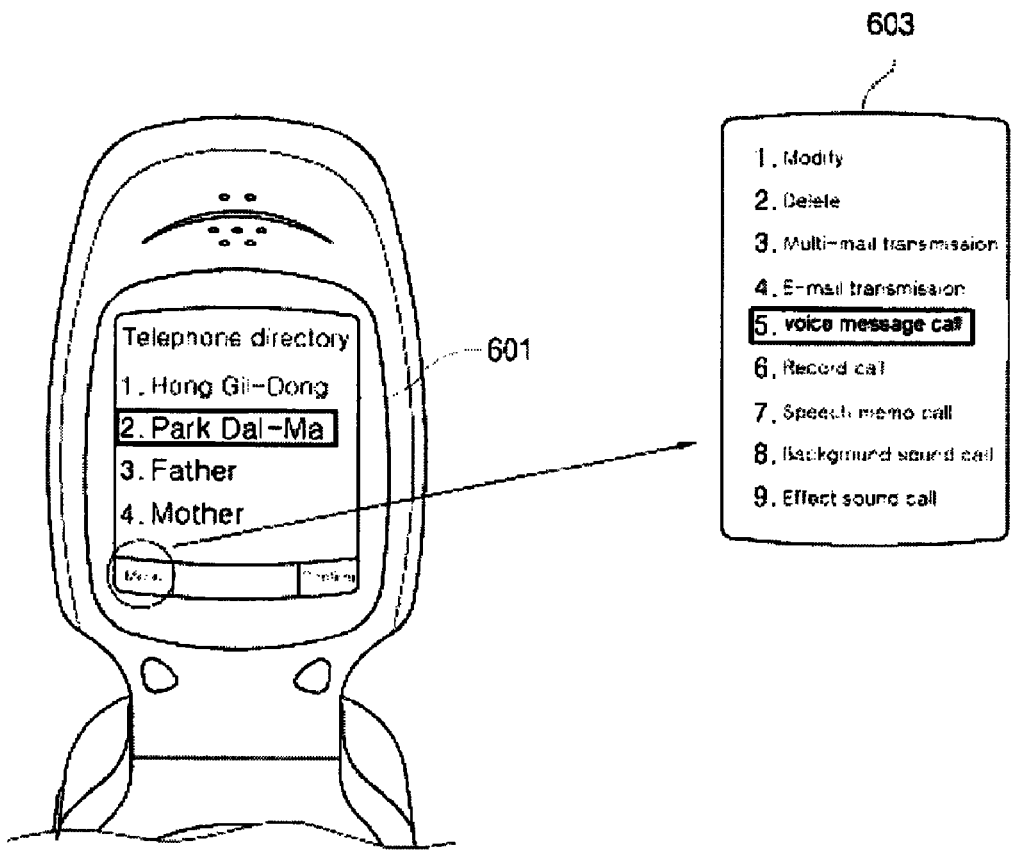
FIG. 6 is a view illustrating a method of providing voice message call service by modifying the telephone directory menu of a calling terminal, in accordance with a preferred embodiment of the present invention.

FIG. 6 is a view illustrating a method of providing voice message call service by modifying the telephone directory menu of a calling terminal, in accordance with a preferred embodiment of the present invention.

Referring to FIG. 6, in order to gain direct access to the service providing apparatus, by adding a service menu according to the present invention to the telephone directory menu of the calling terminal, it is possible to directly attempt a call to the MSC/PCX without needing to gain access to the menu of the wireless Internet. When, in the telephone directory of the mobile phone terminal, a predetermined number or name is selected from a telephone directory screen 601 using menu item "search by name", "search by number", "search by shortcut number", "search by voice", "search by group", "search by time", etc. and a menu button is then pressed, the terminal displays a modified menu screen 603 on the display unit thereof. On the modified menu screen 603, "1. Modify", "2. Delete", "3. Multi-mail transmission", "4. E-mail transmission" are existing menu items, and "5. Voice message call", "6. Record call", "7. Speech memo call", "8. Background sound call" and "9. Effect sound call" are newly added menu items. If the menu item "Voice message call" is selected on the modified menu screen 603 of the telephone directory of the calling terminal, the terminal adds a feature code corresponding to a voice message call in front of the called party's telephone number from the telephone directory. That is, if the menu item "voice message call" is selected, the mobile phone terminal attempts a call by sending a voice message call feature code (e.g., or #66)+the telephone number of the called terminal to the MSC/PCX.

Figure 7:
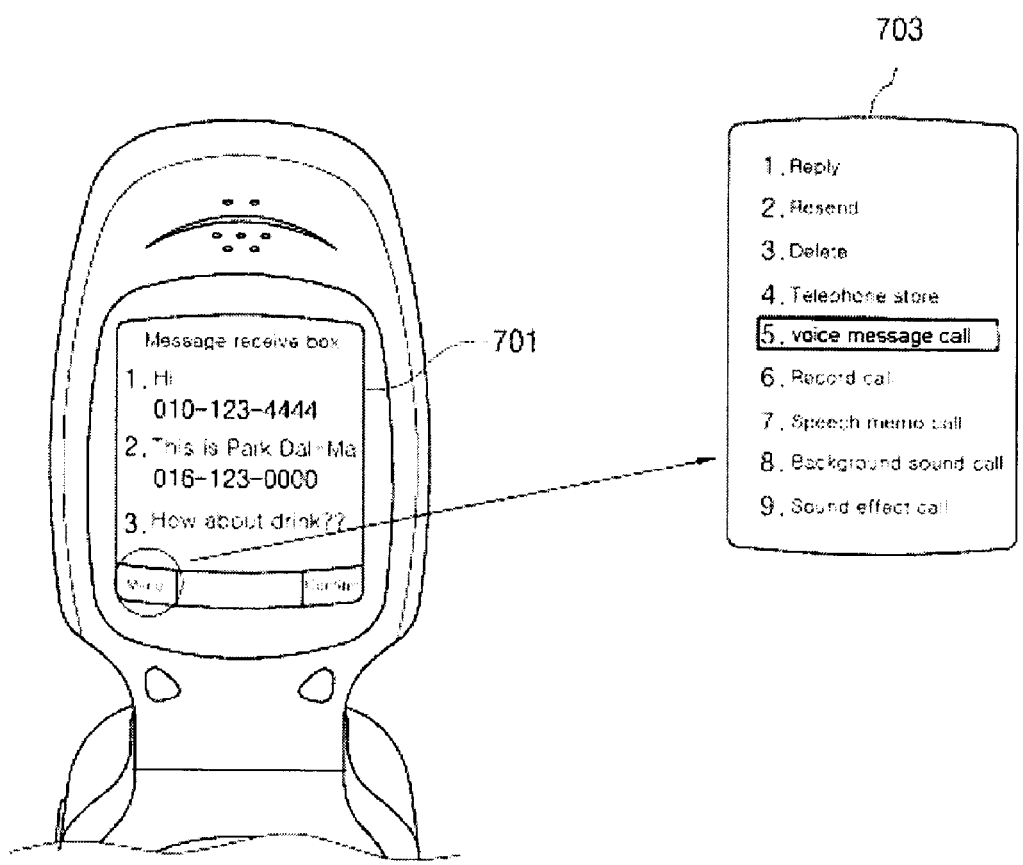
FIG. 7 is a view illustrating a method of providing voice message call service by modifying the message box menu of a calling terminal, in accordance with a preferred embodiment of the present invention.

FIG. 7 is a view illustrating a method of providing voice message call service by modifying the message box menu of a calling terminal, in accordance with to a preferred embodiment of the present invention.

Referring to FIG. 7, in order to gain direct access to the service providing apparatus, by adding a service menu according to the present invention to the message box menu of the calling terminal, it is possible to directly attempt a call to the MSC/PCX.

If a menu button is pressed on the received message box screen 701 of the calling terminal, the calling terminal displays a modified menu screen 703 on the display unit thereof. On the modified menu screen 703, "1. Reply", "2. Resend", "3. Delete" and "4. Store telephone number" are existing menu items, and "5. Voice message call", "6. Record call", "7. Voice memo call", "8. Background sound call" and "9. Sound effect call" are newly added menu items. When the menu item "Voice message call" is selected on the modified menu screen 703, the calling terminal adds a feature code corresponding to a voice message call in front of the telephone number of the called terminal, which is included in a short message. That is, when the menu item "voice message call" is selected, the mobile phone terminal attempts a call by sending a voice message call feature code (e.g., * or #66)+the telephone number of the called terminal to the MSC/PCX.

Figure 8:
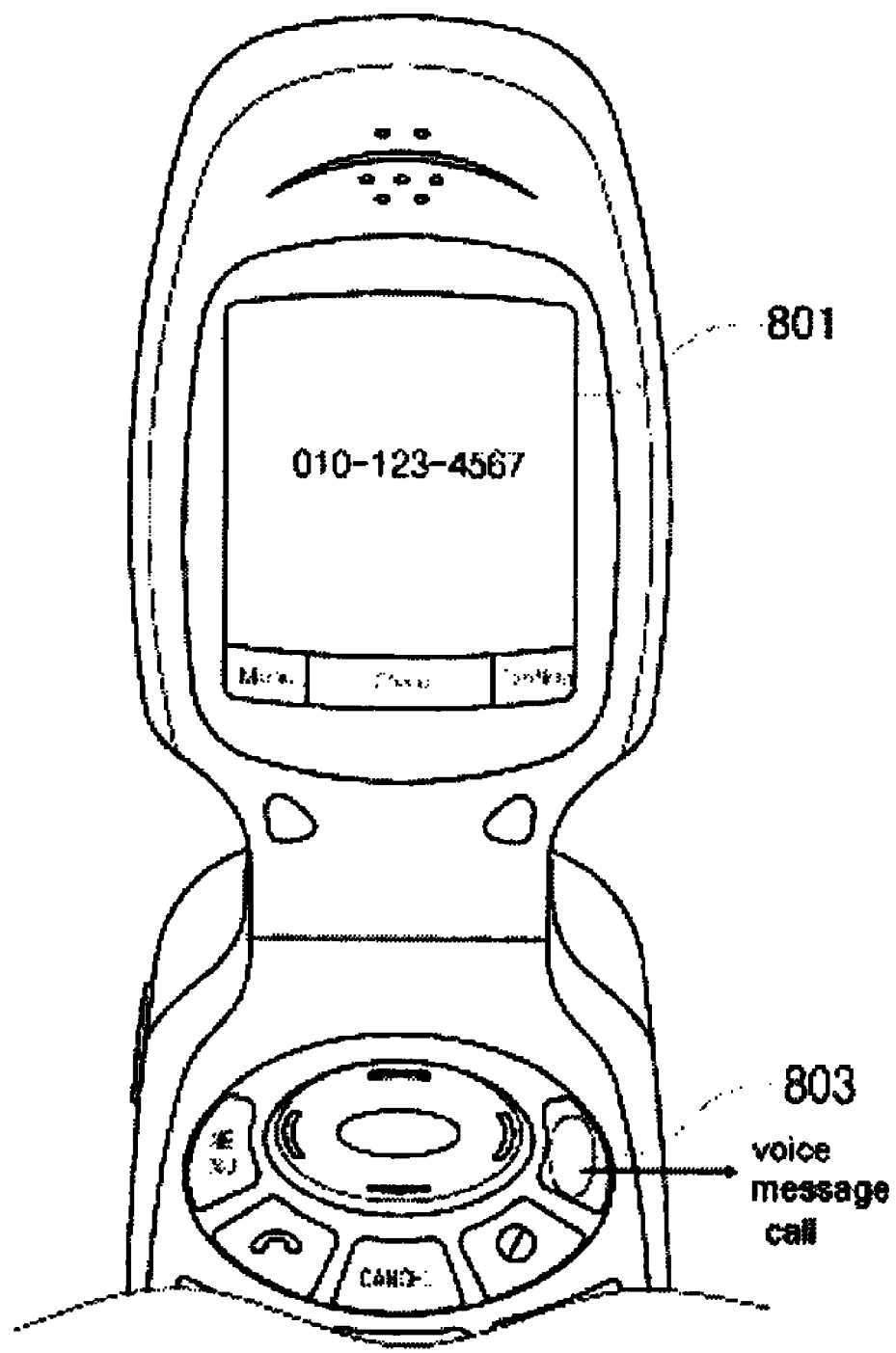
FIG. 8 is a view illustrating a method of providing voice message call service using the dedicated key of a calling terminal, in accordance with a preferred embodiment of the present invention.

FIG. 8 is a view illustrating a method of providing voice message call service using the dedicated key of a calling terminal, in accordance with a preferred embodiment of the present invention.

Referring to FIG. 8, by newly adding a dedicated key (a hot key) to the calling terminal, a calling subscriber can directly attempt a call to the MSC/PCX without needing to gain access to the menu of the wireless Internet in such a way as to input the telephone number of the called subscriber and press the dedicated key. This method is a method of adding the dedicated key for the voice message call service to the calling terminal. If a dedicated key button 803 is pressed after the telephone number of a called terminal has been input (refer to reference numeral 801), the calling terminal adds a feature code corresponding to a voice message call in front of the telephone number of the called terminal. That is, if the telephone number of the called terminal is input and the dedicated key button 803 is pressed, the calling terminal attempts a call by sending a voice message call feature code (for example, or #66)+the telephone number of the called terminal to the MSC/PCX.

Figure 9:
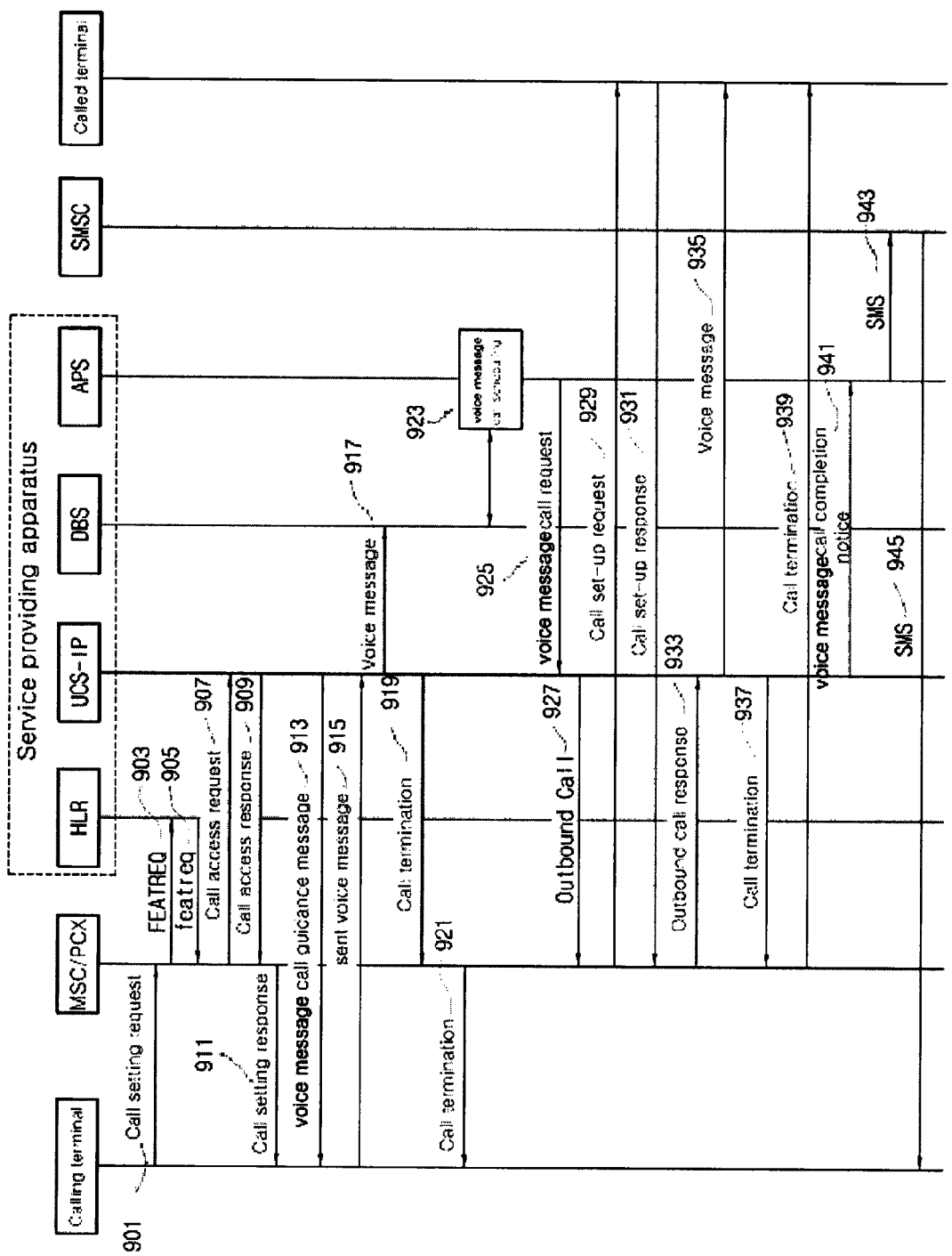
FIG. 9 is a signal flowchart illustrating a procedure for providing voice message call service through an outbound call, in accordance with a preferred embodiment of the present invention.

FIG. 9 is a signal flowchart illustrating a procedure for providing voice message call service through an outbound call, in accordance with a preferred embodiment of the present invention. This drawing shows the procedure in which the calling terminal attempts a voice message call using an Service Node (SN) method. In this case, the UCS-IP server of the service providing apparatus is constructed in SN form. The UCS-IP server receives the voice message of the subscriber, directly processes an outbound call, and then transfers the voice message of the voice message call to the called terminal. The procedure can vary according to the internal network or service procedure of a service provider.

Referring to FIG. 9, the calling terminal first sends a call set-up request signal, including a feature code and the telephone number of the called terminal, to the MSC/PCX at step 901. The MSC/PCX receives the call set-up request signal and sends a Feature Request (FEATREQ) signal to the HLR at step 903. The HLR sends a featreq signal, including information about routing to the service providing apparatus, to the MSC/PCX in response to the FEATREQ signal at step 905. The MSC/PCX sends a call access request signal to the UCS-IP server of the service providing apparatus based on the routing information at step 907. The UCS-IP server sends a call access response signal to the MSC/PCX in response to the call access request signal at step 909. The MSC/PCX sends a call set-up response signal to the calling terminal at step 911.

A call path is established between the UCS-IP server of the service providing apparatus and the calling terminal through steps 901 to 911. The UCS-IP server sends a voice message call guidance message to the calling terminal at step 913. An example of the voice message call guidance message can include "This is a voice message call provided by KTF (SKT/LGT). Please start recording after the "beep" sound, and press * or # after recording. Beep." The calling terminal records a voice message, which will be sent from a user to the called terminal, through the UCS-IP server at step 915. At this time, the UCS-IP server can send a guidance message, such as "We will send a message. Thank you for using the service," to the calling terminal after recording.

The UCS-IP server sends voice message call information (the telephone number of the calling terminal, the telephone number of the called terminal and time information, etc.) which was left by the calling subscriber, and the voice message to the APS server and the DBS at step 917. Thereafter, the UCS-IP server sends a call termination signal to the MSC/PCX so as to terminate the call with the calling terminal at step 919. The MSC/PCX sends the call termination signal to the calling terminal at step 921.

The APS server of the service providing apparatus schedules the voice message call service and fetches data from the DBS, in order to send data, which are stored by the calling subscriber, to the called subscriber at step 923. At this time, dialing-out is performed immediately after the calling terminal has left the voice message. If the called terminal does not answer a call, an attempt has to be made again, so that it is necessary to internally calculate a call to be outbound, a time, etc.

The APS server sends a voice message call request signal to the UCS-IP server at step 925. The UCS-IP server attempts an outbound call to the MSC/PCX connected through E1 or T1 at step 927. The MSC/PCX sends a call set-up request signal to the called terminal at step 929, and then receives a call set-up response signal in response thereto at step 931. The MSC/PCX sends an outbound call response signal to the UCS-IP server in response to the call set-up response signal at step 933, so that a call path is established between the UCS-IP server of the service providing apparatus and the called terminal.

The UCS-IP server fetches the voice message, which was left by the calling subscriber and stored in the DBS, and sends the fetched voice message to the called terminal using the call path at step 935. The UCS-IP server plays the voice message and sends a call termination request signal to the MSC/PCX at step 937. The MSC/PCX sends the call termination request signal to the called terminal at step 939, so that the call path between the service providing apparatus and the called terminal is terminated. At this time, the called customer can make a reply to the voice message call without terminating the call after listening to the voice message call received from a calling party. The response process to the voice message call is described with reference to FIGS. 14 to 16.

The UCS-IP server sends a voice message call completion notice, indicating that the voice message call has been completely sent to the called terminal, to the APS at step 941. The APS sends a short message, stating "The voice message call has been completely sent to a called party's telephone number or name," to the SMSC at step 943. The SMSC sends the short message to the calling terminal at step 945. Although not shown in the drawing, the APS server sends CDR Data to the BD for billing after the provision of the corresponding service.

Figure 10:
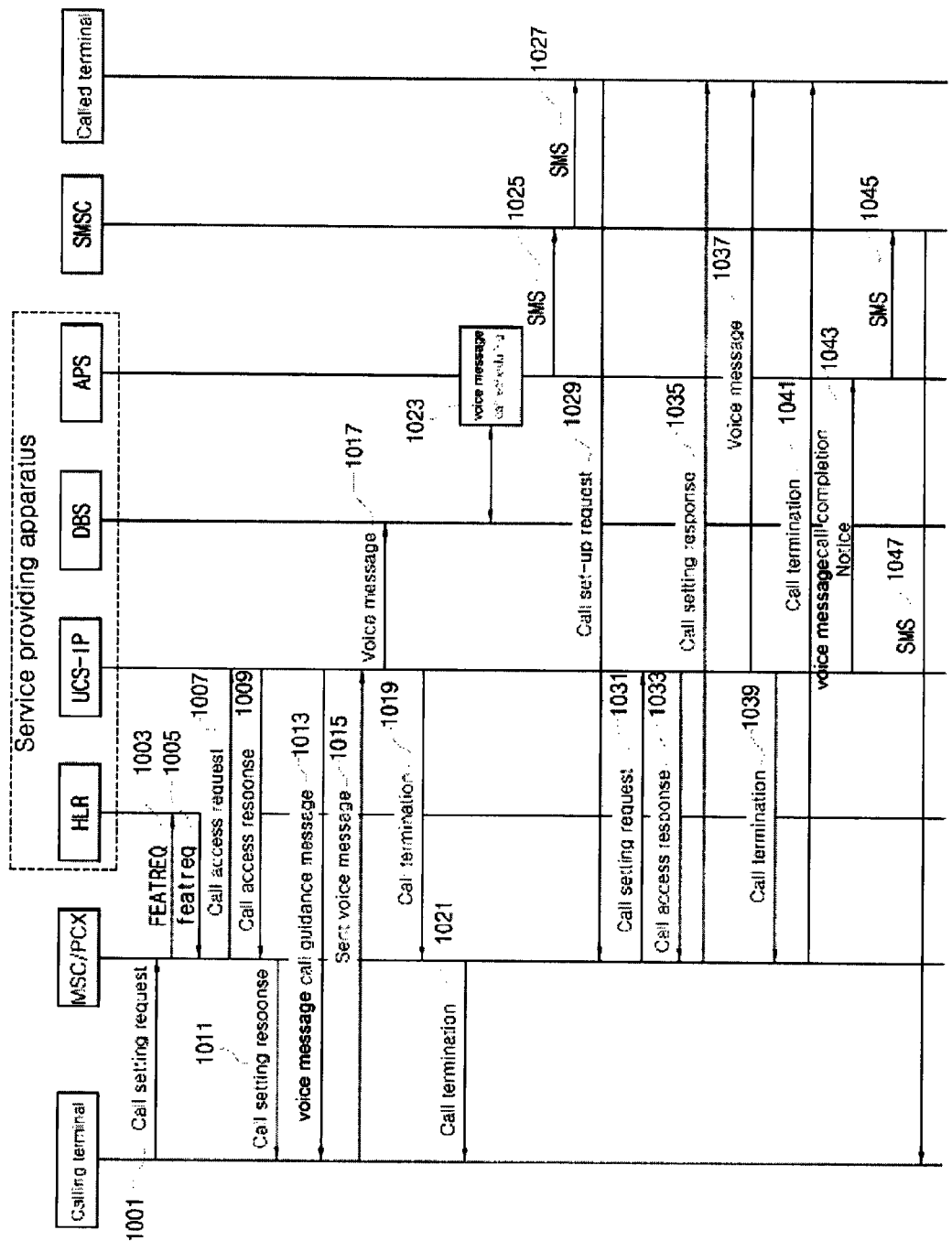
FIG. 10 is a signal flowchart illustrating a procedure for providing voice message call service through a short message, in accordance with a preferred embodiment of the present invention.

FIG. 10 is a signal flowchart illustrating a procedure for providing voice message call service through a short message, in accordance with a preferred embodiment of the present invention. This drawing shows the procedure in which the calling terminal leaves a voice message in the UCS-IP server of the service providing apparatus using the Service Node (SN) method of the voice message call service processing method and the service providing apparatus sends a callback short message (SMS) to the called terminal, thereby establishing a call connection to the UCS-IP server. This procedure can vary according to the internal network or service procedure of a service provider.

Referring to FIG. 10, the calling terminal first sends a call set-up request signal, including a feature code and the telephone number of the called terminal, to the MSC/PCX at step 1001. The MSC/PCX receives the call set-up request signal and sends the FEATREQ signal to the HLR at step 1003. The HLR sends a featreq signal, including information about routing to the service providing apparatus, to the MSC/PCX in response to the FEATREQ signal at step 1005. The MSC/PCX sends a call access request signal to the UCS-IP server of the service providing apparatus based on the routing information at step 1007. The UCS-IP server sends a call access response signal to the MSC/PCX in response to the call access request signal at step 1009. The MSC/PCX sends a call set-up response signal to the calling terminal at step 1011.

A call path is established between the UCS-IP server of the service providing apparatus and the calling terminal through steps 1001 to 1011. The UCS-IP server sends a voice message call guidance message to the calling terminal at step 1013. An example of the voice message call guidance message can include "This is a voice message call provided by KTF (SKT/LGT). Please start recording after the "beep" sound and press * or # after recording. Beep." The calling terminal records the voice message, which will be sent from a user to the called terminal, through the UCS-IP server at step 1015. At this time, the UCS-IP server can send a guidance message (e.g., "We will send a message. Thank you for using the service") to the calling terminal after recording.

The UCS-IP server sends voice message call information (the telephone number of the calling terminal, the telephone number of the called terminal and time information), which was left by the calling subscriber, and the voice message to the APS server and the DBS at step 1017. The UCS-IP server then sends a call termination signal to the MSC/PCX in order to terminate the call with the calling terminal at step 1019. The MSC/PCX sends the call termination signal to the calling terminal at step 1021.

The APS server of the service providing apparatus schedules the voice message call service and fetches data from the DBS, in order to transfer data, which are stored therein by the calling subscriber, to the called subscriber at step 1023.

The APS server sends a character message stating the voice message call has arrived at the called terminal to the SMSC at step 1025. The character message includes the telephone number of the service providing apparatus for callback to the service providing apparatus. The SMSC sends the character message to the called terminal at step 1027.

If the user of the called terminal, who has received the character message, confirms that the message is a voice message call and then presses a call button, the called terminal sends a call set-up request signal to the MSC/PCX for callback connection to the service providing apparatus at step 1029. The MSC/PCX transfers a call access request signal to the UCS-IP server of the service providing apparatus in response to the call set-up request signal at step 1031. The UCS-IP server sends a call access response signal to the MSC/PCX in response to the call access request signal at step 1033. The MSC/PCX sends a call set-up response signal to the called terminal, so that a call path is established between the UCS-IP server of the service providing apparatus and the called terminal at step 1035.

The UCS-IP server fetches the voice message, which was left by the calling subscriber and stored in the DBS, and sends the fetched voice message to the called terminal using the call path at step 1037. The UCS-IP server plays the voice message and sends a call termination request signal to the MSC/PCX at step 1039. The MSC/PCX sends the call termination request signal to the called terminal at step 1041, so that the call path between the service providing apparatus and the called terminal is terminated. At this time, a called customer can make a reply to the voice message call without needing to terminate the call after listening to the voice message call received from a calling party.

The UCS-IP server sends a voice message call completion notice, indicating that the voice message call has been completely sent to the called terminal, to the APS at step 1043. The APS sends a short message stating "The voice message call has been completely sent to a called party's telephone number or name" to the SMSC at step 1045. The SMSC sends the short message to the calling terminal at step 1047. Although not shown in the drawing, the APS server sends CDR data to the BD for billing after the provision of corresponding service.

Figure 11:
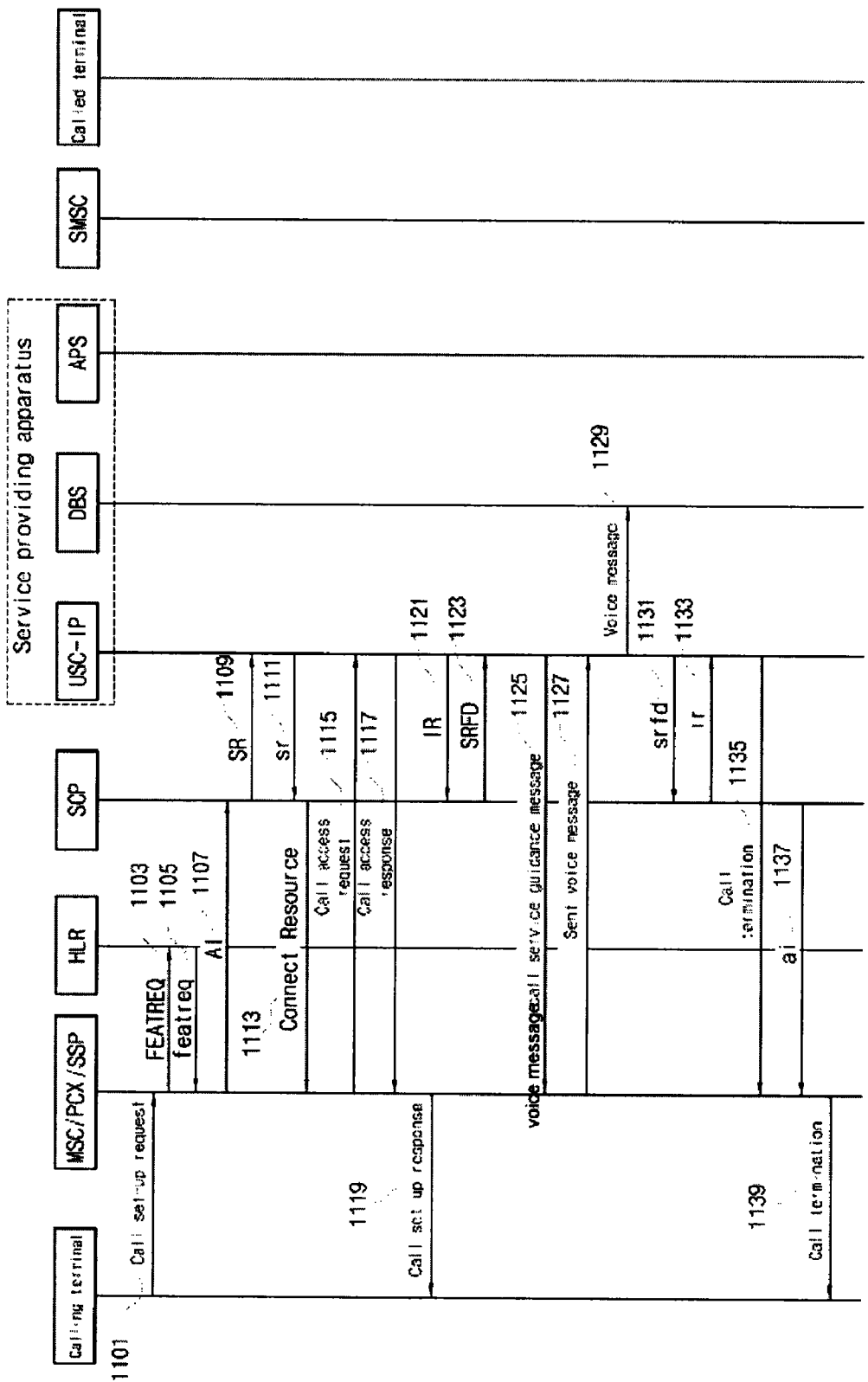
FIG. 11 is a signal flowchart illustrating a procedure in which the calling terminal sends a voice message to the service providing apparatus, in a procedure for providing voice message call service using an Intelligent Network, in accordance with a preferred embodiment of the present invention.

FIG. 11 is a signal flowchart illustrating a procedure in which the calling terminal sends a voice message to the service providing apparatus, which constitutes part of the procedure for providing voice message call service using an intelligent network, in accordance with a preferred embodiment of the present invention. This drawing shows the procedure in which the calling terminal leaves a voice message in the service providing apparatus using the Intelligent Network (IN) method of the voice message call service processing method. This procedure can vary according to the internal network or service procedure of a service provider.

Referring to FIG. 11, the calling terminal sends a call set-up request signal including a feature code (e.g. * or #66) and the telephone number of the called terminal to the MSC/PCX in order to leave a voice message to be sent to the called terminal at step 1101. The MSC/PCX sends the FEATREQ signal to the HLR corresponding to the call set-up request signal at step 1103. The HLR sends a featreq signal, including routing information, to the MSC/PCX in response to the FEATREQ signal at step 1105.

The MSC/PCX sends an Analyzed Information (AI) signal to the SCP that is performing the voice message call service, based on the routing information at step 1107. The SCP confirms that a corresponding call is the voice message call, and sends a Seize Resource (SR) signal to the UCS-IP server for the purpose of connection to the UCS-IP server, at step 1109. The UCS-IP server generates a TLDN and sends an sr signal, including the TLDN, to the SCP in response to the SR signal at step 1111. The SCP sends a ConnectResource signal to the MSC/PCX for connection to the UCS-IP server based on the TLDN at step 1113. The MSC/PCX sends a call access request signal to the UCS-IP server corresponding to the ConnectResource signal at step 1115. The UCS-IP server sends a call access response signal to the MSC/PCX in response to the call access request signal at step 1117. The MSC/PCX sends a call set-up response signal to the calling terminal to correspond to the call access response signal at step 1119, so that a call path is established between the UCS-IP server of the service providing apparatus and the calling terminal.

The UCS-IP server sends an Instruction Request (IR) signal to the SCP in order to process a corresponding call at step 1121. The SCP sends a Specialized Resource Function Directive (SRFD) signal to the UCS-IP server to allow a calling subscriber to make a recording, at step 1123.

The UCS-IP server sends a voice message call guidance message to the calling terminal at step 1125. The calling terminal receives a voice message from a user according to the guidance message and sends the received voice message to the UCS-IP server, at step 1127. At this time, the UCS-IP server can send a guidance message (e.g., "We will send a message. Thank you for using the service") to the calling terminal after the recording.

The UCS-IP server sends voice message call information (the telephone number of the calling terminal, the telephone number of the called terminal and time information), which was left by the calling subscriber, and the voice message to the APS server and the DBS at step 1129. Thereafter, the UCS-IP server sends the SRFD signal, indicating that the process of the SRFD signal has been completed, to the SCP at step 1131. The SCP sends an ir signal, indicating that the process of a corresponding call has been completed, to the UCS-IP server at step 1133.

The UCS-IP server, having received the ir signal, sends a call termination signal to the MSC/PCX at step 1135. The SCP sends an ai signal, indicating that the process of the AI signal has been completed, to the MSC/PCX at step 1137. The MSC/PCX sends the call termination signal to the calling terminal, thus terminating the call path at step 1139. Hereinafter, the process of sending the voice message from the service providing apparatus to the called terminal is described in connection with different embodiments with reference to FIGS. 12 and 13.

Figure 12:
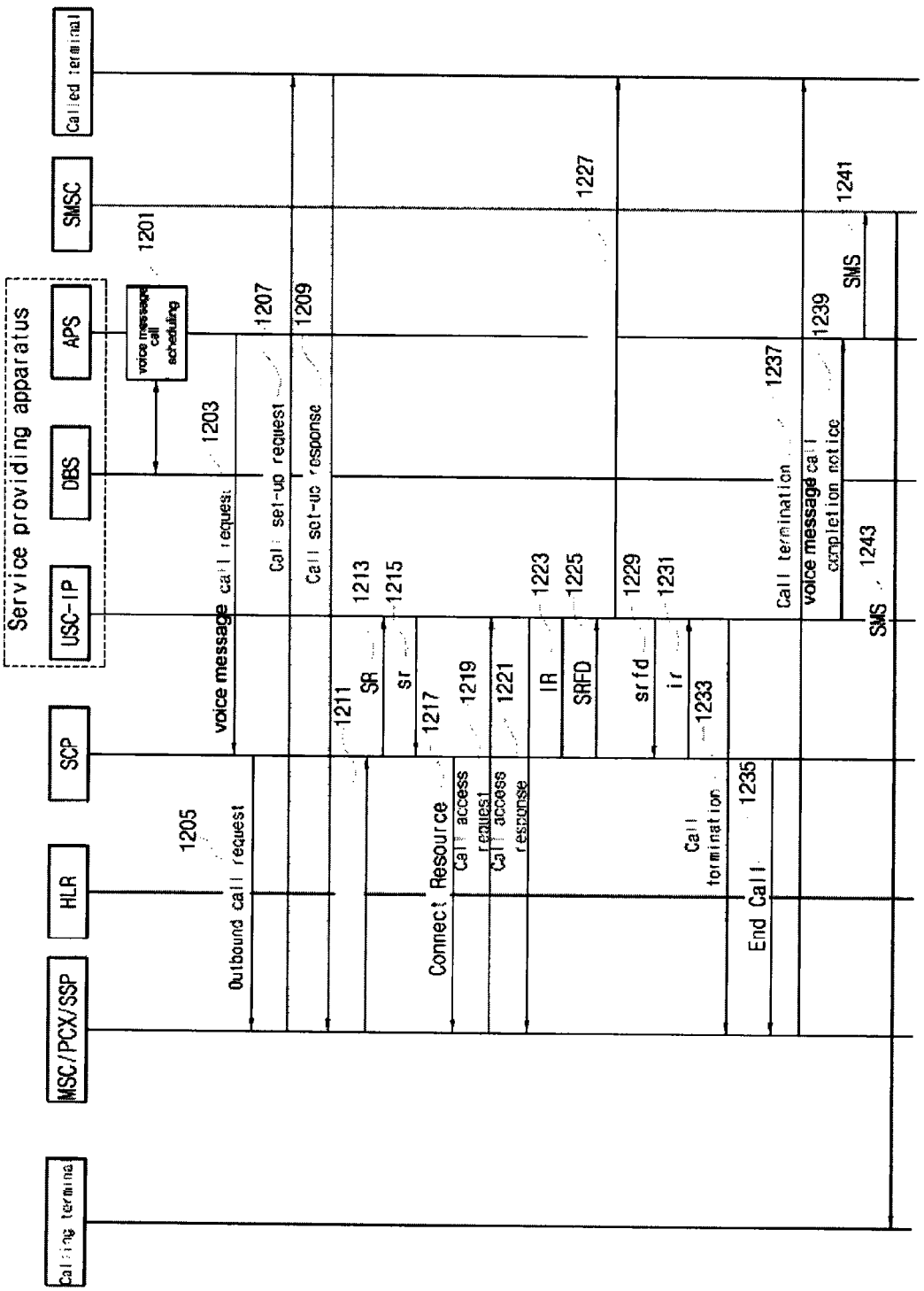
FIG. 12 is a signal flowchart illustrating a procedure for sending a voice message to a called terminal through an outbound call, in a procedure for providing voice message call service using an intelligent network, in accordance with a preferred embodiment of the present invention.

FIG. 12 is a signal flowchart illustrating a process of sending a voice message to a called terminal through an outbound call, which constitutes part of the procedure for providing voice message call service using an intelligent network, in accordance with a preferred embodiment of the present invention. That is, this drawing shows the procedure for sending the voice message from the calling terminal to the service providing apparatus, which has been described with reference to FIG. 11, and then sending the voice message to the called terminal to correspond to the outbound call.

Referring to FIG. 12, the APS server of the service providing apparatus fetches data from the DBS in order to transfer data, which are stored in the calling terminal, to the called terminal at step 1201. At this time, dialing-out is performed immediately after the calling terminal has left the voice message. If the called terminal does not receive a call, an attempt has to be made again. It is thus necessary to calculate a call to be outbound, a time, etc.

The APS server sends a voice message call request signal to the SCP at step 1203. The SCP sends an outbound call request signal for attempting an outbound call to the MSC/PCX to the MSC/PCX at step 1205. The MSC/PCX sends a call set-up request signal to the called terminal to correspond to the outbound call request signal at step 1207. The called terminal sends a call set-up response signal to the MSC/PCX in response to the call set-up request signal at step 1209. The MSC/PCX sends an outbound call response signal, indicating that the received outbound call request received from the SCP has been completed, to the SCP at step 1121.

The SCP confirms that an originating call has been successfully connected, and sends an SR signal to the UCS-IP server for the purpose of connection to the UCS-IP server at step 1213. The UCS-IP server sends an sr signal, including a TLDN, to the SCP corresponding to the SR signal at step 1215. The SCP sends a ConnectResource signal to the MSC/PCX for connection to the UCS-IP server on the basis of the TLDN at step 1217.

The MSC/PCX sends a call access request signal to the UCS-IP server based on the received ConnectResource signal at step 1219. The UCS-IP server sends a call access response signal to the MSC/PCX at step 1221, so that a call path is established between the UCS-IP server of the service providing apparatus and the called terminal. The UCS-IP server sends an IR signal to the SCP in order to process a corresponding call at step 1223. The SCP sends an SRFD signal to the UCS-IP server in order to transfer the voice message to the called terminal at step 1225.

The UCS-IP server checks whether a corresponding call is an incoming call in order to confirm that a corresponding call is a voice message, fetches the voice message, which was left in the DBS by a calling subscriber, and sends the voice message, which was left by the calling terminal, to the called terminal, at step 1227. The UCS-IP server plays the voice message, and sends an SRFD signal to the SCP at step 1229. At this time, the called terminal can make a reply to a voice message call without terminating the call after listening to the received voice message. The SCP sends an ir signal, indicating that the process of a corresponding call has been completed, to the UCS-IP server at step 1231.

The UCS-IP server receives the ir signal and sends a call termination signal to the MSC/PCX at step 1233. The SCP sends an End Call signal, indicating that an outbound call has been completed, to the MSC/PCX at step 1235. The MSC/PCX sends the call termination signal to the called terminal, thereby terminating the call, at step 1237.

The UCS-IP server sends a voice message call completion notice, indicating that the voice message call has been completely sent to the called terminal, to the APS at step 1239. The APS sends a short message stating "[The voice message call] has been sent to [a called party's telephone number or name]" to the SMSC at step 1241. The SMSC sends the short message to the calling terminal at step 1243. Although not shown in the drawing, the APS server sends CDR Data to the BS for billing after the provision of corresponding service.

Figure 13:
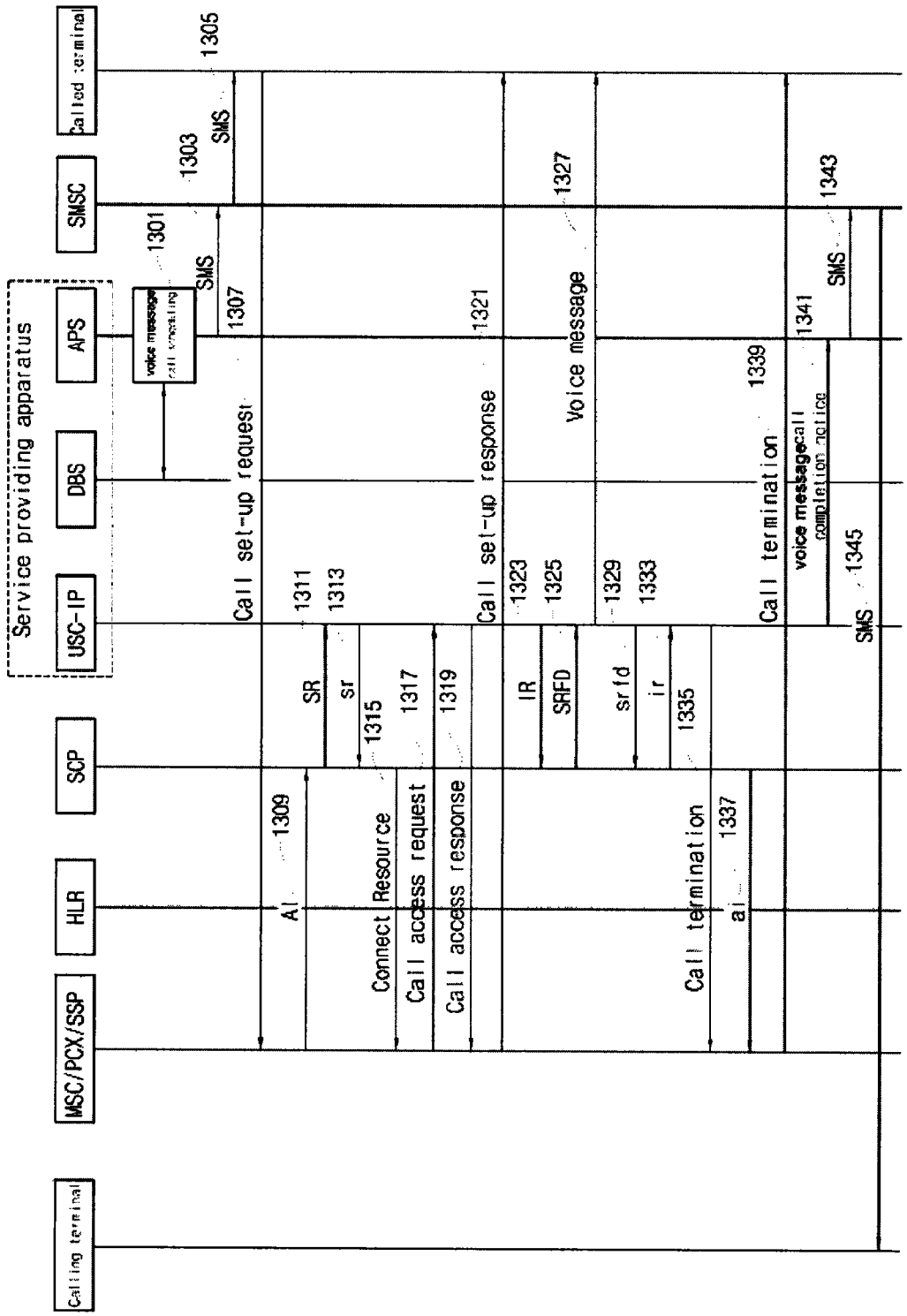
FIG. 13 is a signal flowchart illustrating a procedure for sending a voice message to a called terminal through a short message, in a procedure for providing voice message call service using an intelligent network, in accordance with a preferred embodiment of the present invention.

FIG. 13 is a signal flowchart illustrating a procedure for sending a voice message to a called terminal through a short message, which constitutes part of the procedure for providing voice message call service using an intelligent network, in accordance with a preferred embodiment of the present invention. That is, this drawing shows the procedure for sending the voice message from the calling terminal to the service providing apparatus, which has been described with reference to FIG. 11, and then sending the voice message to the called terminal according to the short message.

Referring to FIG. 13, the APS server of the service providing apparatus fetches data from the DBS in order to transfer data, which were stored by the calling terminal, to the called terminal at step 1301. At this time, dialing-out is performed immediately after the calling terminal has left the voice message. If the called terminal does not receive a call, an attempt has to be made again. It is thus necessary to calculate a call to be outbound, a time, etc. The APS server sends a character message to the SMSC in order to indicate that the voice message call has been received by the called terminal, at step 1303. The character message includes the telephone number of the service providing apparatus for callback to the service providing apparatus. The SMSC sends the character message to the called terminal at step 1305.

The user of the called terminal, who has received the character message, confirms that the message is a voice message call and presses a call button. The called terminal sends a call set-up request signal to the MSC/PCX for the purpose of callback connection to the service providing apparatus at step 1307. The MSC/PCX confirms that the call set-up request signal is a number for connection to the SCP, and sends an AI signal to the SCP at step 1309. The SCP confirms that the AI signal is for voice message, and sends an SR signal to the UCS-IP server for the purpose of connection to the UCS-IP server at step 1311. The UCS-IP server sends an sr signal, including a TLDN, to the SCP in response to the SR signal at step 1313. The SCP transfers a ConnectResource signal to the MSC/PCX to connect to the UCS-IP server based on the TLDN at step 1315.

The MSC/PCX sends a call access request signal to the UCS-IP server based on the received ConnectResource signal at step 1317. The UCS-IP server sends a call access response signal to the MSC in response to the call access request signal at step 1319. The MSC/PCX sends a call set-up response signal to the called terminal, so that a call path is established between the UCS-IP server of the service providing apparatus and the called terminal at step 1321.

The UCS-IP server then sends an IR signal to the SCP in order to process a corresponding call at step 1323. The SCP confirms that the called subscriber is a voice message call confirmation subscriber, and then sends an SRFD signal to the UCS-IP server in order to play a recorded voice message at step 1325. The UCS-IP server confirms that a corresponding call is an incoming call for checking voice, fetches a voice message, which was left by a calling subscriber and stored in the DBS, and then sends the voice message to the called terminal, at step 1327.

The UCS-IP server plays all the voice message to be transferred, and then sends an srfd signal to the SCP at step 1329. At this time, the called terminal can make a reply to the voice message call without terminating the call after listening to the received voice message. The SCP sends an it signal, indicating that the process of a corresponding call has been completed, to the UCS-IP server at step 1333.

The UCS-IP server, having received the it signal, sends a call termination signal to the MSC/PCX at step 1335. The SCP sends an ai signal, indicating that the process of the AI signal received from the MSC/PCX has been completed, to the MSC/PCX at step 1337. The MSC/PCX sends the call termination signal to the called terminal and, thus, terminates the call at step 1339.

The UCS-IP server sends a voice message call completion notice, indicating that the voice message call has been completely sent to the called terminal, to the APS at step 1341. The APS sends a short message stating "The voice message call has been completely sent to a called party's telephone number or name" to the SMSC at step 1343. The SMSC sends the short message to the calling terminal at step 1345. Although not shown in the drawing, the APS server sends CDR Data to the BD for billing after the provision of corresponding service.

Figure 14:
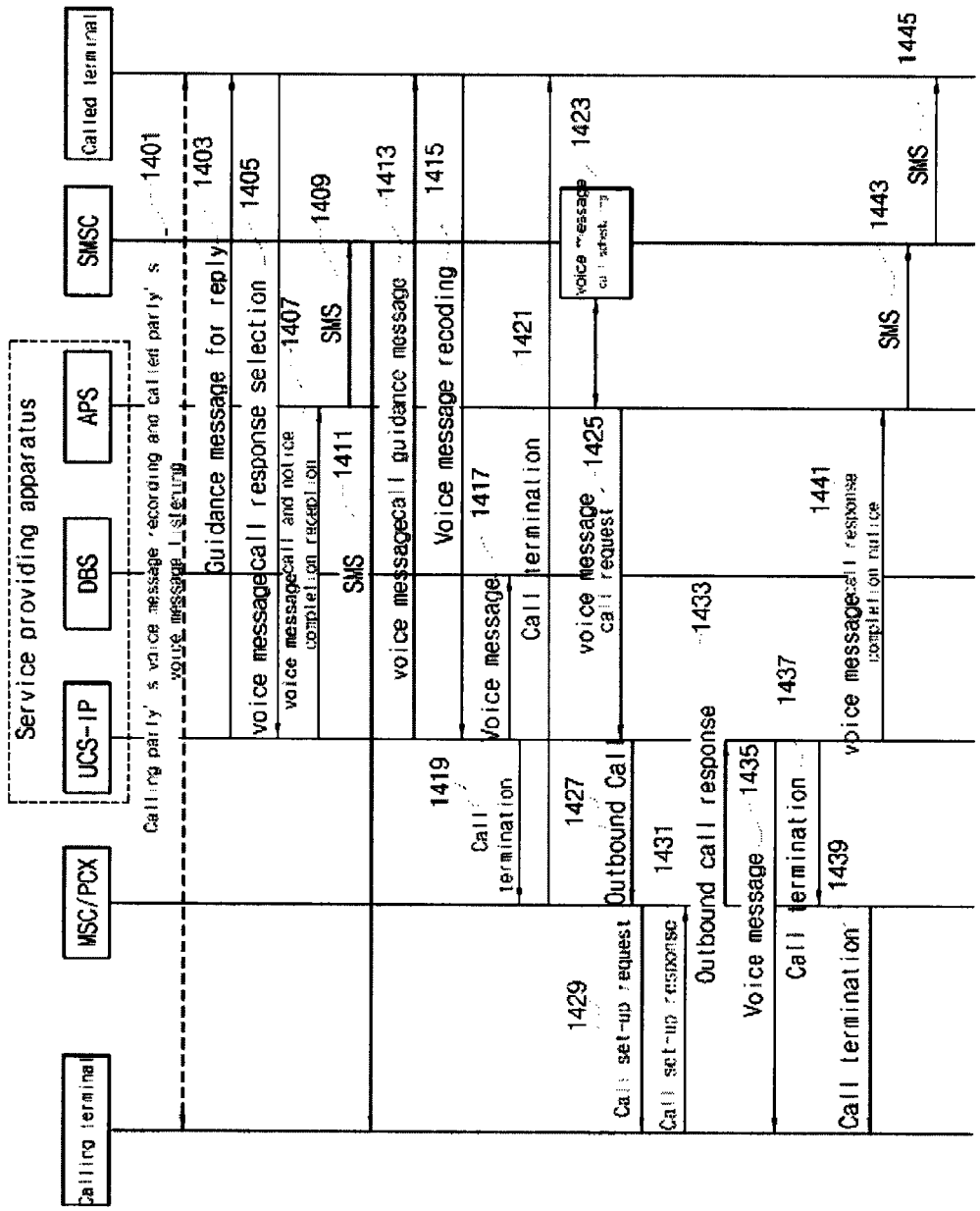
FIG. 14 is a signal flowchart illustrating a procedure in which a called terminal detects a voice message and then make a reply to a calling terminal through a voice message call using the voice message call service, in accordance with a preferred embodiment of the present invention.

FIG. 14 is a signal flowchart illustrating a procedure in which the called terminal detects a voice message and then sends a reply to a calling terminal through a voice message call using the voice message call service, in accordance with a preferred embodiment of the present invention. This drawing shows the procedure in which the called subscriber listens to the recorded message of the calling subscriber and then sends a reply to the calling subscriber using a voice message call, in the procedure in which the calling subscriber attempts the voice message call using the Service Node (SN) method. This procedure can vary according to the internal network or service procedure of a service provider.

Referring to FIG. 14, the calling terminal gains access to the service providing apparatus and records a voice message. The service providing apparatus sends the voice message to the called terminal, and the called subscriber listens to the voice message recorded by the calling subscriber, at step 1401. In this case, step 1401 corresponds to steps 901 to 935 of FIG. 9 and steps 1001 to 1037 of FIG. 10. After the called subscriber listens to the voice message, the UCS-IP server of the service providing apparatus sends a guidance message for reply to the called terminal at step 1403. At this time, an example of the guidance message can include "Please press No. 1 to make a voice message call response, No. 2 to establish an immediate connection with the calling party, and No. 3 to call the calling party."

In the above example, if the called subscriber selects No. 1, the called terminal sends a voice message call response request signal to the UCS-IP server at step 1405. The UCS-IP server sends a voice message call reception and completion notice message, indicating that the called subscriber has completely received and listened to the voice message call sent by the calling party, to the APS server at step 1407. The APS server sends a character message, such as "[The voice message call] has been sent to [a called party's telephone number or name]," to the SMSC at step 1409. The SMSC sends the character message to the calling terminal at step 1411. At this time, although not shown in the drawing, the APS server sends CDR Data to the BS for billing the calling subscriber after the provision of corresponding service.

The UCS-IP server sends a voice message call guidance message, such as "This is a voice message call response. Please start recording after the "beep" sound, and press * or # after recording. Beep" at step 1413. The voice message call of step 1413 corresponds to a reply voice message call for an original voice message call. The called terminal sends a reply message, which will be transferred to the calling terminal, to the UCS-IP server at step 1415. At this time, the UCS-IP server can send a guidance message stating "We will send you an answer after recording. Thank you for using the service." to the called terminal.

The UCS-IP server sends voice message call information (a calling terminal number, a called terminal number and time information), which was left by the called subscriber, and a voice reply message to the APS server and the DBS at step 1417. The UCS-IP server sends a call termination signal to the MSC/PCX at step 1419. The MSC/PCX terminates the call path between the UCS-IP server of the service providing apparatus and the called terminal by sending the call termination signal to the called terminal at step 1421.

The APS server of the service providing apparatus schedules voice message call and fetches data, which will be transferred to the calling terminal, from the DBS in order to transfer the data, which were stored in the called terminal, to the calling terminal at step 1423. At this time, dialing-out is performed immediately after the calling terminal has left the voice message. If the called terminal does not receive a call, an attempt must be made again. It is thus necessary to calculate a call to be outbound, a time, etc.

The APS server sends a voice message call request signal to the UCS-IP server at step 1425. The UCS-IP server attempts an outbound call to the MSC/PCX connected through E1 or T1 at step 1427. The MSC/PCX sends a call set-up request signal to the calling terminal at step 1429. The MSC/PCX receives a call set-up response signal from the calling terminal at step 1431. The MSC/PCX sends an outbound call response signal to the UCS-IP server corresponding to the call set-up response signal at step 1433, so that a call path is established between the UCS-IP server of the service providing apparatus and the calling terminal.

The UCS-IP server fetches a voice message that was left by the called subscriber and stored in the DBS, and sends the voice message to the calling terminal using the call path at step 1435. The UCS-IP server plays the voice message, and sends a call termination request signal to the MSC/PCX at step 1437. The MSC/PCX transfers the call termination request signal to the calling terminal at step 1439, so that the call path between the service providing apparatus and the called terminal is terminated.

The UCS-IP server sends a voice message call completion notice, indicating that the voice message call has been completely sent to the calling terminal, to the APS at step 1441. The APS sends a short message to the SMSC in order to inform the called terminal that the voice message call reply has been completely sent to the calling terminal at step 1443. The SMSC sends the short message to the called terminal at step 1445. Although not shown in the drawing, the APS server sends CDR Data to the BS for billing after the provision of corresponding service.

Figure 15:
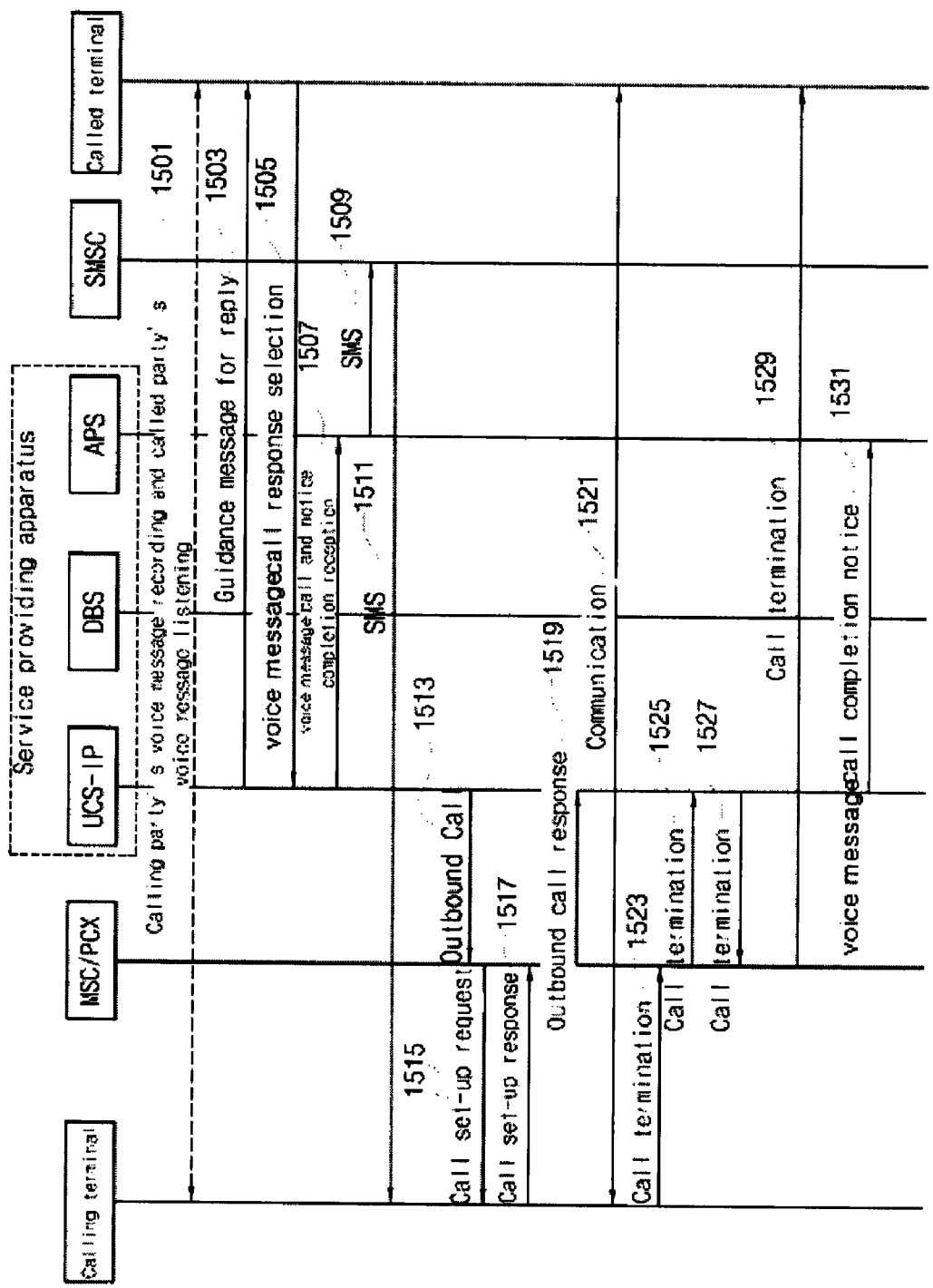
FIG. 15 is a signal flowchart illustrating a procedure in which a called terminal detects a voice message and then immediately communicate with a calling terminal using the voice message call service, in accordance with a preferred embodiment of the present invention.

FIG. 15 is a signal flowchart illustrating a procedure in which the called terminal detects a voice message and then immediately communicates with the calling terminal using the voice message call service, in accordance with a preferred embodiment of the present invention. This drawing shows the procedure in which the called subscriber listens to the recorded message of the calling subscriber and then dials the calling subscriber through an immediate connection to the calling subscriber, in the procedure in which the calling subscriber attempts the voice message call using the Service Node (SN) method. At this time, the UCS-IP server of the service providing apparatus receives an immediate connection request from the called terminal, and directly processes an outbound call so that communication between the calling subscriber and the called subscriber can be performed. This procedure can vary according to the internal network or service procedure of a service provider.

Referring to FIG. 15, the calling terminal gains access to the service providing apparatus and records a voice message. The service providing apparatus sends the voice message to the called terminal, and the called subscriber listens to the voice message recorded by the calling subscriber at step 1501. In this case, step 1501 corresponds to steps 901 to 935 of FIG. 9 and steps 1001 to 1037 of FIG. 10. After the called subscriber listens to the voice message, the UCS-IP server of the service providing apparatus sends a guidance message for reply to the called terminal at step 1503. At this time, an example of the guidance message can include "Please press No. 1 to make an voice message call response, No. 2 to establish to an immediate connection with the calling party, and No. 3 to call the calling party".

In the above example, if the called subscriber selects No. 2, the called terminal sends a calling party immediate connection request signal to the UCS-IP server at step 1505. The UCS-IP server sends a voice message call reception and completion notice message, indicating that the called subscriber has received and listened to the voice message call sent by the calling party, to the APS server at step 1507. The APS server sends a character message, such as "[The voice message call] has been sent to [a called party's telephone number or name]", to the SMSC at step 1509. The SMSC sends the character message to the calling terminal at step 1511. At this time, although not shown in the drawing, the APS server sends CDR Data to the BS for billing the calling subscriber after the provision of corresponding service.

The UCS-IP server attempts an outbound call to the MSC/PCX connected through E1 or T1 in order to call the calling terminal at step 1513. The MSC/PCX sends a call set-up request signal to the calling terminal at step 1515. The calling terminal sends a call set-up response signal to the MSC/PCX in response to the call set-up request signal at step 1517. The MSC/PCX sends an outbound call response signal to the UCS-IP server corresponding to the call set-up response signal at step 1519, so that a call path is established between the calling terminal and the UCS-IP server of the service providing apparatus. At this time, the calling terminal and the called terminal can communicate with each other using the call path between the existing UCS-IP server and the called terminal and the call path between the UCS-IP server and the calling terminal at step 1521.

In order to terminate the call that is used by the calling subscriber, the calling terminal sends a call termination signal to the MSC/PCX at step 1523. The MSC/PCX transfers the call termination signal to the UCS-IP server at step 1525. The UCS-IP server sends the call termination signal to the MSC/PCX in order to terminate the call with the called terminal at step 1527. The MSC/PCX sends the call termination signal to the called terminal at step 1529. In this case, at steps 1523 to 1529, the called terminal can send the call termination signal to the MSC/PCX in order to terminate the call.

The UCS-IP server sends a voice message call reply completion notice to the APS at step 1531. At this time, although not shown in the drawing, the APS server sends CDR data to the BS for billing the called subscriber or the calling subscriber after the provision of corresponding service.

Figure 16:
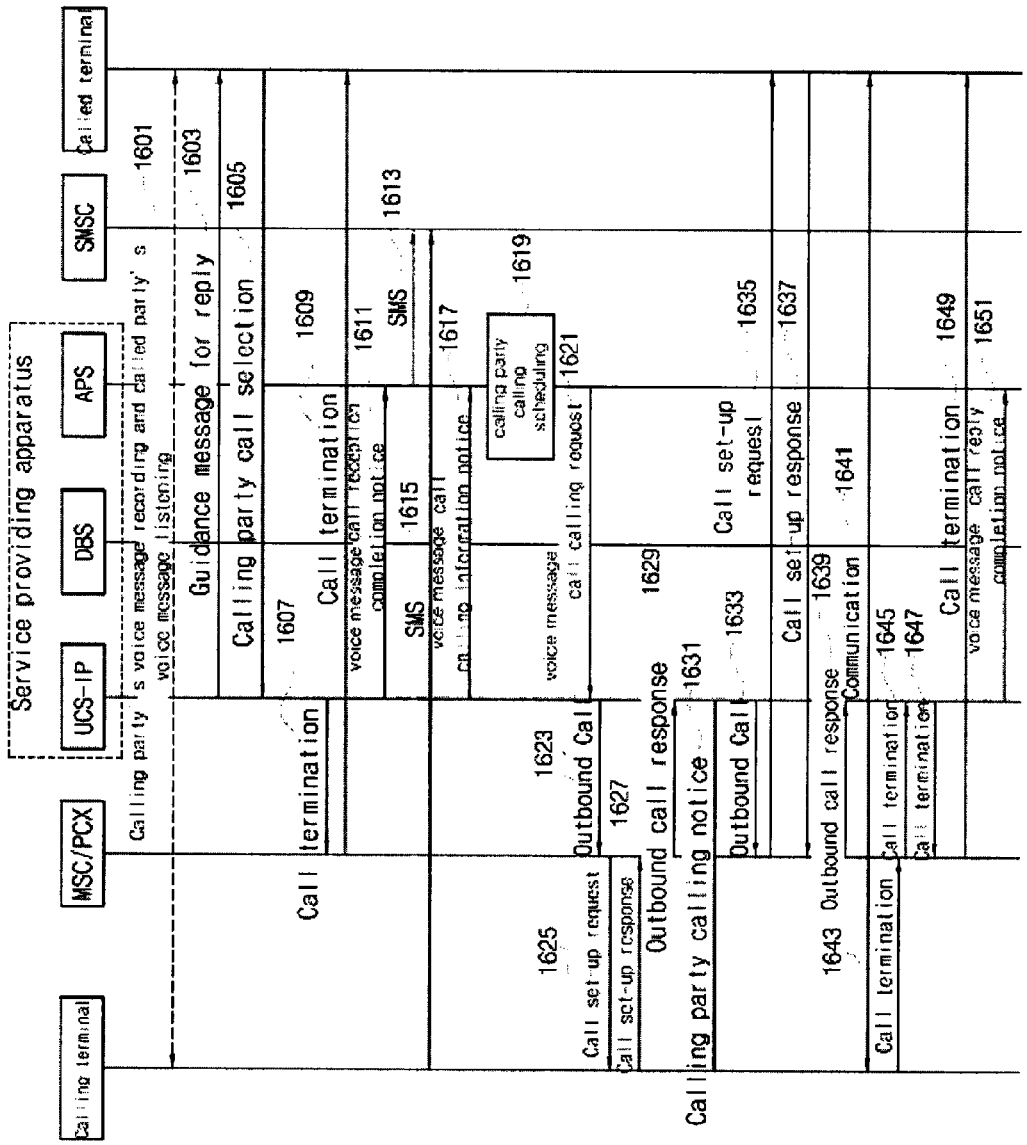
FIG. 16 is a signal flowchart illustrating a procedure in which a called terminal detects a voice message and then call and communicate with a calling terminal using the voice message call service, in accordance with a preferred embodiment of the present invention.

FIG. 16 is a signal flowchart illustrating a procedure in which the called terminal detects a voice message, and then calls and communicates with a calling terminal using the voice message call service, in accordance with a preferred embodiment of the present invention. This drawing shows the procedure in which the called subscriber listens to a recorded message of the calling subscriber and then communicates with the calling subscriber through calling of the calling subscriber, in the procedure in which the calling subscriber attempts the voice message call using the Service Node (SN) method. In this procedure, the UCS-IP server of the service providing apparatus receives a calling subscriber calling request from the called subscriber, terminates a call with the called subscriber, directly processes an outbound call to connect to the calling subscriber, and then calls the called subscriber, so that the calling subscriber and the called subscriber can communicate with each other. This procedure can vary according to the internal network or service procedure of a service provider.

The calling terminal gains access to the service providing apparatus and records a voice message. The service providing apparatus sends the voice message to the called terminal, and the called subscriber listens to the voice message recorded by the calling subscriber at step 1601. In this case, step 1601 corresponds to steps 901 to 935 of FIG. 9 and steps 1001 to 1037 of FIG. 10. After the called subscriber has listened to the voice message, the UCS-IP server of the service providing apparatus sends a guidance message for reply to the called terminal at step 1603. An example of the guidance message includes "Please press No. 1 to make a voice message call response, No. 2 to establish an immediate connection with the calling party, and No. 3 to call the calling party."

In the above example, if the called subscriber selects No. 3, the called terminal sends a calling party call request signal to the UCS-IP server at step 1605. The UCS-IP server sends a call termination signal to the MSC/PCX in order to terminate the call with the called terminal at step 1607. The MSC/PCX terminates the call path between the UCS-IP server and the called terminal by sending the call termination signal to the called terminal at step 1609.

The UCS-IP server receives a voice message call sent to the called subscriber by the calling party, and then sends a voice message call receive completion notice message to the APS server at step 1611. The APS server sends a character message to the SMSC in order to inform the calling terminal of the completion of voice message call transmission at step 1613. The SMSC sends the character message to the calling terminal at step 1615. At this time, although not shown in the drawing, the APS server sends CDR data to the BS for billing the calling subscriber after the provision of corresponding service.

The UCS-IP server sends voice message call calling information (a calling terminal number, a called terminal number and time information), which was left by the called subscriber, to the APS server and the DBS at step 1617. The APS server fetches data voice message call calling information, which was stored in the called subscriber, from the DBS, and performs scheduling for a calling party call at step 1619. At this time, dialing-out is performed immediately after the calling terminal has left the voice message. If the called terminal does not receive a call, an attempt has to be made again. It is thus necessary to calculate a call to be outbound, time, etc.

The APS server sends a voice message call calling request signal to the UCS-IP server at step 1621. The UCS-IP server attempts an outbound call to the MSC/PCX connected through E1 or T1 at step 1623. The MSC/PCX sends a call set-up request signal to the calling terminal at step 1625, and receives a call set-up response signal therefrom at step 1627. The MSC/PCX sends an outbound call response signal to the UCS-IP server, thus establishing a call path between the calling terminal and the UCS-IP server of the service providing apparatus at step 1629. The UCS-IP server sends and outputs a voice message call calling notice message using the call path established with the calling terminal at step 1631.

The UCS-IP server attempts an outbound call to the MSC/PCX connected through E1 or T1 in order to set up a call with the called terminal at step 1633. The MSC/PCX sends a call set-up request signal to the called terminal at step 1635, and receives a call set-up response signal from the called terminal at step 1637. The MSC/PCX sends an outbound call response signal to the UCS-IP server, thus establishing a call path between the called terminal and the UCS-IP server of the service providing apparatus at step 1639. The calling terminal and the called terminal communicate with each other using the call path between the calling terminal and the UCS-IP server and the call path between the called terminal and the UCS-IP at step 1641.

In order to terminate the call that is used by the calling subscriber, the calling terminal sends a call termination signal to the MSC/PCX at step 1643. The MSC/PCX transfers the call termination signal to the UCS-IP at step 1645. The UCS-IP server sends the call termination signal to the MSC/PCX in order to terminate the call with the called terminal at step 1647. The MSC/PCX transfers the call termination signal to the called terminal at step 1649. In steps 1643 to 1649, the called terminal can send the call termination signal to the MSC/PCX in order to terminate the call.

The UCS-IP server sends a voice message call reply completion notice to the APS at step 1651. At this time, although not shown in the drawing, the APS server sends CDR data to the BS for billing the called subscriber or the calling subscriber after the provision of corresponding service.

In order to provide the voice message call service according to the present invention, the service providing apparatus needs a procedure for examining the status of the called terminal in order to send the voice message to the called terminal after receiving a voice message, which will be transferred to the called terminal, from the calling terminal. In order to transfer the voice message, which was left by the calling terminal, to the called terminal, the status of the called terminal must be in an idle state. If the status of the called terminal is Out of Range, Power Off, No Answer, or Busy, the service providing apparatus reattempts a call according to a retry method (scheduling) set by an operator after examining the status of the called terminal.

The method of examining the status of the called terminal can include a method in which the service providing apparatus queries the HLR or the SCP, a method of registering a corresponding terminal status request with the HLR or the SCP, a method of using the ACM message of the ISUP message of SS7, and a method of using a CPG message of the messages of SS7. The methods are described with reference to FIGS. 17 to 20 below.

Figure 17:
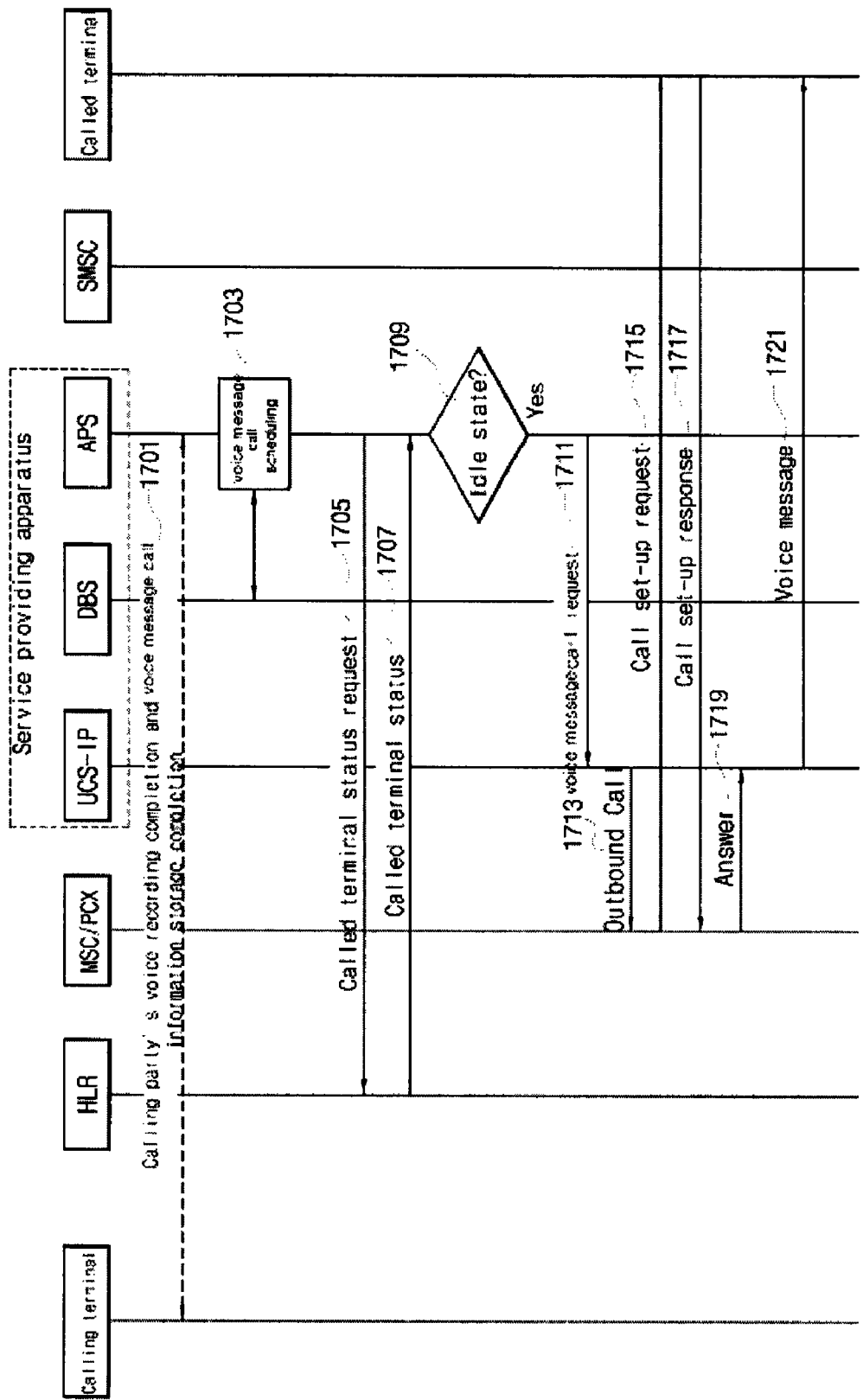
FIG. 17 is a signal flowchart illustrating a procedure for examining the status of a called terminal by querying a Home Location Register (HLR), in accordance with a preferred embodiment of the present invention.

FIG. 17 is a signal flowchart illustrating a procedure for examining the status of a called terminal by querying an HLR, in accordance with a preferred embodiment of the present invention. In this case, the HLR can be replaced with the SCP. The method of examining the status of the called terminal, which is described in this drawing, refers to a method in which, if the APS server requests the status of the called terminal from the HLR or the SCP at regular intervals, the HLR or SCP examines the status of the called terminal and sends a specific message (BRC) to the APS server.

Referring to FIG. 17, the calling terminal gains access to the UCS-IP server of the service providing apparatus and stores a voice message, which will be transferred to the called terminal, in the UCS-IP server. The UCS-IP server sends voice message call information to the DBS server and the APS server, so that the storage of the voice message call information is completed at step 1701. In this case, step 1701 corresponds to steps 901 to 921 of FIG. 9, steps 1001 to 1021 of FIG. 10, and steps 1101 to 1139 of FIG. 11. Thereafter, the APS server fetches the voice message call information from the DBS to perform voice message call scheduling at step 1703.

The APS server sends a called terminal status request signal to the HLR so as to know the status of the called terminal, in accordance with the voice message call scheduling, at step 1705. The HLR examines the status of the called terminal and sends a called terminal status signal to the APS server at step 1707. The APS server determines whether the called terminal is in an idle state based on the called terminal status signal at step 1709. At this time, if the called terminal is in an idle state, steps subsequent to step 1711 are performed. If the called terminal is not in an idle state, steps 1705 to 1709 are performed at regular intervals.

If the called terminal is in an idle state at step 1709, the APS server sends a voice message call request signal to the UCS-IP server at step 1711. The UCS-IP server attempts an outbound call to the MSC/PCX connected through E1 or T1 at step 1713. The MSC/PCX sends a call set-up request signal to the called terminal at step 1715, and receives a call set-up response signal from the called terminal in response thereto at step 1717. The MSC/PCX sends an outbound call response signal to the UCS-IP server corresponding to the call set-up response signal at step 1719, so that a call path is established between the UCS-IP server of the service providing apparatus and the called terminal. The UCS-IP server sends the voice message, which was left by the calling subscriber, to the called terminal using the call path at step 1721.

Figure 18:
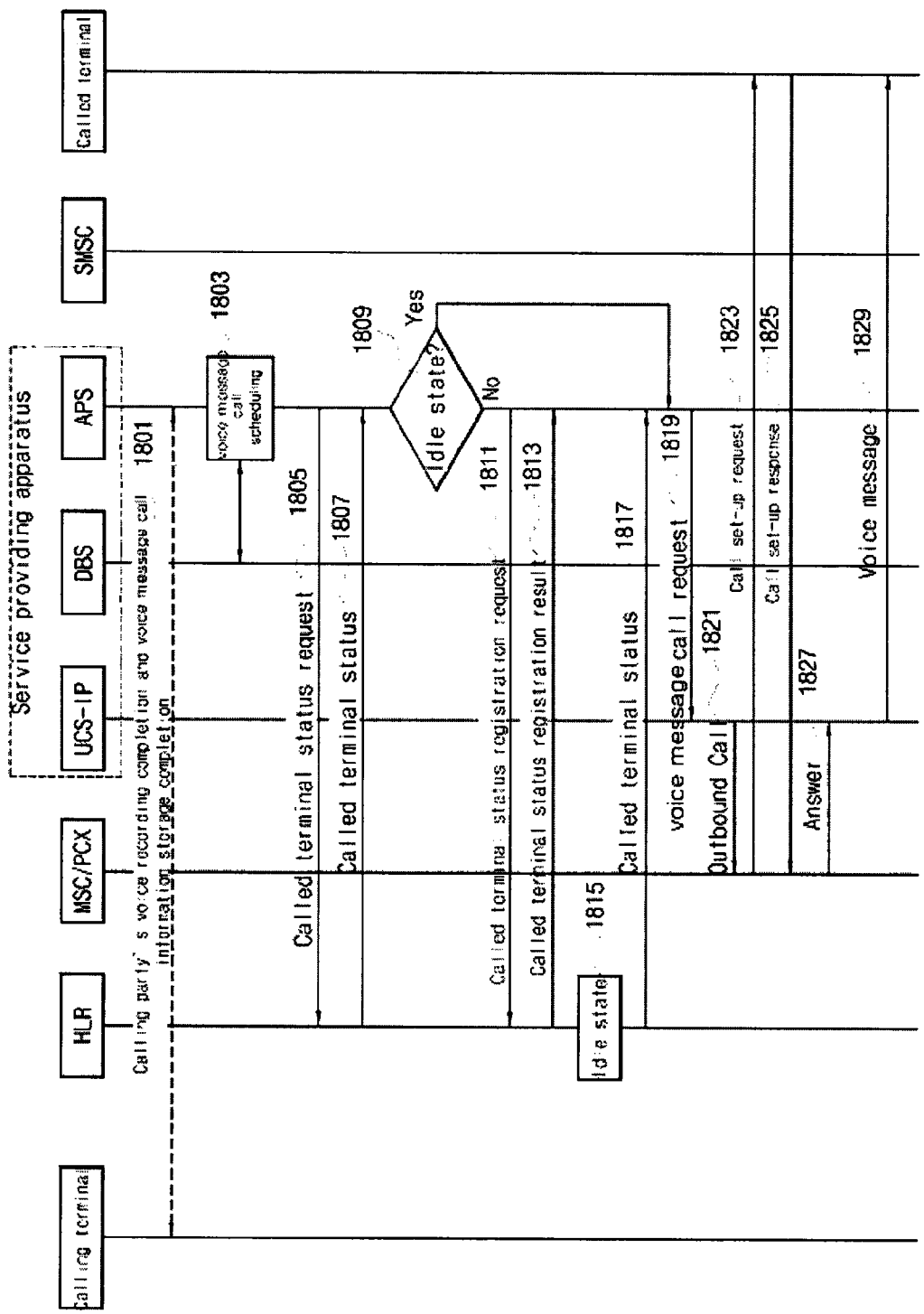
FIG. 18 is a signal flowchart illustrating a procedure for providing voice message call service using a method of registering a called terminal with the HLR when it is not in an idle state, in accordance with a preferred embodiment of the present invention.

FIG. 18 is a signal flowchart illustrating a procedure for providing voice message call service using a method of registering a called terminal with the HLR when it is not in a standby state, in accordance with a preferred embodiment of the present invention. In this case, the HLR can be replaced with the SCP. The method of examining the status of the called terminal, which is described in this drawing, refers to a method of requesting the status of the called terminal from the HLR or the SCP, and sending a message to the HLR or SCP when the called terminal is not in an idle state, and a message to the APS server when the called terminal is in an idle state.

Referring to FIG. 18, the calling terminal gains access to the UCS-IP server of the service providing apparatus and stores a voice message, which will be transferred to the called terminal, in the UCS-IP server. The UCS-IP server sends voice message call information to the DBS server and the APS server, so that the storage of the voice message call information is completed at step 1801. In this case, step 1801 corresponds to steps 901 to 921 of FIG. 9, steps 1001 to 1021 of FIG. 10, and steps 1101 to 1139 of FIG. 11. Thereafter, the APS server fetches the voice message call information from the DBS to perform voice message call scheduling at step 1803.

The APS server sends a called terminal status request signal to the HLR so as to know the status of the called terminal, in accordance with the voice message call scheduling, at step 1805. The HLR examines the status of the called terminal and sends a called terminal status signal to the APS server at step 1807. The APS server determines whether the called terminal is in an idle state based on the called terminal status signal at step 1809. At this time, if the called terminal is in an idle state, steps subsequent to step 1811 are performed. If the called terminal is not in an idle state, steps 1805 to 1809 are performed at regular intervals.

If the called terminal is not in an idle state at step 1809, the APS server sends a called terminal status registration request signal to the HLR at step 1811. The HLR sends a called terminal status registration result signal to the APS server at step 1813.

Thereafter, if the called terminal enters the idle state and is registered with the HLR at step 1815, the HLR sends the status of the called terminal to the APS server at step 1817. At this time, the called terminal status corresponds to the idle state.

The APS server that has received the status of the called terminal sends a voice message call request signal to the UCS-IP server at step 1819. The UCS-IP server attempts an outbound call to the MSC/PCX connected through E1 or T1 at step 1821. The MSC/PCX sends a call set-up request signal to the called terminal at step 1823, and receives a call set-up response signal in response thereto at step 1825. The MSC/PCX sends a call set-up request signal to the called terminal at step 1823, and receives the call set-up response signal from the called terminal in response thereto at step 1825. The MSC/PCX sends an outbound call response signal to the UCS-IP server corresponding to the call set-up response signal at step 1827, so that a call path is established between the UCS-IP server of the service providing apparatus and the called terminal. The UCS-IP server sends the voice message, which was left by the calling subscriber, to the called terminal using the call path at step 1829.

Figure 19:
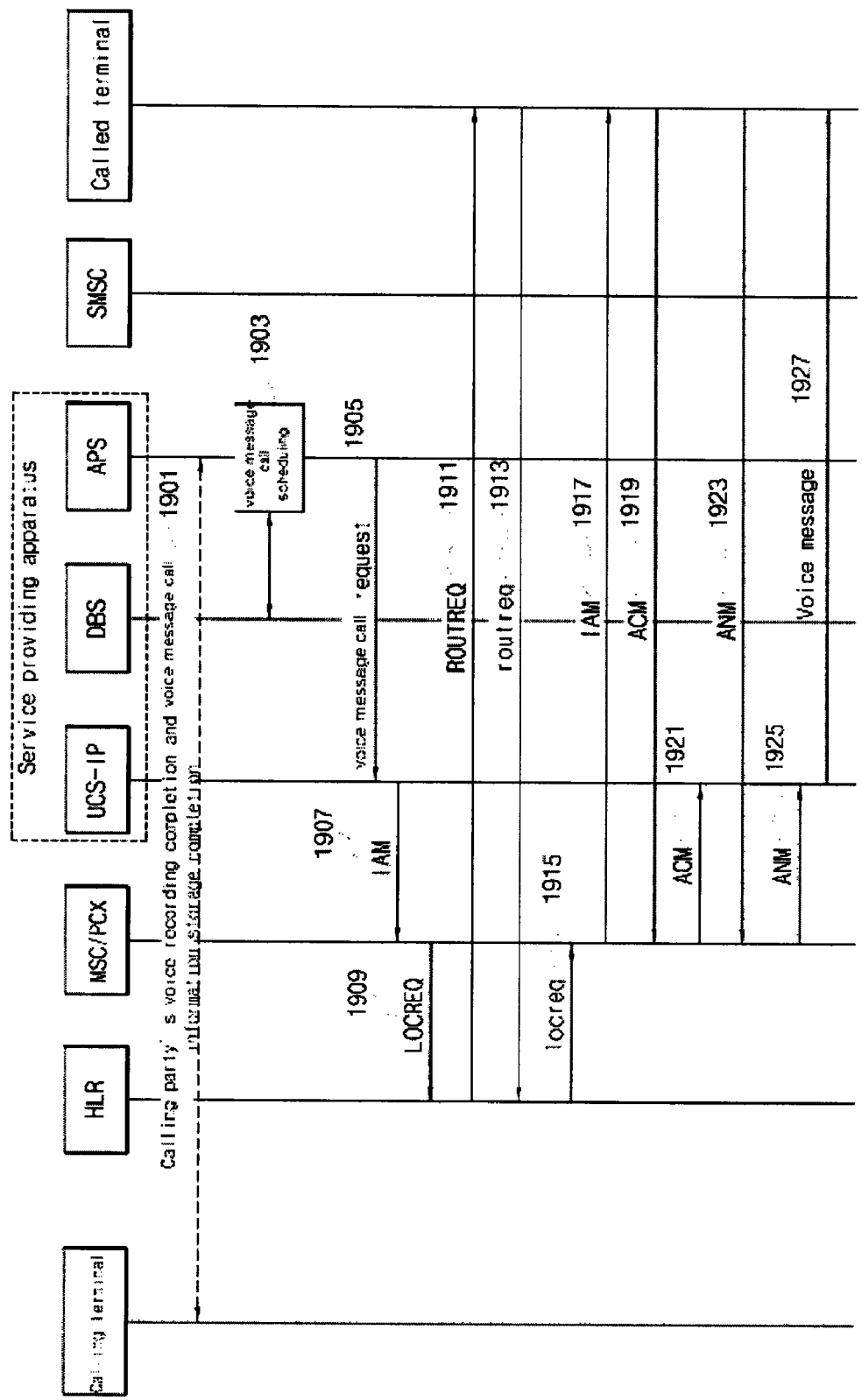
FIG. 19 is a signal flowchart illustrating a procedure for examining the status of a called terminal using an Address Complete Message (ACM), in accordance with a preferred embodiment of the present invention.

FIG. 19 is a signal flowchart illustrating a procedure for examining the status of a called terminal using an ACM, in accordance with a preferred embodiment of the present invention. The method of examining the status of the called terminal, which is described in this drawing, refers to a method of examining the status of the called terminal in such a way that the APS server sends a voice message call request signal to the UCS-IP server, and the UCS-IP server generates a call through E1/T1 and examines the called terminal status indicator field value of the backward call indicator of an ACM received from a counterpart station.

Referring to FIG. 19, the calling terminal gains access to the UCS-IP server of the service providing apparatus and stores a voice message, which will be transferred to the called terminal, in the UCS-IP server. The UCS-IP server sends voice message call information to the DBS server and the APS server, so that the storage of the voice message call information is completed at step 1901. In this case, step 1901 corresponds to steps 901 to 921 of FIG. 9, steps 1001 to 1021 of FIG. 10, and steps 1101 to 1139 of FIG. 11. Thereafter, the APS server fetches the voice message call information from the DBS to perform voice message call scheduling at step 1903.

The APS server sends a voice message call request signal to the UCS-IP server according to voice message call scheduling at step 1905. The UCS-IP server sends an IAM signal to the MSC/PCX at step 1907. The MSC/PCX sends a LOCREQ (Location Request) signal to the HLR in order to know the location of the called terminal at step 1909. The HLR transits a routing request (ROUTREQ) signal to an incoming-side MSC/PCX at step 1911. The incoming-side MSC/PCX sends a routreq signal including routing information (a TLDN) to the HLR in response to the ROUTREQ signal at step 1913. The HLR sends a locreq signal including a TLDN to the MSC/PCX in response to the LOCREQ signal at step 1915.

The MSC/PCX sends the IAM signal to the incoming-side MSC/PCX on the basis of the TLDN at step 1917. The incoming-side MSC/PCX sends an ACM signal to the MSC/PCX at step 1919. At this time, the ACM signal includes information on the status of the called terminal, which is carried on the value of the called terminal status indicator field of the backward call indicator, as well as a backward call indicator. The MSC/PCX transfers the ACM signal to the UCS-IP server at step 1921. At this time, if the called terminal is not in an idle state, the UCS-IP server does not progress a corresponding call, but informs the APS server that the corresponding call has failed. Thereafter, the service providing apparatus reattempts the call according to retry scheduling. If the called terminal is in an idle state, the incoming-side MSC/PCX sends an ANM signal to the MSC/PCX at step 1923, and the MSC/PCX sends the ANM signal to the UCS-IP server at step 1925. Thereafter, the UCS-IP server sends a voice message, which is recorded by a calling subscriber, to the called terminal at step 1927.

Figure 20:
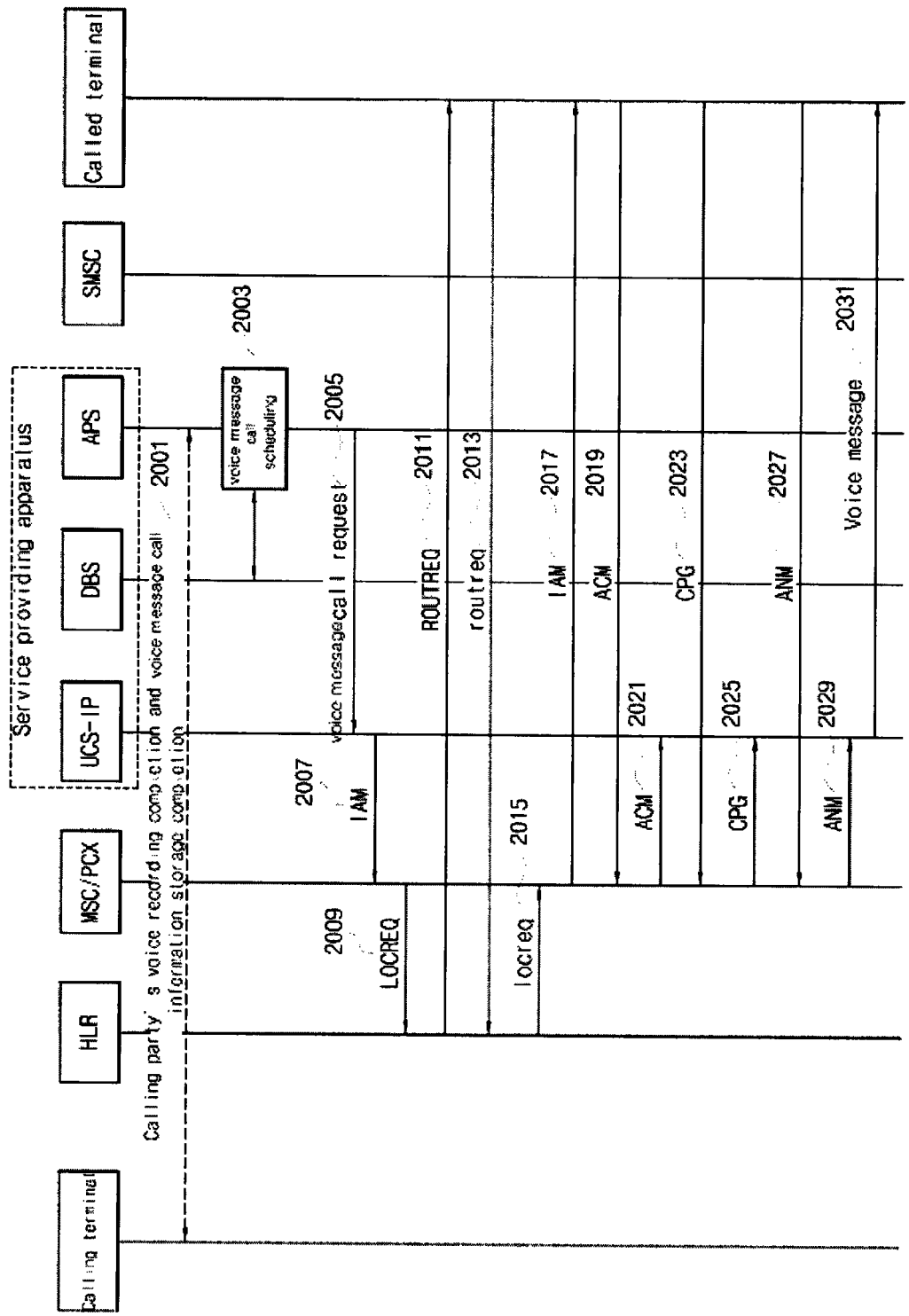
FIG. 20 is a signal flowchart illustrating a procedure for examining the status of a called terminal using a Call ProGress (CPG), in accordance with a preferred embodiment of the present invention.

FIG. 20 is a signal flowchart illustrating a procedure for examining the status of the called terminal using a CPG according to a preferred embodiment of the present invention. The method of examining the status of the called terminal, which is described in this drawing, refers to a method of determining that the called terminal is not in an idle state if the APS server sends a voice message call request signal to the UCS-IP server and the UCS-IP server generates a call through E1/T1 and receives a CPG message subsequent to an ACM message from a counterpart station.

Referring to FIG. 20, the calling terminal gains access to the UCS-IP server of the service providing apparatus and stores a voice message, which will be transferred to the called terminal, in the UCS-IP server. The UCS-IP server sends voice message call information to the DBS server and the APS server, so that the storage of the voice message call information is completed at step 2001. In this case, step 2001 corresponds to steps 901 to 921 of FIG. 9, steps 1001 to 1021 of FIG. 10, and steps 1101 to 1139 of FIG. 11. Thereafter, the APS server fetches the voice message call information from the DBS to perform voice message call scheduling at step 2003.

The APS server sends a voice message call request signal to the UCS-IP server according to voice message call scheduling at step 2005. The UCS-IP server sends an IAM signal to the MSC/PCX at step 2007. The MSC/PCX sends a location request signal LOCREQ to the HLR in order to know the location of the called terminal at step 2009. The HLR sends a routing request signal ROUTREQ to an incoming-side MSC/PCX at step 2011. The incoming-side MSC/PCX sends a routreq signal, including routing information (TLDN), to the HLR in response to the ROUTREQ signal at step 2013. The HLR sends a locreq signal, including a TLDN, to the MSC/PCX in response to the LOCREQ signal at step 2015.

The MSC/PCX sends the IAM signal to the incoming-side MSC/PCX based on the TLDN at step 2017. The incoming-side MSC/PCX sends an ACM signal to the MSC/PCX at step 2019. The MSC/PCX transfers the ACM signal to the UCS-IP server at step 2021.

Thereafter, if the called terminal is busy or unable to respond, the incoming-side MSC/PCX sends a CPG signal to the MSC/PCX at step 2023, and the MSC/PCX transfers the CPG signal to the UCS-IP server at step 2025. At this time, if the UCS-IP server has received the CPG signal from the MSC/PCX, the UCS-IP server determines that the called terminal is busy or unable to respond, informs the APS server of failure, and then terminates a corresponding call. Thereafter, the service providing apparatus can reattempt a call according to retry scheduling. If the called terminal is in an idle state, the incoming-side MSC/PCX sends an ANM signal to the MSC/PCX at step 2027, and the MSC/PCX sends the ANM signal to the UCS-IP server at step 2029. That is, in the case where the UCS-IP server does not receive the CPG signal but receives the ANM signal, the called terminal is determined to be in an idle state. Thus, the UCS-IP server sends a voice message, which was recorded by a calling subscriber, to the called terminal at step 2031.

Figure 21:
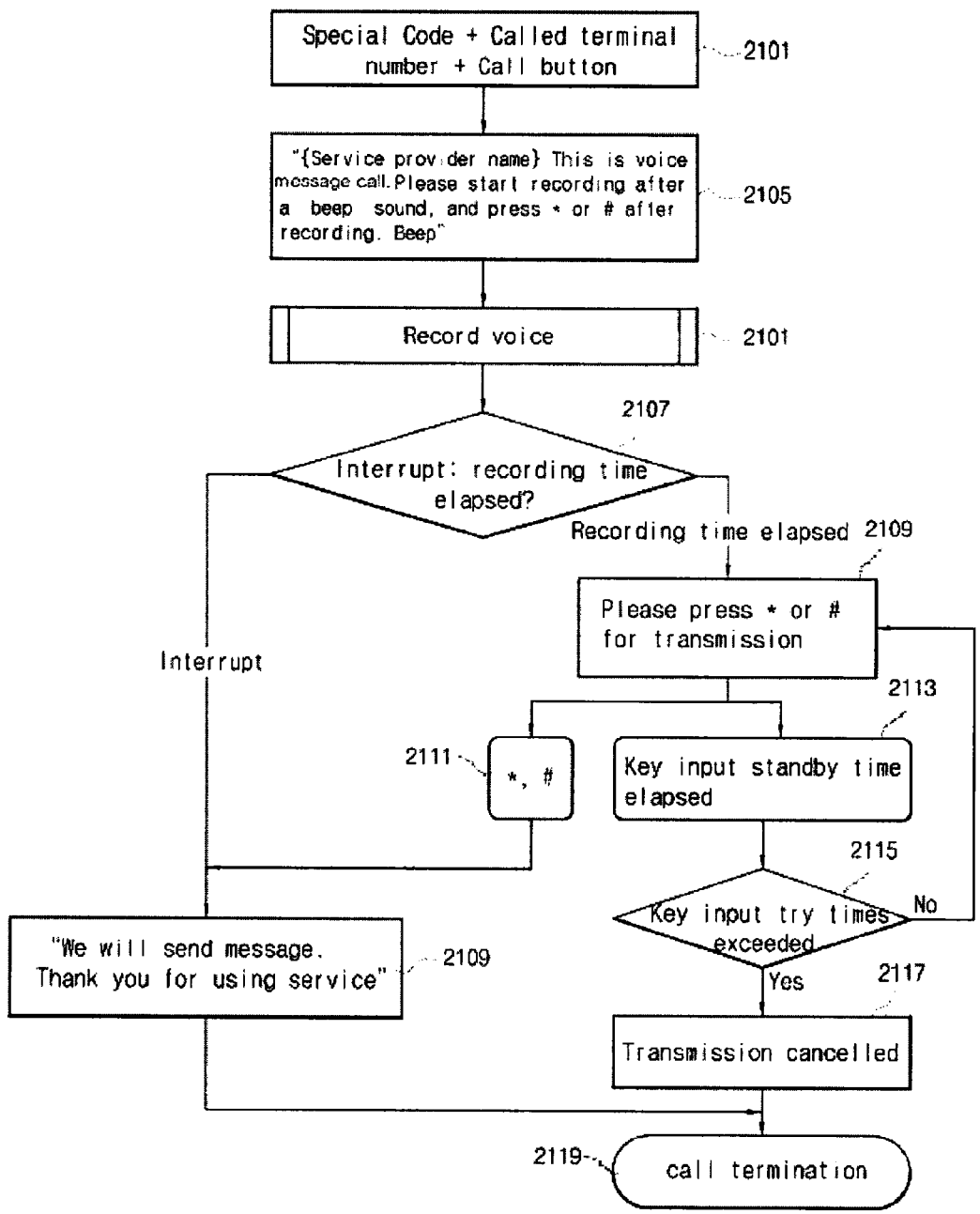
FIG. 21 is a flowchart illustrating a scenario of a process in which the calling terminal records and sends a voice message, which will be sent to a called terminal, in accordance with a preferred embodiment of the present invention.

FIG. 21 is a flowchart illustrating a scenario of a process in which the calling terminal records and sends a voice message, which will be sent to a called terminal, according to a preferred embodiment of the present invention.

Referring to FIG. 21, the calling subscriber enters a feature code for a voice message call according to the present invention, a called terminal number and a call button on the calling terminal, and the calling terminal gains access to the service providing apparatus at step 2101. The service providing apparatus outputs a guidance message, such as "[Service provider name.] This is a voice message call. Please start recording after the "beep" sound, and press * or # after recording. Beep" to the calling terminal of the calling subscriber at step 2103. The user of the called terminal records a voice message to be transferred to the called terminal according to the guidance message at step 2105. The service providing apparatus determines whether there is an interrupt or a recording time has elapsed based on the input of * or # at step 2107. If, as a result of the determination, there is an interrupt, step 2109 is performed; and if, as a result of the determination, the recording time has elapsed, step 2109 is performed. At step 2109, the service providing apparatus outputs a message, stating "We will send you a message. Thank you for using the service," to the calling subscriber.

At step 2109, the service providing apparatus outputs a message, stating "Please press * or # for transmission," to the calling subscriber at step 2109. Thereafter, if *or # is pressed at step 2111, step 2109 is performed. If a predetermined key input time has elapsed, step 2115 is performed.

At step 2115, the service providing apparatus determines whether the number of predetermined allowable input attempts has been exceeded. If, as a result of the determination, the number of predetermined allowable input attempts has been exceeded, step 2117 is performed; and if, as a result of the determination, the number of predetermined allowable input attempts has not been exceeded, the process returns to step 2109.

At step 2117, the service providing apparatus outputs a message, stating "Transmission has been cancelled," to the calling subscriber at step 2117. The call is then terminated at step 2119.

Figure 22:
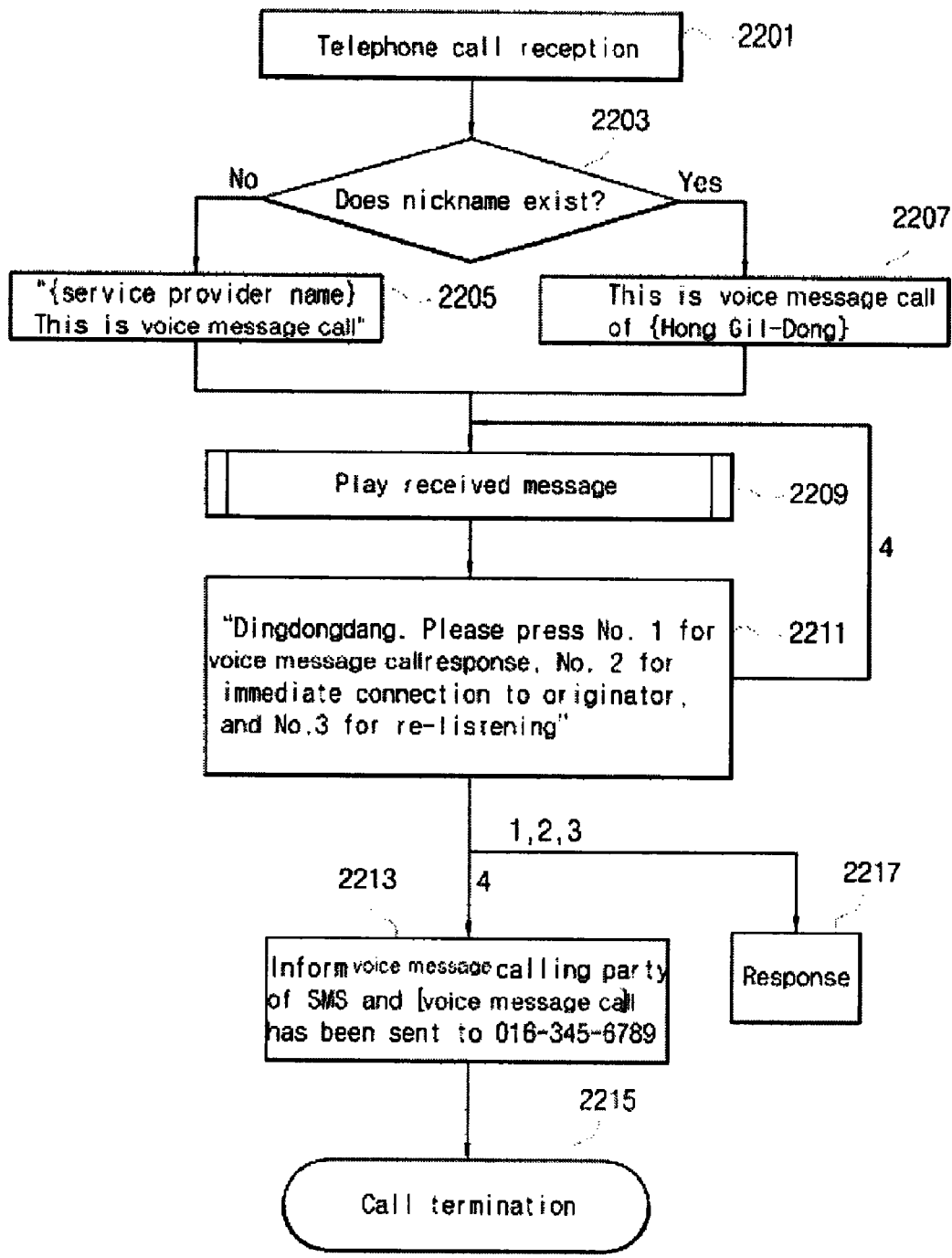
FIG. 22 is a flowchart illustrating a scenario of a process of listening to a voice message in a called terminal, in accordance with a preferred embodiment of the present invention.

FIG. 22 is a flowchart illustrating a scenario of a process of listening to a voice message in the called terminal according to a preferred embodiment of the present invention.

Referring to FIG. 22, the called terminal receives a telephone call in order to receive a voice message call from the service providing apparatus at step 2201. The service providing apparatus determines whether a nickname for the calling subscriber exists at step 2203. If, as a result of the determination, the nickname does not exist, step 2205 is performed; and if, as a result of the determination, the nickname exists, step 2207 is performed.

If the nickname does not exist, the service providing apparatus outputs a message, stating "[Service provider name.] This is a voice message call," to a called subscriber at step 2205. If the nickname exists, the service providing apparatus outputs a message stating "This is a voice message call from [Hong Gil-Dong]" to the called subscriber at step 2207. In this example, [Hong Gil-Dong] is a nickname, which is set by the calling subscriber and converted into voice in the TTS server of the service providing apparatus.

Thereafter, the service providing apparatus outputs a voice message, which is recorded by the calling subscriber, to the called subscriber at step 2209. The service providing apparatus plays all the voice message and then outputs a message, stating "Dingdongdang. Please press No. 1 to make a voice message call response, No. 2 to an immediate connection with the calling party, No. 3 to call the calling party, and No. 4 to listen again," to the called subscriber at step 2211. At this time, if the called subscriber presses No. 4, the service providing apparatus again outputs the voice message to the called terminal, sends a character message, stating "[a voice message call] has been sent to 016-345-6789," to the calling subscriber at step 2213, and then terminates the call at step 2215. At this time, the service providing apparatus can first terminate the call, and then send the character message to the calling subscriber.

After step 2211, if the called subscriber presses No. 1, 2 or 3, the service providing apparatus performs the response procedure corresponding to the pressed number at step 2217. The response procedure of step 2217 is described in detail with reference to FIG. 23 below.

Figure 23:
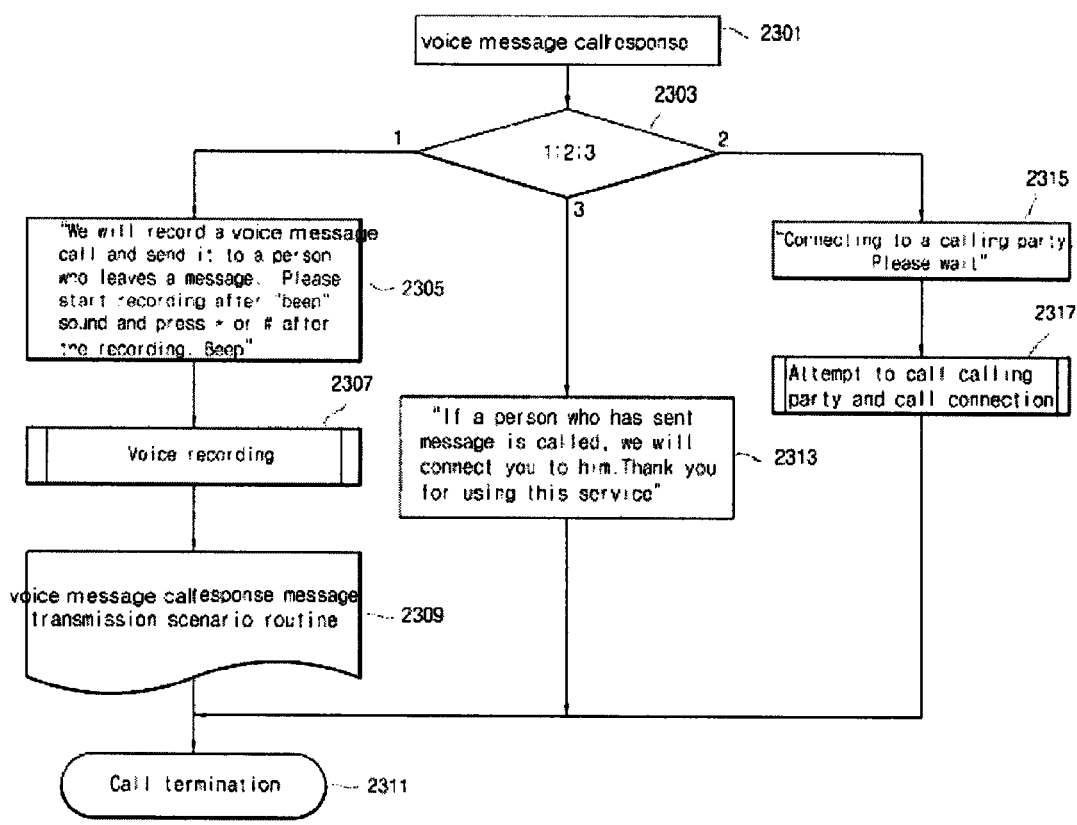
FIG. 23 is a flowchart illustrating a scenario of a process of listening to a voice message and making a reply in the called terminal, in accordance with a preferred embodiment of the present invention.

FIG. 23 is a flowchart illustrating a scenario of a process of listening to a voice message and making a reply in a called terminal according to a preferred embodiment of the present invention.

Referring to FIG. 23, the called subscriber listens to a received voice message, and makes a reply to a voice message call by inputting a corresponding number according to a guidance message provided by the service providing apparatus in order to make a reply to the calling subscriber at step 2301. The service providing apparatus determines the number input by the called subscriber at step 2303. At this time, if the called subscriber presses No. 1 in order to transfer a call response, step 2305 is performed. If the called subscriber presses No. 2 for immediate connection to the calling party, step 2315 is performed. If the called subscriber presses No. 3 for call to the calling party, step 2313 is performed.

If No. 1 is pressed at step 2303, the service providing apparatus outputs a guidance message, stating "We will record a voice message call and send it to a person who leaves a message. Please start recording after the "beep" sound and press * or # after recording. Beep" to the called subscriber at step 2307. The called subscriber records a voice message, which will be sent to the calling subscriber in voice message call response form, at step 2307. Thereafter, the service providing apparatus sends a response message to the calling subscriber according to a voice message call response message transmission scenario at step 2309, and then terminates the call at step 2311.

If No. 2 is pressed at step 2303, the service providing apparatus outputs a message, stating "Connect to the calling party. Please hold on," to the called subscriber at step 2315. Thereafter, the service providing apparatus dials the calling subscriber, so that the called subscriber and the calling subscriber make a voice call at step 2317. Thereafter, when communication between the called subscriber and the calling subscriber is terminated, the call is terminated at step 2311.

If No. 3 is pressed at step 2303, the service providing apparatus outputs a message, stating "If the person who sent a message is called, we will connect you to him. Thank you for using the service," to the called subscriber at step 2313, and terminates the call at step 2311.

Figure 24:
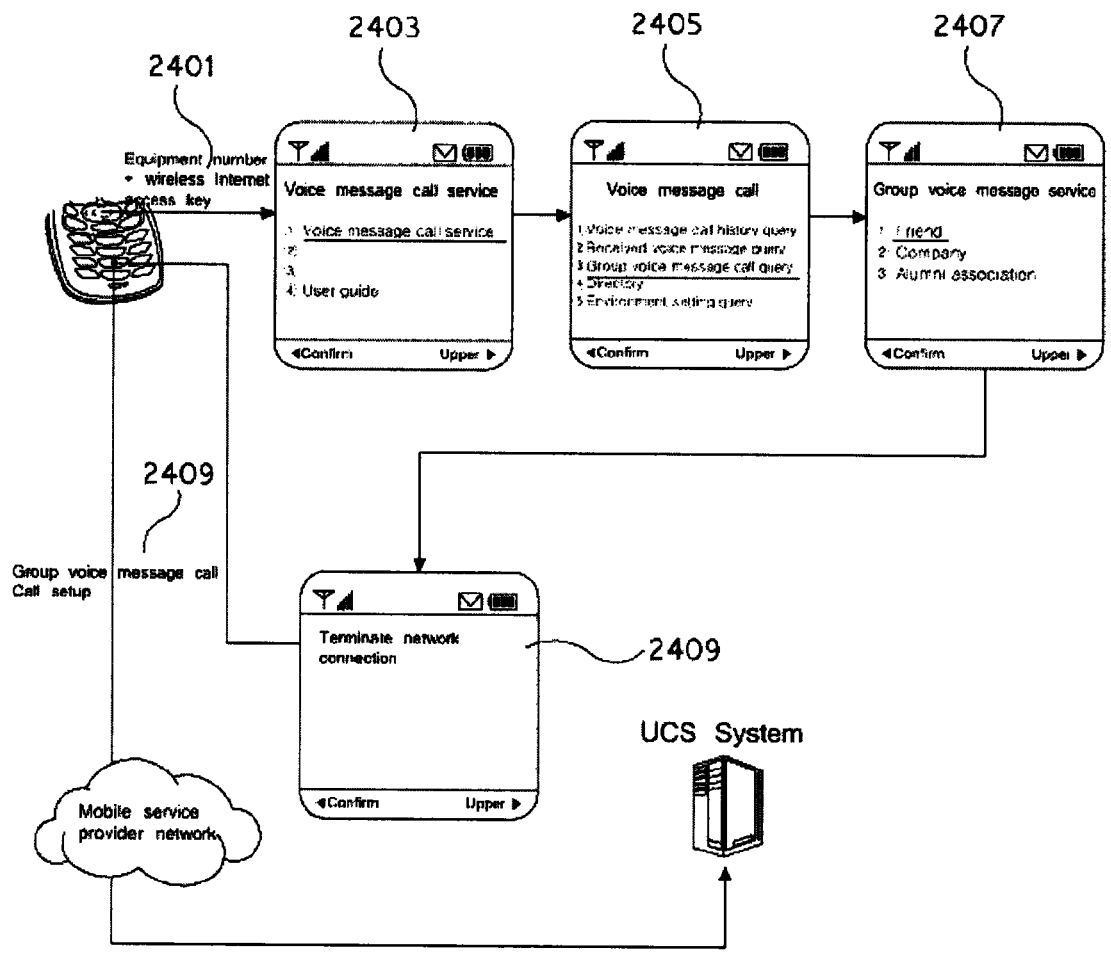
FIG. 24 is a view illustrating an example of the screen of the calling terminal illustrating group voice message call service, in accordance with a preferred embodiment of the present invention.

FIG. 24 is an exemplary view of the screen of a calling terminal illustrating group voice message call service according to a preferred embodiment of the present invention. This drawing shows the group voice message call screen over the wireless Internet. In this drawing, there is shown a group voice message call in which a calling customer leaves one message using "equipment number+wireless Internet access key", and the message is sent to several called parties registered in a group directory.

Referring to FIG. 24, if the calling subscriber inputs an equipment number and presses a wireless Internet access key, the calling terminal is connected to a service providing apparatus through the wireless Internet at step 2401. The service providing apparatus provides the calling terminal with a voice message call screen 2403. The calling terminal displays the voice message call screen 2403 on the display unit thereof. If a voice message call item is selected and pressed in the voice message call screen 2403, a voice message call menu screen

2405 is displayed on the display unit of the calling terminal. If a group voice message call item is selected on the voice message call menu screen 2405, a group list screen 2407 that is predetermined by a calling subscriber is displayed on the display unit of the calling terminal. At this time, if a specific group such as a friend item is selected, connection to the wireless Internet is terminated, and a wireless Internet completion screen 2409 is displayed on the display unit of the calling terminal. Thereafter, the calling terminal is connected for a voice call to the UCS-IP server of the service providing apparatus through a mobile communication network in order to record a voice message for the group voice message call (2409). The UCS-IP server receives a voice message from the calling subscriber and transfers the voice message to called subscribers corresponding to the friend group.

For the voice message call service according to the present invention, it is necessary to provide a customer using the voice message call service with an interface that processes a voice message call use history, management for received voice message call message, a user nickname, directory management for group voice message calls, mail box password management and the like. An access method using the voice message call management function of the present invention can be mainly classified into three types. The first one is a method of inputting an equipment number and then using the wireless Internet key of the mobile phone. In this case, the equipment number is one's own mobile communication subscription number for voice message call service management. The second one is a method of gaining access to a wired Internet through the web. The third one is a method of allowing a subscriber to press a feature code and an equipment number and then press a call button, as in the existing voice communication method (also including a method in which only a feature code is pressed and an MSC mobile communication network recognizes that the feature code corresponds to a management function and performs routing to the service providing apparatus). The first method is described with reference to FIGS. 25 to 28 below, the second method is described with reference to FIGS. 29 to 34 below, and the third method is described with reference to FIGS. 35 to 38 below.

The voice message call management function through the wireless Internet according to a preferred embodiment of the present invention is described with reference to FIGS. 25 to 28 below.

Figure 25:
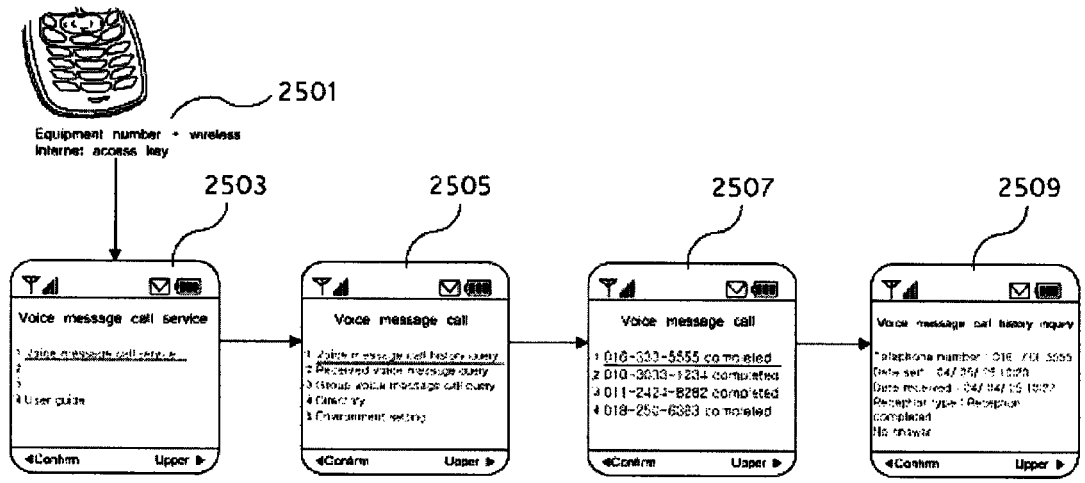
FIG. 25 is a view illustrating an example of the screen of the mobile terminal for querying a voice message call history, in accordance with a preferred embodiment of the present invention.

FIG. 25 illustrates a screen of a mobile terminal for querying a voice message call history according to a preferred embodiment of the present invention.

Referring to FIG. 25, if the subscriber of the mobile terminal inputs an equipment number and presses a wireless Internet access key, the mobile terminal is connected to a service providing apparatus over the wireless Internet at step 2501. The service providing apparatus provides the mobile terminal with a voice message call screen 2503. The mobile terminal displays the voice message call screen 2503 on the display unit thereof. If a voice message call item is selected and pressed on the voice message call screen 2503, a voice message call menu screen 2505 is displayed on the display unit of the mobile terminal. If a group voice message call history query item is selected and pressed in the voice message call menu screen 2505, a screen 2507 for voice message call history query is displayed on the display unit of the mobile terminal. In this case, the screen 2507 for the voice message call history query includes a sent voice message call voice message list. If a specific voice message of voice message call item is selected and pressed, a history screen 2509 for a corresponding voice message of voice message call is displayed on the display unit. It is also possible to listen to the sent voice message of voice message call (not shown).

Figure 26:
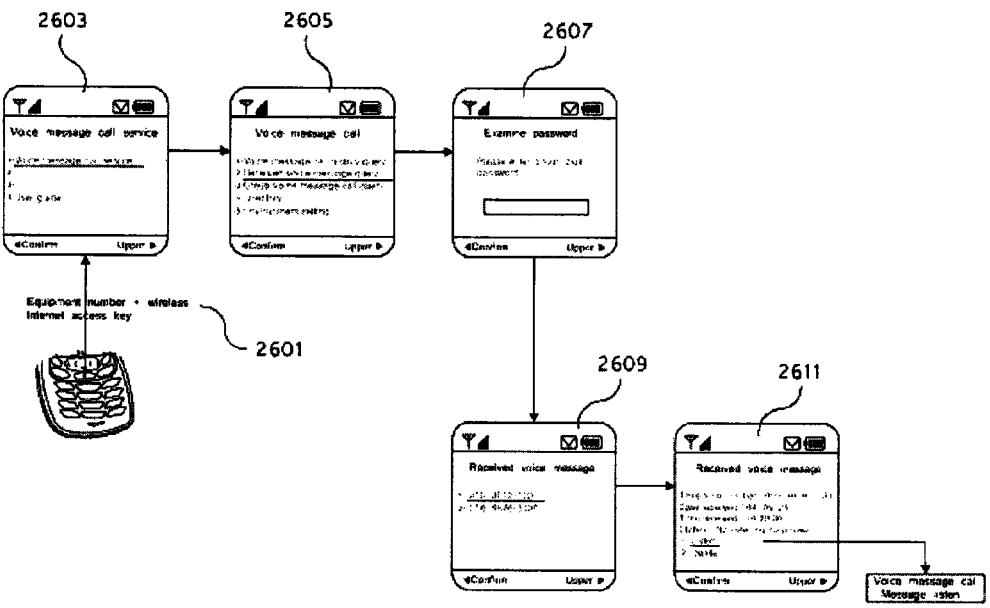
FIG. 26 is a view illustrating an example of the screen of the called terminal for managing received voice messages, in accordance with a preferred embodiment of the present invention.

FIG. 26 illustrates the screen of a called terminal for managing received voice messages according to a preferred embodiment of the present invention.

Referring to FIG. 26, if the subscriber of the mobile terminal inputs an equipment number and presses a wireless Internet access key, a mobile terminal is connected to a service providing apparatus over the wireless Internet at step 2601. The service providing apparatus provides the mobile terminal with a voice message call screen 2603. The mobile terminal displays the voice message call screen 2603 on the display unit thereof. If a voice message call item is selected and pressed in the voice message call screen 2603, a voice message call menu screen 2605 is displayed on the display unit of the mobile terminal. If a voice message call item is selected and pressed in the voice message call screen 2603, the voice message call menu screen 2605 is displayed on the display unit of the mobile terminal. If a voice message item received from the voice message call menu screen 2605 is selected and pressed, a screen 2607 for confirming a password is displayed on the display unit of the mobile terminal. If a correct password is input in the screen 2607 for examining the password, a received voice message list screen 2609 is displayed on the display unit. If a specific voice message is selected on the received voice message list screen 2609, a screen 2611 for details of a corresponding voice message is displayed on the display unit. At this time, the voice message detail screen 2611 includes a listen item and a delete item. A user can listen to or delete a corresponding message using these items.

Figures 27, 28:
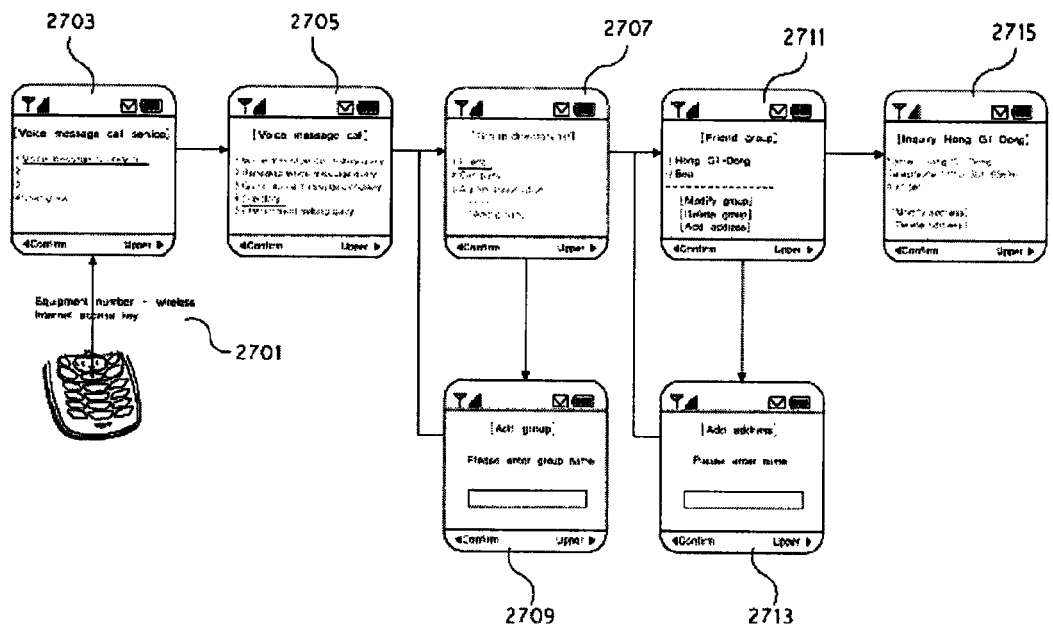
FIG. 27 is a view illustrating an example of the screen of the mobile terminal for managing a group directory, in accordance with a preferred embodiment of the present invention.
FIG. 28 is a view illustrating an example of the screen of the mobile terminal for setting a voice message call environment, in accordance with a preferred embodiment of the present invention.

FIG. 27 illustrates the screen of a mobile terminal for managing a group directory according to a preferred embodiment of the present invention.

Referring to FIG. 27, if the subscriber of the mobile terminal inputs an equipment number and presses a wireless Internet access key, a mobile terminal is connected to a service providing apparatus over the wireless Internet at step 2701. The service providing apparatus provides the mobile terminal with a voice message call screen 2703. The mobile terminal displays the voice message call screen 2703 on the display unit thereof. If a voice message call item is selected and pressed on the voice message call screen 2703, a voice message call menu screen 2705 is displayed on the display unit of the mobile terminal. If a directory item is selected and pressed in the voice message call menu screen 2705, a group directory management screen 2707 is displayed on the display unit of the mobile terminal. In this case, the group directory management screen 2707 includes a predetermined group directory list and a group addition item. If the group addition item is selected on the group directory management screen 2707, a screen 2709 for group addition is displayed on the display unit. A user can add a new group to the screen 2709.

If a specific group such as a friend group is selected on the group directory management screen 2707, an information screen 2711 for a corresponding specific group is displayed on the display unit. The screen 2711 includes a list of names of members belonging to a group, a group modification item, a group deletion item, an address addition item and the like. If the address addition item is selected on the group information screen 2711, a screen 2713 for adding a new member to a corresponding group is displayed on the display unit. A user can add a new member through the screen 2713. If the name of a specific member (e.g., Hong Gil-Dong) is selected on the group information screen 2711, an information screen 2715 corresponding to a corresponding member is displayed on the display unit.

FIG. 28 illustrates the screen of a mobile terminal for setting a voice message call environment according to a preferred embodiment of the present invention.

Referring to FIG. 28, if the subscriber of the mobile terminal inputs an equipment number and presses a wireless Internet access key, a mobile terminal is connected to a service providing apparatus over the wireless Internet at step 2801. The service providing apparatus provides the mobile terminal with a voice message call screen 2803. The mobile terminal displays the voice message call screen 2803 on the display unit thereof. If a voice message call item is selected and pressed in the voice message call screen 2803, a voice message call menu screen 2805 is displayed on the display unit of the mobile terminal. If an environment setting item is selected and pressed on the voice message call menu screen 2805, a screen 2807 for environment setting is displayed on the display unit of the mobile terminal. In this case, the screen 2807 for environment setting includes a nickname setting item, a password change item and a reply voice message call fee setting item.

If the nickname setting item is selected on the screen 2807 for environment setting, a screen 2809 for nickname setting is displayed on the display unit. The nickname setting screen 2809 includes a nickname modification item. If the nickname modification item is selected, a screen 2811 for nickname change is displayed on the display unit. A user can change his or her nickname through the screen 2811.

If the password change item is selected on the screen 2807 for environment setting, a user can change his password through an existing password input screen 2813, a new password input screen 2815 and a password examination screen 2817.

If the reply voice message call fee setting item is selected on the screen 2807 for environment setting, a reply voice message call fee setting screen 2819 is displayed on the display unit. A user can set whether fees are to be charged to a called party, or himself or herself for a reply voice message call through the voice message call fee setting screen 2819.

The voice message call management function using the wired Internet according to a preferred embodiment of the present invention is described with reference to FIGS. 29 to 34 below.

Figure 31:
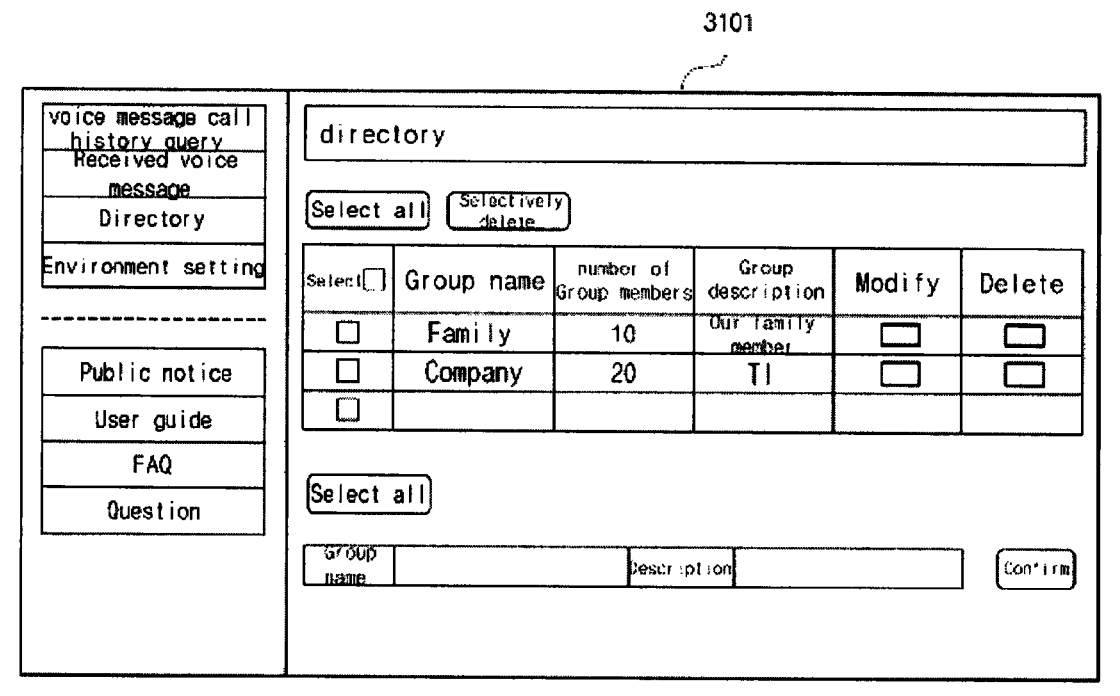
Figure 32:
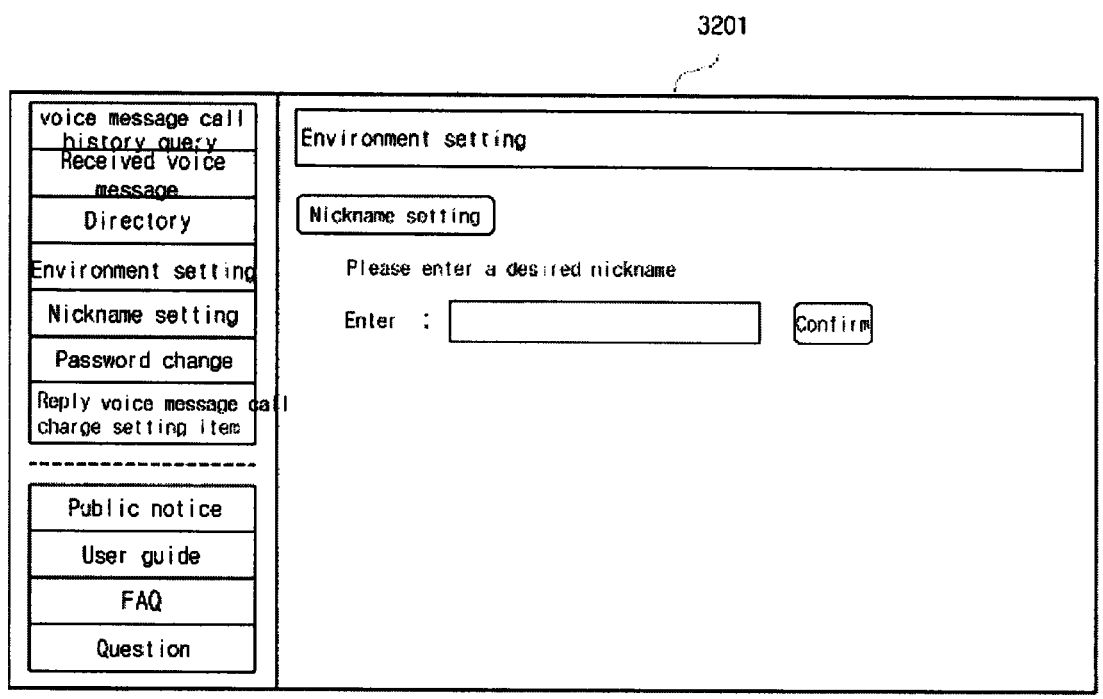
FIG. 32 is a view illustrating an example of an Internet screen for setting a voice message call nickname, in accordance with a preferred embodiment of the present invention.
Figure 33:
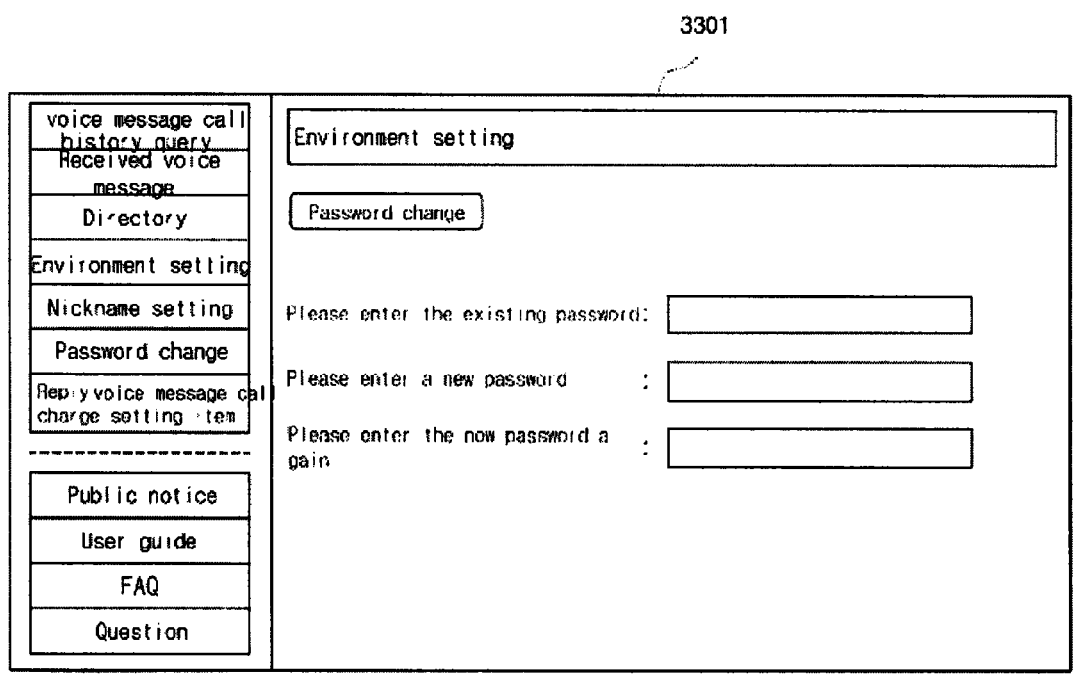
FIG. 33 is a view illustrating an example of an Internet screen for changing a password, in accordance with a preferred embodiment of the present invention.
Figure 34:
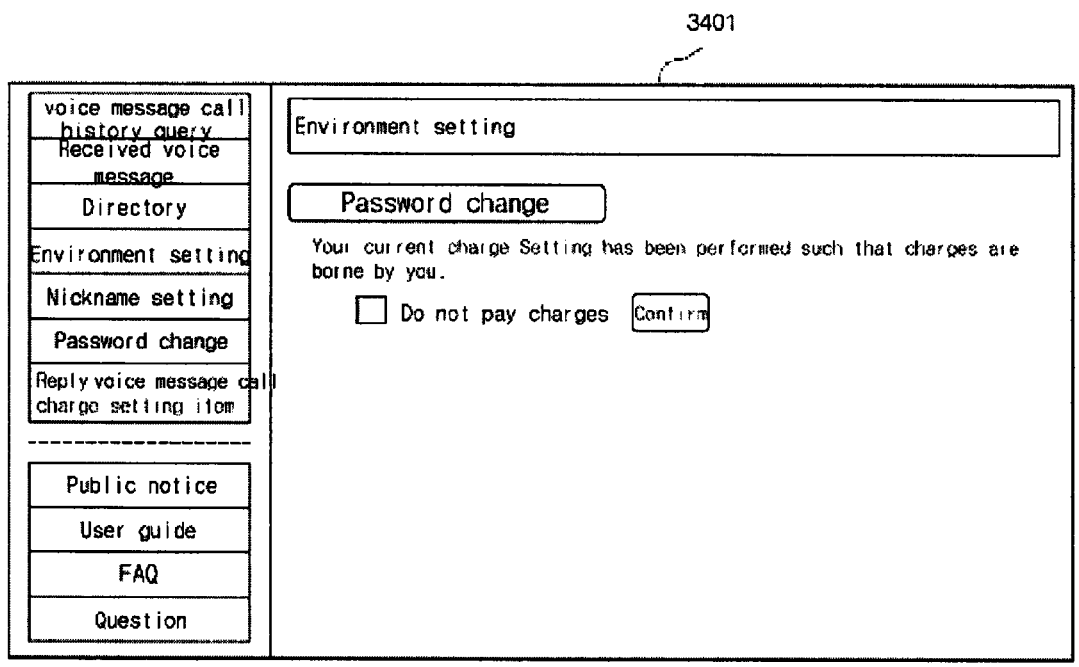
FIG. 34 is a view illustrating an example of an Internet screen for setting reply voice message call charges, in accordance with a preferred embodiment of the present invention.

FIG. 29 illustrates an Internet screen for querying a voice message call history. FIG. 30 illustrates an Internet screen for managing received voice messages. FIG. 31 illustrates an Internet screen for managing a voice message call group directory. FIG. 32 illustrates an Internet screen for setting a voice message call nickname. FIG. 33 illustrates an Internet screen for changing a password. FIG. 34 illustrates an Internet screen for setting reply voice message call charges.

Referring to FIGS. 29 to 34, if the subscriber of the mobile terminal gains access to a wired Internet for voice message call management, a main screen includes a menu for voice message call history query, received voice messages, directory, and environment setting. If the subscriber of the mobile terminal clicks on the menu items of the menu, a voice message call history query screen 2901, a received voice message screen 3001, a directory screen 3101 and environment setting screens 3201, 3301 and 3401 are output according to the selected menu item.

The voice message call history query screen 2901 includes a telephone number item, a transmission date item, a reception date item, a reception state item, a reply item and a listen item. The received voice message screen 3001 includes a transmission number item, a transmission date item, a reception date item, a reception state item, a reply item and a listen item. The directory screen 3101 includes a list for previously registered groups, and a group addition item. At this time, the list for the groups includes a group name item, a group member number item, a group description item, a modification item and a deletion item. The nickname setting screen 3201 for environment setting provides an input window for inputting a nickname. A password change screen 3301 for environment setting includes an existing password input window, a new password input window, and a new password confirmation input window. The reply voice message call fee setting screen 3401 for environment setting displays information on a person who pays current reply voice message call fees, and also includes an interface for setting himself or herself to the person that will be charged for a reply voice message call.

The voice message call management function using a voice communication method according to a preferred embodiment of the present invention is described with reference to FIGS. 35 to 38 below.

Figure 35:
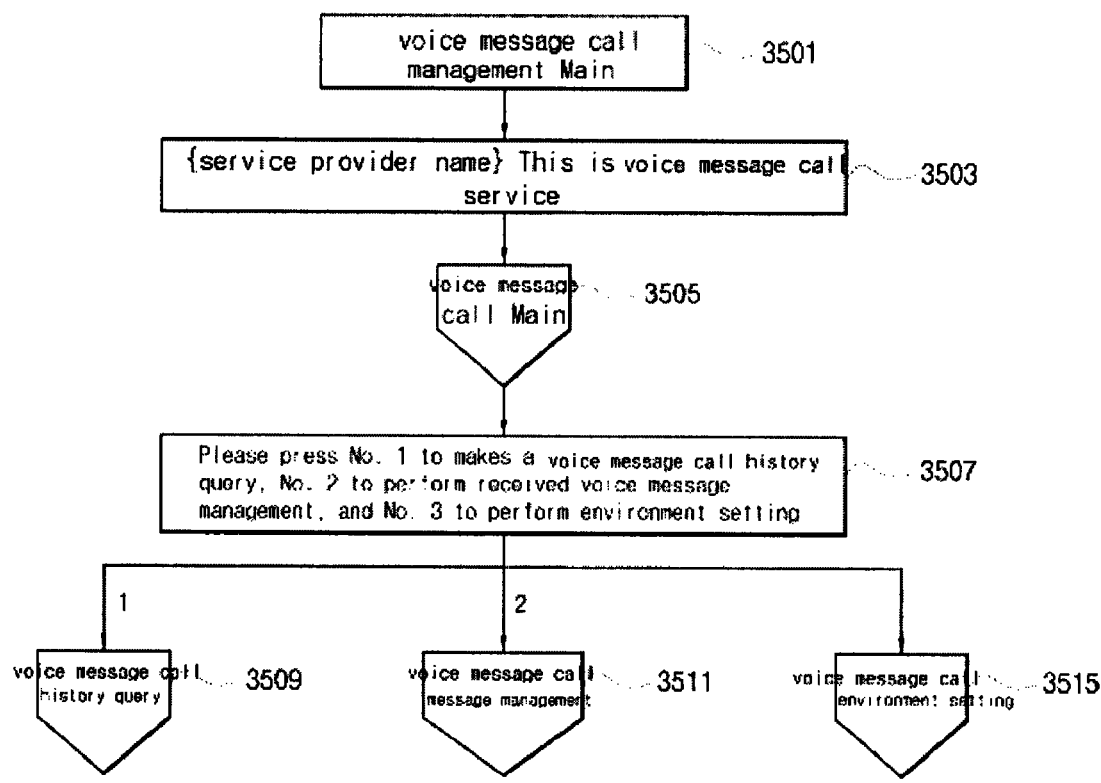
FIG. 35 is a flowchart illustrating a main Interactive Voice Response (IVR) scenario for managing a voice message call, in accordance with a preferred embodiment of the present invention.

FIG. 35 is a flowchart illustrating an IVR scenario for managing a voice message call service according to a preferred embodiment of the present invention.

Referring to FIG. 35, the user of the mobile terminal dials the service providing apparatus through the mobile communication network to gain access to the service providing apparatus in a voice message call management state at step 3501. The service providing apparatus outputs a message, stating "[Service provider name.] This is voice message call," to the user at step 3503, and enters the main state of a voice message call at step 3505. In the main state of the voice message call, the service providing apparatus outputs a message, stating "Please press No. 1 to make a voice message call history query, No. 2 to manage received voice messages, and No. 3 to set the environment," to the user at step 3507.

At this time, if the user presses No. 1, the service providing apparatus enters the voice message call history query state at step 3509. If the user presses No. 2, the service providing apparatus enters the voice message call message management state at step 3511. If the user presses No. 3, the service providing apparatus enters the voice message call environment setting state at step 3515.

Figure 36:
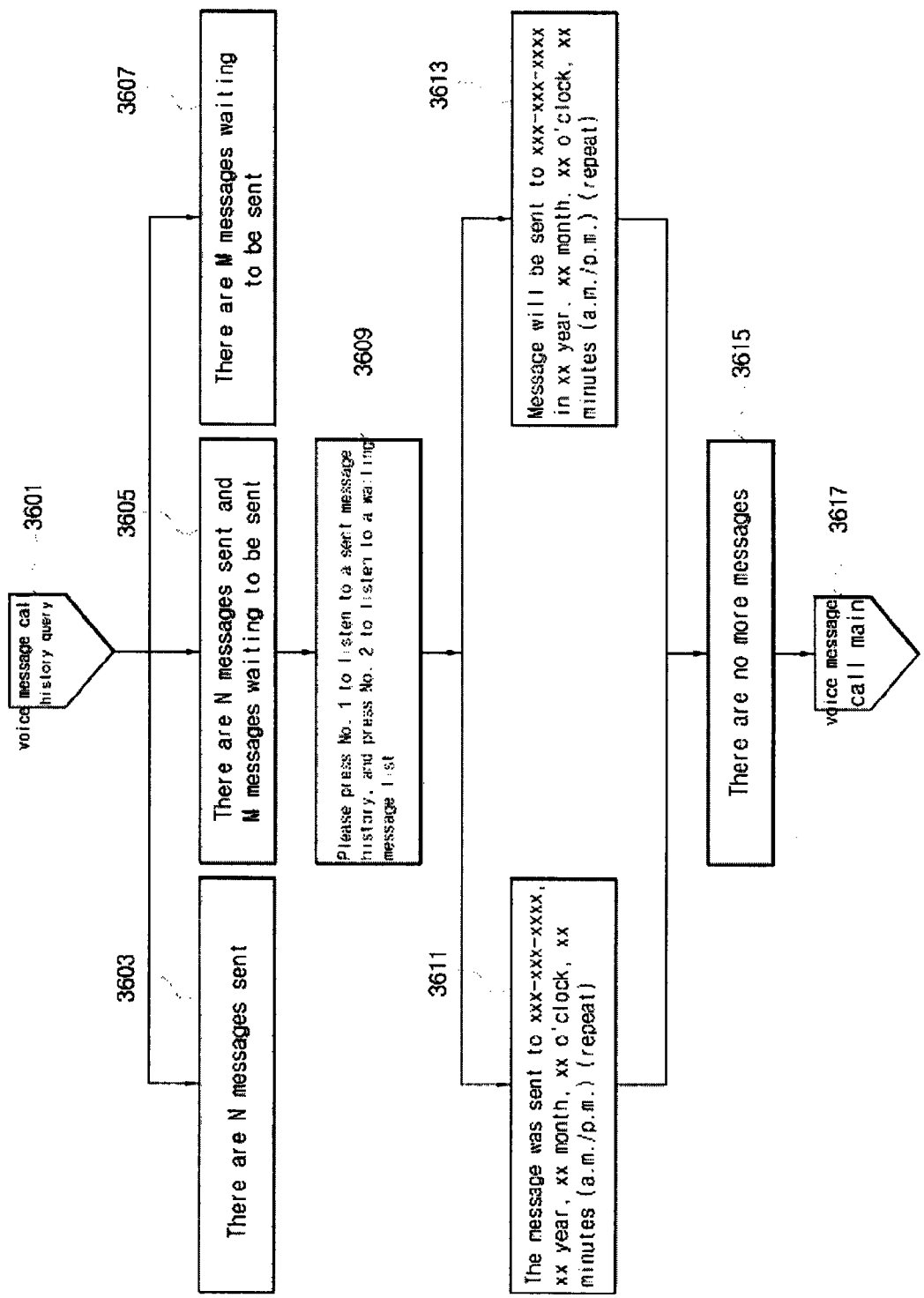
FIG. 36 is a flowchart illustrating an IVR scenario for voice message call history query, in accordance with a preferred embodiment of the present invention.

FIG. 36 is a flowchart illustrating an IVR scenario for voice message call history query according to a preferred embodiment of the present invention.

Referring to FIG. 36, after step 3507 of FIG. 35, if the user presses No. 1, a current IVR state is a voice message call history query state at step 3601. If, in the voice message call history query state, there exist only transferred messages, the service providing apparatus outputs a message, stating "There are N messages that have been sent," to the user at step 3603. If, in the voice message call history query state, there are sent messages and messages waiting to be sent, the service providing apparatus outputs a message, stating "There are N messages sent and M messages waiting to be sent," to the user at step 3605. Meanwhile, if, in the voice message call history query state, there are only messages waiting to be sent, the service providing apparatus outputs a message, stating "There are M messages waiting to be sent," to the user at step 3607.

After steps 3603, 3605 and 3607, the service providing apparatus outputs a message, stating "Please press No. 1 to listen to a sent message history, and press No. 2 to listen to a waiting message list," to the user at step 3609. At this time, if the user presses No. 1, the service providing apparatus repeatedly outputs a message stating "The message was sent to xxx-xxx-xxxx, xx year, xx month, xx o'clock, xx minutes (a.m./p.m.)," to the user as many times as the number of messages that have been sent at step 3611. Meanwhile, if the user presses No. 2, the service providing apparatus outputs a message stating "The message will be sent to xxx-xxx-xxxx, xx year, xx month, xx o'clock, xx minutes (a.m./p.m.)" to the user as many times as the number of messages waiting to be sent at step 3615.

After steps 3611 and 3613, the service providing apparatus outputs a message, stating "There are no more messages," to the user at step 3615 and causes the IVR state to enter the voice message call main state at step 3617.

Figure 37:
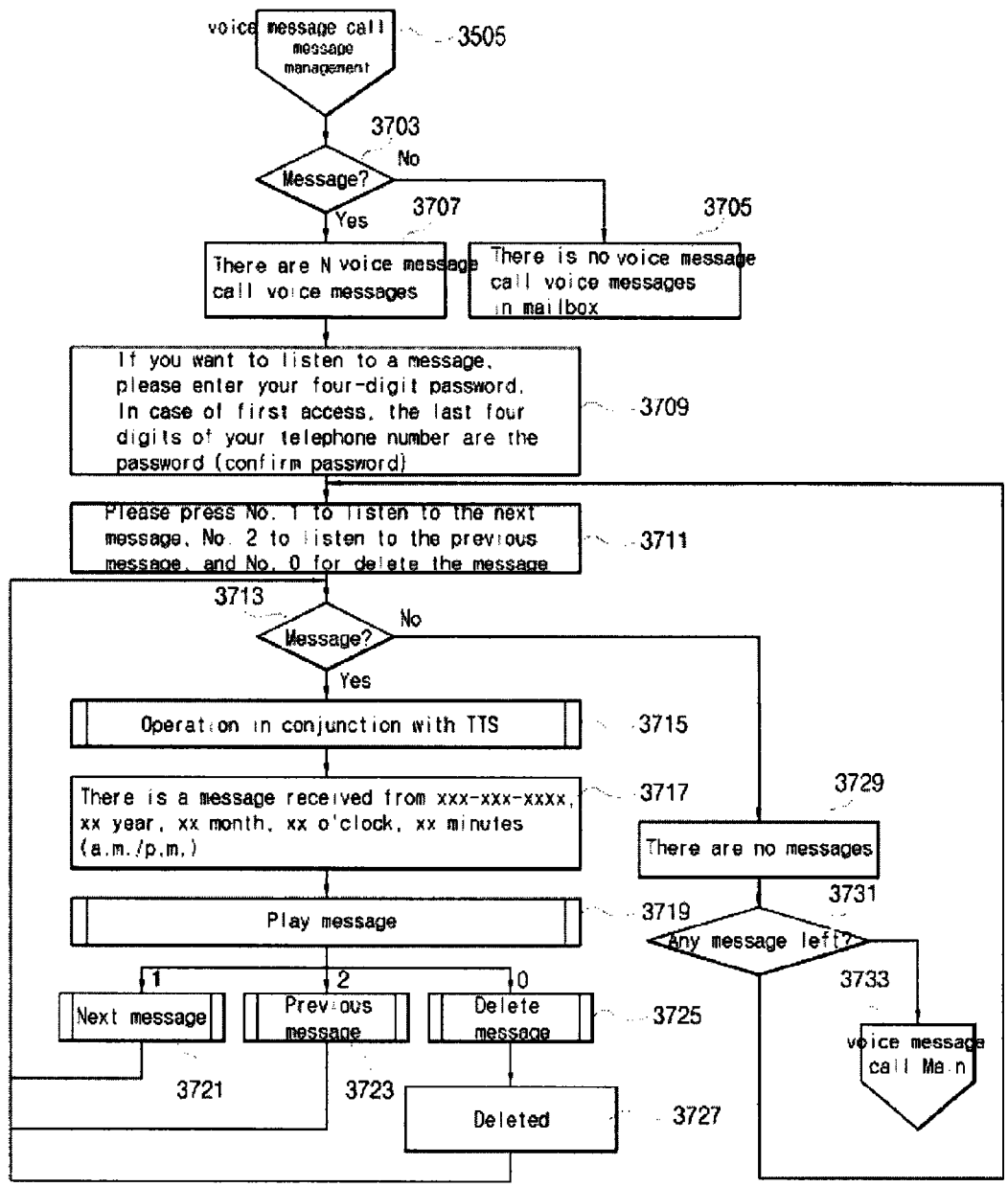
FIG. 37 is a flowchart illustrating an IVR scenario for managing received voice messages, in accordance with a preferred embodiment of the present invention.

FIG. 37 is a flowchart illustrating an IVR scenario for managing received voice messages according to a preferred embodiment of the present invention.

Referring to FIG. 37, after step 3507 of FIG. 35, if the user presses No. 2, the current IVR state is the voice message call message management state at step 3701. The service providing apparatus determines whether there are voice message call voice messages at step 3703. If, as a result of the determination, voice message call voice messages exist, step 3707 is performed; and if, as a result of the determination, voice message call voice messages do not exist, step 3705 is performed.

At step 3705, the service providing apparatus outputs a message, stating "There are no voice message call voice messages in the mailbox," to the user and then enters the voice message call main state. At step 3707, the service providing apparatus outputs a message, stating "There are N voice message call voice messages," to the user. Thereafter, the service providing apparatus outputs a message stating "If you want to listen to a message, please enter a four-digit password. If this is your first access, the last four digits of your telephone number are the password," to the user at step 3709. If the user enters a correct password, the service providing apparatus outputs a message, stating "Please press No. 1 to listen to the next message, No. 2 to listen to the previous message, and No. 0 to delete the message," to the user at step 3711.

Thereafter, the service providing apparatus determines whether there are any messages to be played. If there are messages to be played, step 3715 is performed; and if there are no messages to be played, step 3729 is performed.

At step 3729, the service providing apparatus outputs a message, stating "There are no more messages," to the user, and determines whether any messages exist at step 3731. At this time, if any messages exist, the service providing apparatus returns to step 3711. If there are no messages left, the service providing apparatus enters the voice message call main state at step 3733.

At step 3715, the service providing apparatus converts information on the message to be played into voice while operating in conjunction with the TTS server. The service providing apparatus then outputs a message, stating "There is a message received from xxx-xxx-xxxx, xx year, xx month, xx o'clock, xx minutes (a.m./p.m.)," to the user at step 3717. The service providing apparatus then outputs a corresponding message to the user and plays the message at step 3719. Thereafter, if the user presses No. 1, the service providing apparatus returns to step 3713 to listen to the next message at step 3721. If No. 2 is pressed, the service providing apparatus returns to step 3713 to listen to a previous message at step 3723.

Meanwhile, if the user presses No. 3 in order to delete a heard message, the service providing apparatus deletes the message at step 3725, outputs a message, stating "The message was deleted," to the user at step 3727, and then returns to step 3713.

Figure 38:
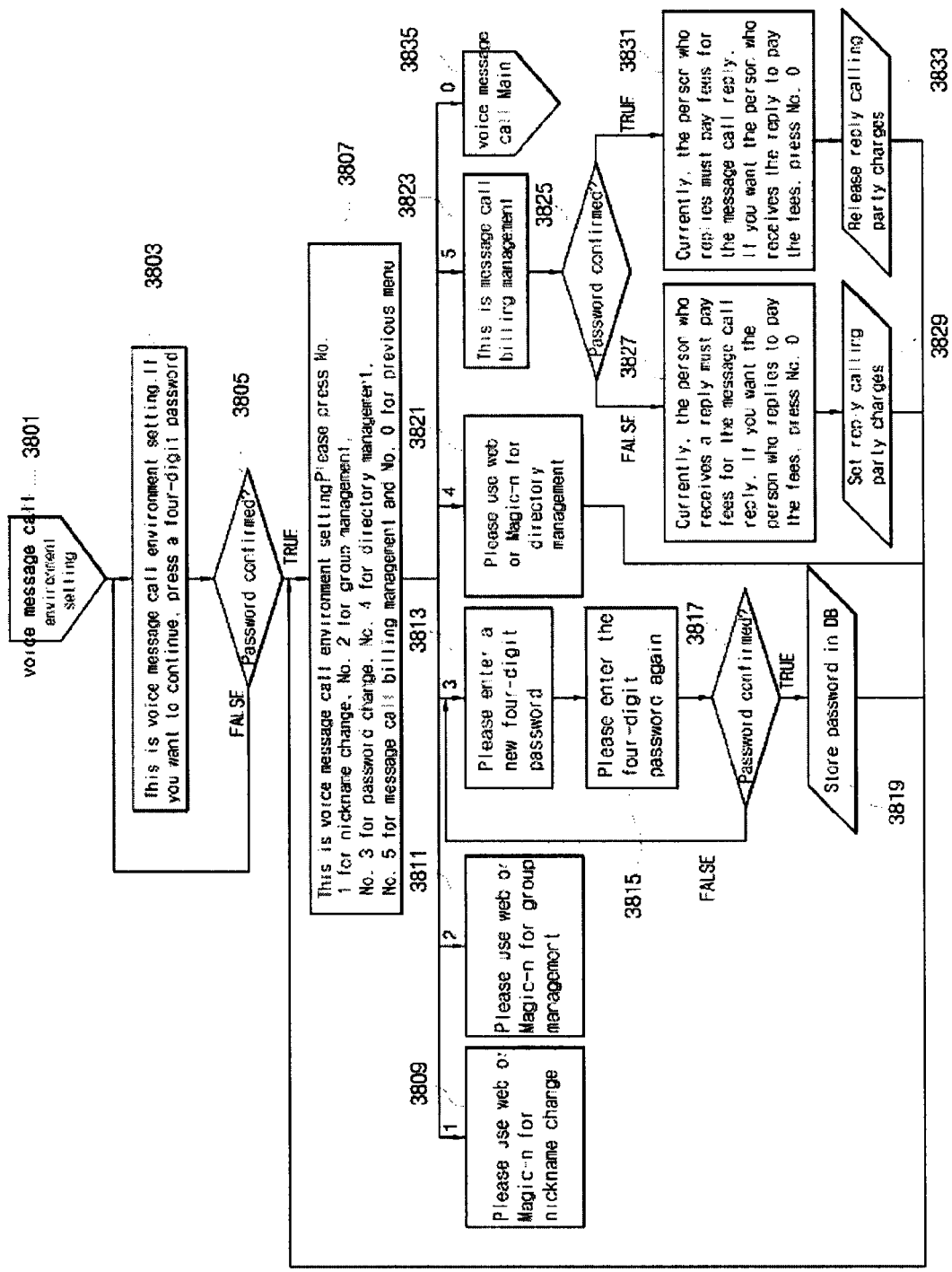
FIG. 38 is a flowchart illustrating an IVR scenario for setting a voice message call environment, in accordance with a preferred embodiment of the present invention.

FIG. 38 is a flowchart illustrating an IVR scenario for setting a voice message call environment according to a preferred embodiment of the present invention.

Referring to FIG. 38, after step 3507 of FIG. 35, if the user presses No. 3, the current IVR state is the voice message call environment setting state at step 3801. The service providing apparatus outputs a message stating "This is voice message call environment setting. If you want to continue, enter a four-digit password" to the user at step 3803. The service providing apparatus examines a password input by the user at step 3805. At this time, if the password is correct, step 3807 is performed, and if the password is incorrect, step 3803 is performed.

At step 3807, the service providing apparatus outputs a message, stating "This is voice message call environment setting. Please press No. 1 to change your nickname, No. 2 to perform group management, No. 3 to change your password, No. 4 to perform directory management, No. 5 to perform message call billing management and No. 0 to return to the previous menu item," to the user at step 3807. At this time, if the user presses No. 1, step 3809 is performed. If the user presses No. 2, step 3811 is performed. If the user presses No. 3, step 3813 is performed. If the user presses No. 4, step 3821 is performed. If the user presses No. 5, step 3823 is performed. If the user presses No. 0, step 3835 is performed.

At step 3809, the service providing apparatus outputs a message, stating "Please use the web or Magic-n to change your nickname," to the user, and then returns to step 3807.

At step 3811, the service providing apparatus outputs a message, stating "Please use the web or Magic-n to perform group management," to the user, and then returns to step 3807.

At step 3813, the service providing apparatus outputs a message, stating "Please enter a new four-digit password," to the user. After the four-digit password is received from the user, the service providing apparatus outputs a message, stating "Please enter the four-digit password again," to the user at step 3817. At this time, the service providing apparatus receives the four-digit password from the user again, and determines whether the password is correct at step 3817. If the password is correct, step 3819 is performed; and if the password is incorrect, the service providing apparatus returns to step 3813. At step 3819, the service providing apparatus stores the new password in the DB at step 3819 and then returns to step 3807.

At step 3821, the service providing apparatus outputs a message, stating "Please use web or Magic-n to perform directory management," to the user and then returns to step 3807.

At step 3823, the service providing apparatus outputs a message, stating "This is message call billing management," to the user, and then determines whether reply calling party charges have been set at step 3825. In this case, if the reply calling party charges have been set, it means that a person who replies pays the charges for the reply. If it is determined that the reply calling party charges have not been set, step 3827 is performed. If the reply calling party charges have been set, step 3831 is performed. At step 3827, the service providing apparatus outputs a message, stating "Currently, the person who receives a reply must pay the fees for the message call reply. If you want the person who makes the reply to pay the fees, press No. 0," to the user. If the user presses No. 0, the service providing apparatus sets reply calling party charges at step 3829 and then returns to step 3807. At step 3831, the service providing apparatus outputs a message, stating "Currently, the person who replies must pay fees for the message call reply. If you want the person who receives the reply to pay the fees, press No. 0," to the user. At this time, if the user presses No. 0, the service providing apparatus releases the reply calling party charges at step 3833 and then returns to step 3807.

At step 3835, a current IVR state enters the voice message call main state.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

What is claimed is:

1. A method of providing voice message call service in a service providing apparatus that is connected to a calling terminal, a Mobile Switching Center (MSC)/Personal Communication eXchange (PCX), a Home Location Register (HLR), a Service Control Point (SCP) and a called terminal through a mobile communication network, the method comprising the steps of:

receiving a first Seize Resource (SR) signal from the SCP, wherein the first Seize Resource (SR) signal corresponds to an Analyzed Information (AI) signal, which is sent to the SCP in response to a featreq signal received in response to a Feature Request (FEATREQ) signal, the MSC/PCX receiving a first call set-up request signal from the calling terminal and sending the FEATREQ signal to the HLR;

sending a first seize resource (sr) signal to the SCP in response to the first Seize Resource (SR) signal, wherein the SCP sends a first Connect Resource signal to the MSC/PCX in response to the first seize resource (sr) signal;

receiving a first call access request signal from the MSC/PCX, wherein the first call access request signal is generated based on the first Connect Resource signal;

sending a first call access response signal to the MSC/PCX in response to the first call access request signal, wherein the MSC/PCX sends a first call set-up response signal to the calling terminal in response to the first call access response signal;

sending a first Instruction Request (IR) signal to the SCP;

receiving a first Specialized Resource Function Directive (SRFD) signal from the SCP in response to the first Instruction Request (IR) signal;

receiving a voice message, which will be transferred to the called terminal, from the calling terminal through a first call path, which is established with the calling terminal, in accordance with the first call access response signal and the first call set-up response signal;

sending a first specialized resource function directive (srfd) signal indicating that the process of the Specialized Resource Function Directive (SRFD) signal has been completed to the SCP;

receiving a first instruction request (ir) signal indicating that the process of a corresponding call has been completed from the SCP in response to the first Specialized Resource Function Directive (SRFD) signal;

terminating the first call path;

sending a voice message call request signal to the SCP for call connection to the called terminal, wherein the SCP sends a first outbound call request signal to the MSC/PCX, and the MSC/PCX sends a second call set-up request signal to the called terminal, receives a second call set-up response signal, and sends a first outbound call response signal to the SCP in response to the second call set-up response signal;

receiving a second Seize Resource (SR) signal from the SCP in response to the first outbound call response signal;

sending a second seize resource (sr) signal to the SCP in response to the second Seize Resource (SR) signal, wherein the SCP sends a second Connect Resource signal to the MSC/PCX in response to the second seize resource (sr) signal;

receiving a second call access request signal from the MSC/PCX, wherein the second call access request signal is generated based on the second Connect Resource signal;

sending a second call access response signal to the MSC/PCX in response to the second call access request signal;

sending a second Instruction Request (IR) signal to the SCP;

receiving a second Specialized Resource Function Directive (SRFD) signal from the SCP in response to the second Instruction Request (IR) signal; and sending the voice message from the service providing apparatus to the called terminal using a second call path, which is established between the service providing apparatus and the called terminal, in accordance with the second call access response signal and the second call set-up response signal.

2. A method of providing voice message call service in a service providing apparatus that is connected to a calling terminal, a Mobile Switching Center (MSC)/Personal Communication eXchange (PCX), a Home Location Register (HLR), a Service Control Point (SCP) and a called terminal through a mobile communication network, the method comprising the steps of:

receiving an Seize Resource (SR) signal from the SCP, wherein the first Seize Resource (SR) signal corresponds to a first Analyzed Information (AI) signal, which is sent to the SCP in response to a featreq signal received in response to a FEATREQ, the MSC/PCX receiving a first call set-up request signal from the calling terminal and sending the FEATREQ signal to the HLR;

sending a first seize resource (sr) signal to the SCP in response to the first Seize Resource (SR) signal, wherein the SCP sends a first Connect Resource signal to the MSC/PCX in response to the first seize resource (sr) signal;

receiving a first call access request signal from the MSC/PCX, wherein the first call access request signal is generated based on the first Connect Resource signal;

sending a first call access response signal to the MSC/PCX in response to the first call access request signal, wherein the MSC/PCX sends a first call set-up response signal to the calling terminal in response to the first call access response signal;

sending a first Instruction Request (IR) signal to the SCP;

receiving a first Specialized Resource Function Directive (SRFD) signal from the SCP in response to the first Instruction Request (IR) signal;

receiving a voice message, which will be transferred to the called terminal from the calling terminal through a first call path, which is established with the calling terminal, in accordance with the first call access response signal and the first call set-up response signal;

sending a first specialized resource function directive (srfd) signal indicating that the process of the Specialized Resource Function Directive (SRFD) signal has been completed to the SCP;

receiving a first instruction request (ir) signal indicating that the process of a corresponding call has been completed from the SCP in response to the first Specialized Resource Function Directive (SRFD) signal;

terminating the first call path;

sending a callback short message to the called terminal, wherein the called terminal sends a second call set-up request signal to the MSC/PCX for call connection to the service providing apparatus using the callback short message;

receiving a second Seize Resource (SR) signal from the SCP, wherein the second Seize Resource (SR) signal corresponds to a second Analyzed Information (AI) signal that is sent to the SCP by the MSC/PCX in response to the second call set-up request signal;

sending a second seize resource (sr) signal to the SCP in response to the second Seize Resource (SR) signal, wherein the SCP sends a second Connect Resource signal to the MSC/PCX in response to the second seize resource (sr) signal;

receiving a second call access request signal from the MSC/PCX, wherein the second call access request signal is generated based on the second Connect Resource signal;

sending a second call access response signal to the MSC/PCX in response to the second call access request signal, wherein the MSC/PCX sends a second call set-up response signal to the called terminal in response to the second call access response signal;

sending a second Instruction Request (IR) signal to the SCP;

receiving a second Specialized Resource Function Directive (SRFD) signal from the SCP in response to the second Instruction Request (IR) signal; and sending the voice message to the called terminal using a second call path, which is established with the called terminal, in accordance with the second call access response signal and the second call set-up response signal.

3. The method according to claim 1 or 2, further comprising the steps of:

receiving a wireless Internet access request signal from the calling terminal, wherein the wireless Internet access request signal is generated by inputting a telephone number of the called terminal and pressing a wireless Internet access button in the calling terminal;

sending a supplementary service integration screen, including a supplementary service list, to the calling terminal;

receiving a voice message call request signal from the calling terminal; and terminating a wireless Internet connection to the calling terminal.

4. The method according to claim 3, wherein the calling terminal sends the first call set-up request signal to the MSC/PCX using connection number of the service providing apparatus included in a Wireless Markup Language (WML) or Wireless Internet browser page from the service providing apparatus output from the service providing apparatus, if connection between the service providing apparatus and the wireless Internet is terminated.

5. The method according to claim 3, wherein the voice message call request signal is generated using a group directory of a wireless Internet, and the service providing apparatus concurrently sends the voice message to a plurality of called parties registered in the group directory.

6. The method according to claim 1 or 2, wherein the first call set-up request signal includes a voice message call feature code and an identifier of the called terminal.

7. The method according to claim 1, wherein the first call set-up request signal is sent from the calling terminal to the MSC/PCX using at least one of a method using a dedicated key, a method using a mailbox menu and a method using a telephone directory menu.

8. The method according to claim 1, further comprising the steps of:

sending a guidance message for reply to the called terminal;

receiving a response message, which will be sent to the calling terminal, from the called terminal;

terminating the second call path;

sending a second outbound call request signal to the MSC/PCX for call connection to the calling terminal, wherein the MSC/PCX sends a third call set-up request signal to the calling terminal in response to the second outbound call request signal, and receives a third call set-up response signal in response to the third call set-up request signal;

receiving a second outbound call response signal from the MSC/PCX in response to the third call set-up response signal; and sending the response message to the called terminal through a third call path, which is established with the called terminal, in accordance with the third call set-up response signal and the second outbound call response signal.

9. The method according to claim 8, wherein if reply calling party charge release is previously set by the user of the called terminal, fees for response message transmission are borne by the called terminal.

10. The method according to claim 1, further comprising the steps of:

receiving a calling party immediate connection request signal from the called terminal;

sending a second outbound call request signal to the MSC/PCX for call connection to the calling terminal, wherein the MSC/PCX sends a third call set-up request signal to the calling terminal in response to the second outbound call request signal and receives a third call set-up response signal in response to the third call set-up request signal; and receiving a second outbound call response signal from the MSC/PCX in response to the third call set-up response signal, wherein the calling terminal and the called terminal communicate with each other through the second call path and a third call path, which is established with the called terminal, in accordance with the third call set-up response signal and the second outbound call response signal.

11. The method according to claim 1, further comprising the steps of:

receiving a calling party call request signal from the called terminal;

terminating the second call path;

sending a second outbound call request signal to the MSC/PCX for call connection to the calling terminal, wherein the MSC/PCX sends a third call set-up request signal to the calling terminal in response to the second outbound call request signal and receives a third call set-up response signal in response to the third call set-up request signal;

receiving a second outbound call response signal from the MSC/PCX in response to the third call set-up response signal, and establishing a third call path with the calling terminal;

sending a third outbound call request signal to the MSC/PCX for call connection to the called terminal, wherein the MSC/PCX sends a fourth call set-up request signal to the called terminal in response to the third outbound call request signal and receives a fourth call set-up response signal in response to the fourth call set-up request signal; and receiving a third outbound call response signal from the MSC/PCX in response to the fourth call set-up response signal, and establishing a fourth call path with the called terminal, wherein the calling terminal and the called terminal communicate with each other through the third call path and the fourth call path.

12. The method according to claim 1, further comprising the steps of:

send a called subscriber state request signal for querying the status of the called terminal to the HLR;

receiving a called subscriber state response signal from the HLR;

sending a called subscriber state registration request signal to the HLR if the called terminal is determined not to be in an idle state based on the received called subscriber state response signal; and receiving a called subscriber state report signal from the HLR, wherein the called subscriber state report signal is generated by registering into the HLR when the called terminal enters the idle state.

13. The method according to claim 1, wherein the second call set-up response signal and the first outbound call response signal are an Address Complete Message (ACM) and an Answer Message (ANM), and the ACM includes a backward call indicator indicating status information of the called terminal.

14. The method according to claim 1, wherein the second call set-up response signal and the first outbound call response signal are an Address Complete Message (ACM), a Call Progress (CPG) and an Answer Message (ANM), and the service providing apparatus determines that the called terminal is not in an idle state if the CPG is received.

15. The method according to claim 1, wherein, when sending the voice message to the called terminal, the service providing apparatus outputs a nickname or a real name for the user of the calling terminal to the called terminal through a Text To Speech (TTS) server.

16. The method according to claim 1 or 2, wherein the user of the calling terminal gains access to the service providing apparatus using any one of a wireless Internet, a wired Internet and voice call and queries a history of the voice messages sent to the called terminal.

17. The method according to claim 1 or 2, further comprising the steps of:

sending a second specialized resource function directive (srfd) signal to the SCP;

receiving a second instruction request (ir) signal from the SCP in response to the second specialized resource function directive (srfd) signal; and terminating the second call path.

18. The method according to claim 2, further comprising the steps of:

sending a guidance message for reply to the called terminal;

receiving a response message, which will be sent to the calling terminal, from the called terminal;

terminating the second call path;

sending a outbound call request signal to the MSC/PCX for call connection to the calling terminal, wherein the MSC/PCX sends a third call set-up request signal to the calling terminal in response to the outbound call request signal, and receives a third call set-up response signal in response to the third call set-up request signal;

receiving a second outbound call response signal from the MSC/PCX in response to the third call set-up response signal; and sending the response message to the called terminal through a third call path, which is established with called terminal, in accordance with the third call set-up response signal and the second outbound call response signal.

19. The method according to claim 2, further comprising the steps of:

receiving a calling party immediate connection request signal from the called terminal;

sending the outbound call request signal to the MSC/PCX for call connection to the calling terminal, wherein the MSC/PCX sends a third call set-up request signal to the calling terminal in response to the outbound call request signal and receives a third call set-up response signal in response the third call set-up request signal; and receiving a outbound call response signal from the MSC/PCX in response to the third call set-up response signal;

wherein the calling terminal and the called terminal communicate with each other through the second call path and a third call path, which is established with the called terminal, in accordance with the third call set-up response signal and the outbound call response signal.

20. The method according to claim 2, further comprising the steps of:

receiving a calling party call request signal from the called terminal;

terminating the second call path;

sending a first outbound call request signal to the MSC/PCX for call connection to the calling terminal, wherein the MSC/PCX sends a third call set-up request signal to the calling terminal in response to the first outbound call request signal and receives a third call set-up response signal in response to the third call set-up request signal;

receiving a first outbound call response signal from the MSC/PCX in response to the third call set-up response signal, and establishing a third call path with the calling terminal;

sending a second outbound call request signal to the MSC/PCX for call connection to the called terminal, wherein the MSC/PCX sends a fourth call set-up request signal to the called terminal in response to the second outbound call request signal and receives a fourth call set-up response signal in response to the fourth call set-up request signal; and receiving a second outbound call response signal from the MSC/PCX in response to the fourth call set-up response signal, and establishing a fourth call path with the called terminal, wherein the calling terminal and the called terminal communicate with each other through the third call path and the fourth call path.

21. A service providing apparatus for providing voice message call service, the service providing apparatus being connected to a calling terminal, an a Mobile Switching Center (MSC)/Personal Communication eXchange (PCX), a Home Location Register (HLR), a Service Control Point (SCP) and a called terminal through a mobile communication network, comprising:

a memory having a program stored therein; and
a processor for executing the program in conjunction with the memory;
wherein the processor, using the program, receives a first Seize Resource (SR) signal from the SCP, wherein the first Seize Resource (SR) signal corresponds to an Analyzed Information (AI) signal, which is sent to the SCP in response to a featreq signal received in response to a Feature Request (FEATREQ) signal, the MSC/PCX receiving a first call set-up request signal from the calling terminal and sending the FEATREQ signal to the HLR; sends a first seize resource (sr) signal to the SCP in response to the first Seize Resource (SR) signal, wherein the SCP sends a first Connect Resource signal to the MSC/PCX in response to the first seize resource (sr) signal; receives a first call access request signal from the MSC/PCX, wherein the first call access request signal is generated based on the first Connect Resource signal; sends first call access response signal to the MSC/PCX in response to the first call access request signal, wherein the MSC/PCX sends a first call set-up response signal to the calling terminal in response to the first call access response signal; sends a first Instruction Request (IR) signal to the SCP; receives a first Specialized Resource Function Directive (SRFD) signal from the SCP in accordance with the first Instruction Request (IR) signal; receives a voice message, which will be transferred to the called terminal, from the calling terminal through a first call path, which is established with the calling terminal, in accordance with the first call access response signal and the first call set-up response signal; sends a first specialized resource function directive (srfd) signal indicating that the process of the Specialized Resource Function Directive (SRFD) signal has been completed to the SCP; receives a first instruction request (ir) signal indicating that the process of a corresponding call has been completed from the SCP in response to the first Specialized Resource Function Directive (SRFD) signal; terminates the first call path; sends a voice message call request signal to the SCP for call connection to the called terminal, wherein the SCP sends a first outbound call request signal to the MSC/PCX, and the MSC/PCX sends a second call set-up request signal to the called terminal, receives a second call set-up response signal, and sends a first outbound call response signal to the SCP in response to the second call set-up response signal; receives a second Seize Resource (SR) signal from the SCP in response to the first outbound call response signal; sends a second seize resource (sr) signal to the SCP in response to the second Seize Resource (SR) signal, wherein the SCP sends a second Connect Resource signal to the MSC/PCX in response to the second seize resource (sr) signal; receives a second call access request signal from the MSC/PCX, wherein the second call access request signal is generated based on the second Connect Resource signal; sends a second call access response signal to the MSC/PCX in response to the second call access request signal; sends a second Instruction Request (IR) signal to the SCP; receives a second Specialized Resource Function Directive (SRFD) signal from the SCP in response to the second Instruction Request (IR) signal; and sends the voice message to the called terminal using a second call path, which is established with the called terminal, in accordance with the second call access response signal and the second call set-up response signal.

22. A service providing apparatus for providing voice message call service, the service providing apparatus being connected to a calling terminal, a Mobile Switching Center (MSC)/Personal Communication eXchange (PCX), a Home Location Register (HLR), a Service Control Point (SCP) and a called terminal through a mobile communication network, comprising:

a memory having a program stored therein; and
a processor for executing the program in conjunction with the memory;
wherein the processor, using the program, receives an SR signal from the SCP, wherein the processor, using the program, receives an Seize Resource (SR) signal from the SCP, wherein the first Seize Resource (SR) signal corresponds to an Analyzed Information (AI) signal, which is sent to the SCP in response to a featreq signal received in response to a FEATREQ, the MSC/PCX receiving a first call set-up request signal from the calling terminal and sending the FEATREQ signal to the HLR; sends a first seize resource (sr) signal to the SCP in response to the first Seize Resource (SR) signal, wherein the SCP sends a first Connect Resource signal to the MSC/PCX in response to the first seize resource (sr) signal; receives a first call access request signal from the MSC/PCX, wherein the first call access request signal is generated based on the first Connect Resource signal; sends a first call access response signal to the MSC/PCX in response to the first call access request signal, wherein the MSC/PCX sends a first call set-up response signal to the calling terminal in response to the first call access response signal; sends a first Instruction Request (IR) signal to the SCP; receives a first Specialized Resource Function Directive (SRFD) signal from the SCP in response to the first Instruction Request (IR) signal; receives a voice message, which will be transferred to the called terminal, from the calling terminal through a first call path, which is established with the calling terminal, in accordance with the first call access response signal and the first call set-up response signal; sends a first specialized resource function directive (srfd) signal indicating that the process of the Specialized Resource Function Directive (SRFD) signal has been completed from the service providing apparatus to the SCP; receives a first instruction request (ir) signal indicating that the process of a corresponding call has been completed from the SCP in response to the first Specialized Resource Function Directive (SRFD) signal; terminates the first call path; sends a callback short message to the called terminal, wherein the called terminal sends a second call set-up request signal to the MSC/PCX for call connection to the service providing apparatus using the callback short message; receives a second Seize Resource (SR) signal from the SCP, wherein the second Seize Resource (SR) signal corresponds to a second Analyzed Information (AI) signal that is sent to the SCP by the MSC/PCX in response to the second call set-up request signal; sends a second seize resource (sr) signal to the SCP in response to the second Seize Resource (SR) signal, wherein the SCP sends a second Connect Resource signal to the MSC/PCX in response to the second seize resource (sr) signal; receives a second call access request signal from the MSC/PCX, wherein the second call access request signal is generated based on the second Connect Resource signal; sends a second call access response signal to the MSC/PCX in response to the second call access request signal, wherein the MSC/PCX sends a second call set-up response signal to the called terminal in response to the second call access response signal; sends a second Instruction Request (IR) signal to the SCP; receiving a second Specialized Resource Function Directive (SRFD) signal from the SCP in response to the second Instruction Request (IR) signal; and sends the voice message to the called terminal using a second call path, which is established with the called terminal, in accordance with the second call access response signal and the second call set-up response signal.

* * * * *